US012675212B2

(12) United States Patent
 Wang

(10) Patent No.: US 12,675,212 B2
(45) Date of Patent: Jul. 7, 2026

(54) APPLICATION CARD REPLACING METHOD AND TERMINAL DEVICE

(71) Applicant: Honor Device Co., Ltd., Shenzhen (CN)

(72) Inventor: Long Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 297 days.

(21) Appl. No.: 18/263,783

(22) PCT Filed: Dec. 12, 2022

(86) PCT No.: PCT/CN2022/138478
 § 371 (c)(1),
 (2) Date: Aug. 1, 2023

(87) PCT Pub. No.: WO2023/207128
 PCT Pub. Date: Nov. 2, 2023

(65) Prior Publication Data
 US 2025/0004627 A1 Jan. 2, 2025

(30) Foreign Application Priority Data

Apr. 29, 2022 (CN) .......................... 202210475314.1

(51) Int. Cl.
 *G06F 3/04847* (2022.01)
 *G06F 3/0481* (2022.01)
 *G06F 3/0488* (2022.01)
(52) U.S. Cl.
 CPC ........ *G06F 3/04847* (2013.01); *G06F 3/0481* (2013.01); *G06F 3/0488* (2013.01)
(58) Field of Classification Search
 CPC ... G06F 3/04847; G06F 3/0481; G06F 3/0488
 See application file for complete search history.

(56) References Cited

U.S. PATENT DOCUMENTS

| 7,107,532 B1 * | 9/2006 | Billmaier | ........... H04N 21/4312 |
| | | | 348/E5.103 |
| 2003/0020671 A1 * | 1/2003 | Santoro | .................... G09G 5/14 |
| | | | 345/1.3 |

(Continued)

FOREIGN PATENT DOCUMENTS

| CN | 104778037 A | 7/2015 |
| CN | 105446615 A | 3/2016 |

(Continued)

OTHER PUBLICATIONS

Lim Keun-Woo et al., "Adaptive Frame Skipping With Screen Dynamics for Mobile Screen Sharing Applications", IEEE Systems Journal, IEEE, US, vol. 12, No. 2, Jun. 2018, pp. 1577-1588, XP011682675, ISSN: 1932-8184, DOI: 10.1109/JSYST.2016. 2589238 [retrieved onMay 2, 2018].

*Primary Examiner* — William L Bashore
*Assistant Examiner* — Gregory A Distefano
(74) *Attorney, Agent, or Firm* — Conley Rose, P.C.

(57) ABSTRACT

An application card replacing method and a terminal device. The terminal device receives a first operation performed on a first application card on a first user interface; displays a second user interface in response to the first operation, where the second user interface includes a first option; receives a second operation performed on the first option; displays a third user interface in response to the second operation, where the third user interface includes a second application card, and the second application card is a card generated in response to the second operation; and automatically deletes the first application card.

20 Claims, 47 Drawing Sheets

(56) References Cited

U.S. PATENT DOCUMENTS

| | | | | |
|---|---|---|---|---|
| 2009/0144376 | A1* | 6/2009 | Moscatelli | G06F 16/951 |
| | | | | 715/765 |
| 2010/0211872 | A1 | 8/2010 | Rolston et al. | |
| 2012/0054778 | A1* | 3/2012 | Russell | G06F 3/04817 |
| | | | | 715/810 |
| 2012/0166954 | A1* | 6/2012 | Roth | G06F 3/04883 |
| | | | | 715/730 |
| 2014/0344735 | A1 | 11/2014 | Wang et al. | |
| 2015/0007099 | A1* | 1/2015 | Bernaudin | G06F 3/0484 |
| | | | | 715/783 |
| 2015/0200896 | A1* | 7/2015 | Klimer | H04L 51/42 |
| | | | | 715/752 |
| 2016/0139737 | A1* | 5/2016 | Conn | G06F 3/0481 |
| | | | | 715/802 |
| 2016/0149988 | A1* | 5/2016 | Pang | G06F 3/0481 |
| | | | | 715/234 |
| 2017/0293414 | A1* | 10/2017 | Pierce | G06F 3/0482 |
| 2018/0181562 | A1* | 6/2018 | Sabripour | G06F 3/04883 |

| | | | |
|---|---|---|---|
| 2021/0286489 | A1 | 9/2021 | Tyler et al. |
| 2022/0188131 | A1 | 6/2022 | Song |
| 2023/0077467 | A1 | 3/2023 | Xu et al. |

FOREIGN PATENT DOCUMENTS

| | | | |
|---|---|---|---|
| CN | 108334253 | A | 7/2018 |
| CN | 108958867 | A | 12/2018 |
| CN | 110262877 | A | 9/2019 |
| CN | 110750317 | A | 2/2020 |
| CN | 111225108 | A | 6/2020 |
| CN | 111966251 | A | 11/2020 |
| CN | 113508360 | A | 10/2021 |
| CN | 113761427 | A | 12/2021 |
| CN | 113849090 | A | 12/2021 |
| CN | 113986070 | A | 1/2022 |
| CN | 114327195 | A | 4/2022 |
| WO | 2018113065 | A1 | 6/2018 |
| WO | 2021082835 | A1 | 5/2021 |
| WO | 2022052470 | A1 | 3/2022 |
| WO | 2022068862 | A1 | 4/2022 |

* cited by examiner

Main interface

Main interface

Main interface

CONT.
FROM

200

TO 202          201          13

Main interface

CONT.
FROM

Main interface

TO

Main interface

300

CONT.
FROM

TO

301

Main interface

300

CONT.
FROM
FIG. 1C-2

Memo

All pending

All
pending

○ XXXXXXXXXX +
○ XXXXXXXXXX
○ XXXXXXXXXX
○ XXXXXXXXXX

Add to desktop

Main interface

Main interface

CONT.
FROM

TO

17

Main interface

CONT.
FROM

TO

400

Main interface

CONT.
FROM

First user interface

CONT.
FROM

TO

First user interface

Second user interface

CONT.
₂ FROM

First user interface

TO

First user interface

CONT.
FROM

TO

Second user interface

CONT.
? FROM

Second user interface

Second user interface

First user interface

Second user interface

606

601

602

CONT.
FROM

603

604

TO

Second user interface

Second user interface

606

CONT.
FROM

First user interface

First user interface

TO

Second user interface

CONT.
FROM

TO

Second user interface

First user interface

CONT.
FROM

First user interface

First user interface

CONT.
FROM

20

First user interface

CONT.
FROM

20

First user interface

CONT.
FROM

APPLICATION CARD REPLACING METHOD AND TERMINAL DEVICE

CROSS-REFERENCE TO RELATED APPLICATIONS

This is a U.S. National Stage of International Application No. PCT/CN2022/138478 filed on Dec. 12, 2022, which claims priority to Chinese Patent application Ser. No. 202210475314.1, filed on Apr. 29, 2022, both of which are incorporated herein by reference in its their entireties.

TECHNICAL FIELD

The present application relates to the field of terminal technologies, and in particular, to an application card replacing method and a terminal device.

BACKGROUND

With the development of terminal technologies, terminal devices such as mobile phones and tablet computers have become indispensable tools in people's life, work, study and entertainment. At present, in order to provide convenience to users, a terminal device may display an application card on the main interface. The application card refers to a widget that displays information content corresponding to one or some application pages in an application program on the desktop of a terminal device. Compared with an application icon, the application card not only provides the user with an entrance of the application program, but also can display corresponding function information, which is more attractive to users. For example, after a user triggers an application card, a terminal device can directly start a corresponding application program and display a corresponding application page to fully present information content. In addition, important information of the application program can also be displayed on the application card, which is convenient for the user to view.

Different styles of application cards corresponding to a same application program can be displayed on the main interface of the terminal device, and the user can replace each style of application card. At present, a manner for replacing an application card on a terminal device is to add a new application card. If an old style of application card is not deleted, two cards of the same application program exist on the desktop at the same time. The user experience is not good.

SUMMARY

The present application provides an application card replacing method and a terminal device, so as to replace an application card more quickly.

According to a first aspect, the present application provides an application card replacing method, including: receiving a first operation performed on a first application card on a first user interface; displaying a second user interface in response to the first operation, where the second user interface includes a first option; receiving a second operation performed on the first option; displaying a third user interface in response to the second operation, where the third user interface includes a second application card, and the second application card is a card generated in response to the second operation; and automatically deleting, by the terminal device, the first application card.

In the method provided by the embodiments of the present application, an original application card does not first need to be removed during replacing of the application card, the application card can be quickly replaced through simple operations, and a card type, style, or the like can be customized for the replacing new application card. In this way, the application card is replaced across applications, and user's interaction experience is better.

In an implementation, the first user interface and the third user interface are desktops of the terminal device.

In an implementation, the first option includes a parameter setting option and a first control, and the second user interface further includes a preview region; the receiving a second operation performed on the first option includes: receiving a third operation performed on the parameter setting option; and the method further includes: generating a third application card in response to the third operation and displaying the third application card in the preview region. In this way, the terminal device can follow the user's operation performed on the parameter setting option, so that the card in the preview region changes accordingly. In this way, the user can view the display effect of the set second application card in real time after completing the operation corresponding to the parameter setting option.

In an implementation, the receiving a second operation performed on the first option further includes: receiving a fourth operation performed on the first control; and the displaying a third user interface in response to the second operation, where the third user interface includes a second application card includes: displaying a third user interface in response to the fourth operation, and displaying a third application card on the third user interface. In this way, the terminal device allows the user to select a corresponding parameter setting option in the second user interface, to complete parameter setting of the second application card, and the user's interaction experience is better.

In an implementation, the second user interface includes one or more of the following: the preview region and the first option; and the first option includes one or more of the following: the parameter setting option, the first control, and a second control. The parameter setting option includes one or more of the following: an application type, a card type, a layout, a color, and a size. In this way, the terminal device allows the user to customize parameters such as a size, a color, a layout, a card type, and an application type of the application card, to complete the integration of customization and convenient interaction.

In an implementation, the parameter setting option includes a first parameter setting option located within the field of view of the display screen of the terminal device and a second parameter setting option located outside the field of view of the display screen region of the terminal device; and the method further includes: receiving a fifth operation performed on the second user interface; and moving the second parameter setting option into the field of view of the display screen of the terminal device in response to the fifth operation. In this way, the terminal device can allow the user to configure a plurality of parameters of the second application card in the second user interface, and the user's interaction experience is better.

In an implementation, parameter setting of the first option includes size; and if the size of the second application card is smaller than or equal to the size of the first application card, the first user interface and the third user interface are a same desktop of the terminal device. In an implementation, the second application card is displayed at a position of the first application card. In this way, the terminal device compares the size of the generated second application card with the size of the first application card, to ensure that the second application card can be displayed at the original position of the first application card, thereby implementing the replacement of the application card at the original position.

In an implementation, if the size of the second application card is larger than a first size, the third user interface is a newly created desktop, and the third user interface is a desktop different from that of the first user interface, where the first size is the size of the largest blank region formed after the first application card is deleted in the first user interface. In this way, when an interface where the first application card is located cannot display the large-sized second application card, the terminal device can display the second application card by displaying a new screen interface, so as to ensure that the second application card can replace the first application card for display, and the user's interaction experience is better.

In an implementation, the method further includes: receiving a sixth operation performed on the second control; and closing the second user interface and displaying the first user interface in response to the sixth operation. In this way, the terminal device allows the user to cancel the replacement operation of the application card at any time, and the user's interaction experience is better.

In an implementation, the first operation includes a plurality of continuous sub-operations; and the displaying a second user interface in response to the first operation includes: receiving a first sub-operation performed on the first application card; selecting the first application card in response to the first sub-operation: receiving a second sub-operation performed on the first application card; moving the first application card to a target position in response to the second sub-operation: receiving a third sub-operation performed on the first application card; and generating the second user interface in response to the third sub-operation. In this way, the terminal device can support the user to generate the second user interface through continuous operations, so that the configuration of the second application card can be implemented through the second user interface, and the user's interaction experience is better.

In an implementation, the method further includes: displaying a prompt region at the target position in response to the second sub-operation; and displaying a prompt animation in the prompt region in response to detecting that the first application card is in contact with the prompt region. In this way, when the user moves the first application card, the terminal device can display the prompt region and the prompt animation to inform, through the prompt region, the user of the target position for moving the first application card, and prompt, through the prompt animation, the user that execution of the third sub-operation can trigger display of the second user interface, and the user's interaction experience is better.

In an implementation, the first operation includes a plurality of discontinuous sub-operations; and the displaying a second user interface in response to the first operation includes: receiving a fourth sub-operation performed on the first application card; and in response to the fourth sub-operation, selecting the first application card, and displaying an edit pop-up window on a side of the first application card, where the edit pop-up window includes a third control; receiving a fifth sub-operation performed on the third control; and generating the second user interface in response to the fifth sub-operation. In this way, the terminal device can support the user to generate the second user interface through discontinuous operations, so that the configuration of the second application card can be implemented through the second user interface, and the user's interaction experience is better.

According to a second aspect, the present application further provides a terminal device, including a memory, a processor, and a touch screen. The touch screen is configured to display a user interface and obtain user operations. The memory stores computer program instructions. When the computer program instructions are executed by the processor, the terminal device is caused to execute the application card replacing method in the first aspect.

According to a third aspect, an embodiment of the present application further provides a computer storage medium. The computer readable storage medium stores program instructions, and when the program instructions run on a computer, the computer is caused to execute the application card replacing method executed by the terminal device in the first aspect.

According to a third aspect, an embodiment of the present application further provides a computer program product. When the program instructions run on a computer, the computer is caused to execute the application card replacing method executed by the terminal device in the first aspect.

BRIEF DESCRIPTION OF DRAWINGS

To describe the technical solutions in the embodiments of the present application more clearly, the following briefly describes the accompanying drawings required for describing the embodiments. Obviously, a person of ordinary skill in the art may derive other drawings from these accompanying drawings without creative efforts.

FIG. 1C-1, FIG. 1C-2, FIG. 1C-3, and FIG. 1C-4 are current flowcharts of adding an application card on a terminal device;

FIG. 1D-1, FIG. 1D-2, FIG. 1D-3, and FIG. 1D-4 are current flowcharts of replacing an application card at an original position on a terminal device;

FIG. 2 is a schematic structural diagram of a terminal device according to an embodiment of the present application:

FIG. 3 is a flowchart of an application card replacing method according to an embodiment of the present application;

DESCRIPTION OF EMBODIMENTS

The technical solutions in embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

With the development of terminal technologies, terminal devices such as mobile phones and tablet computers have become indispensable tools in people's life, work, study and entertainment. At present, in order to provide convenience to users, a terminal device may display an application card on the main interface. The application card refers to a widget that displays information content corresponding to one or some application pages in an application program on the desktop of a terminal device. Compared with an application icon, the application card not only provides the user with an entrance of the application program, but also can display corresponding function information, which is more attractive to users.

In an implementation, an application card may be implemented by a desktop widget (widget), and each application program may be displayed on the desktop in the form of a widget, such as a memo widget, a mail widget, a calendar widget, and the like. A desk-top widget can be displayed in different styles, and users can flexibly build UIs (UserInterface) through different styles of widgets to enrich the display effects of desktops of terminal devices.

Application cards corresponding to different application programs can be displayed on the main interface of the terminal device, and a user can perform at least one operation such as editing, deleting, and adding cards of other styles through the application cards. Cards of different styles differ in at least one of size, shape, layout, and the like. The size can be 2×2, 4×2, 4×4, and the like, the shape can be square, rectangular, and the like, and the layout can be a relative positional relationship for displaying a title and a content corresponding to an application program.

A size of an application card is determined by a number of icons that can be displayed on a desktop. If the size of the application card is 2×2, it means that the application card occupies a region surrounded by a total of 4 icons, that is, 2 horizontal icons and 2 vertical icons. If the size of the application card is 4×2, it means that the application card occupies a region surrounded by a total of 8 icons, that is, 4 horizontal icons and 2 vertical icons. If the size of the application card is 4×4, it means that the application card occupies a region surrounded by a total of 16 icons, that is, 4 horizontal icons and 4 vertical icons.

Figure 1A:
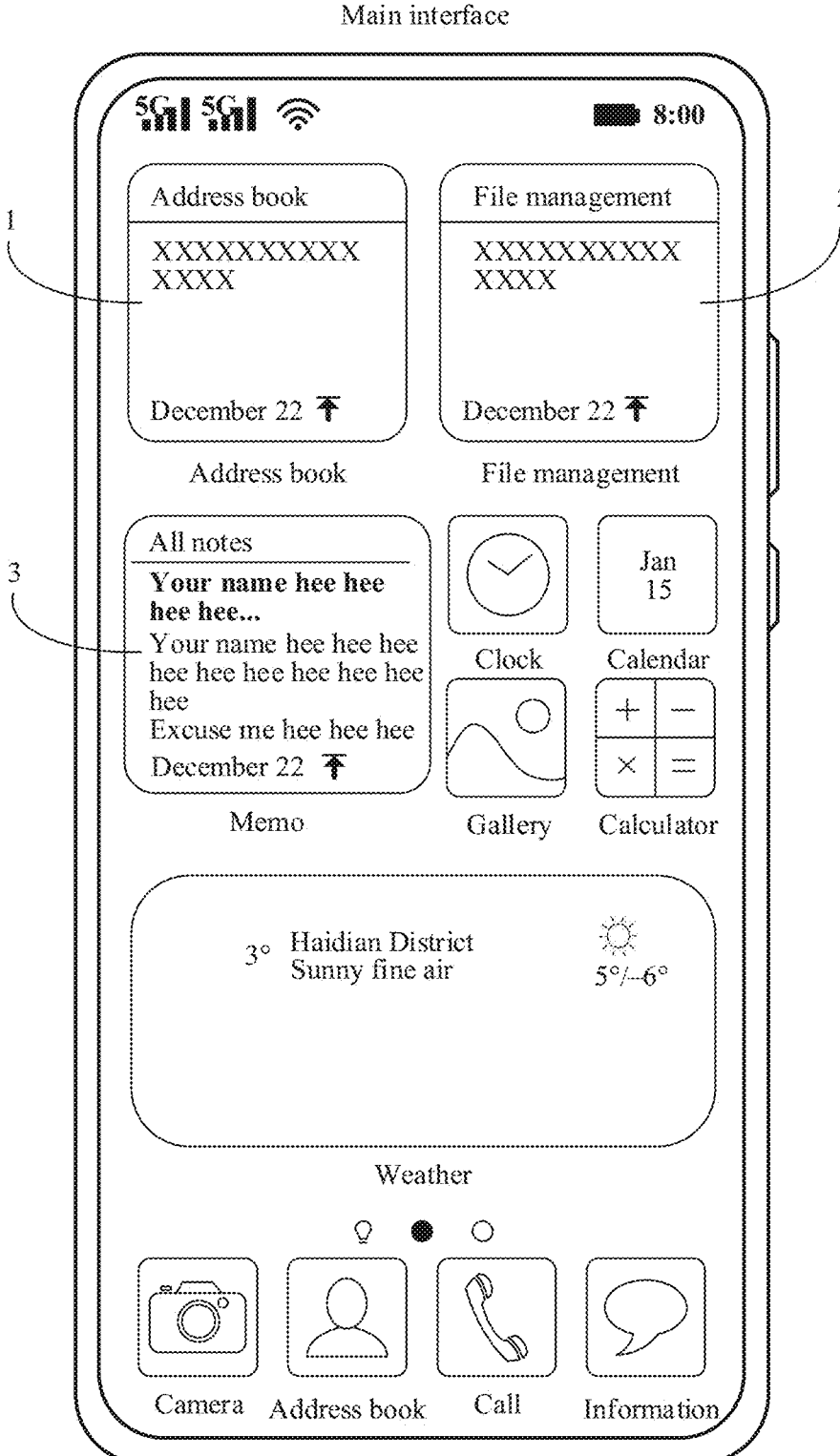
FIG. 1A is a current schematic diagram of displaying an application card on a terminal device.
Figures 1, 1B:
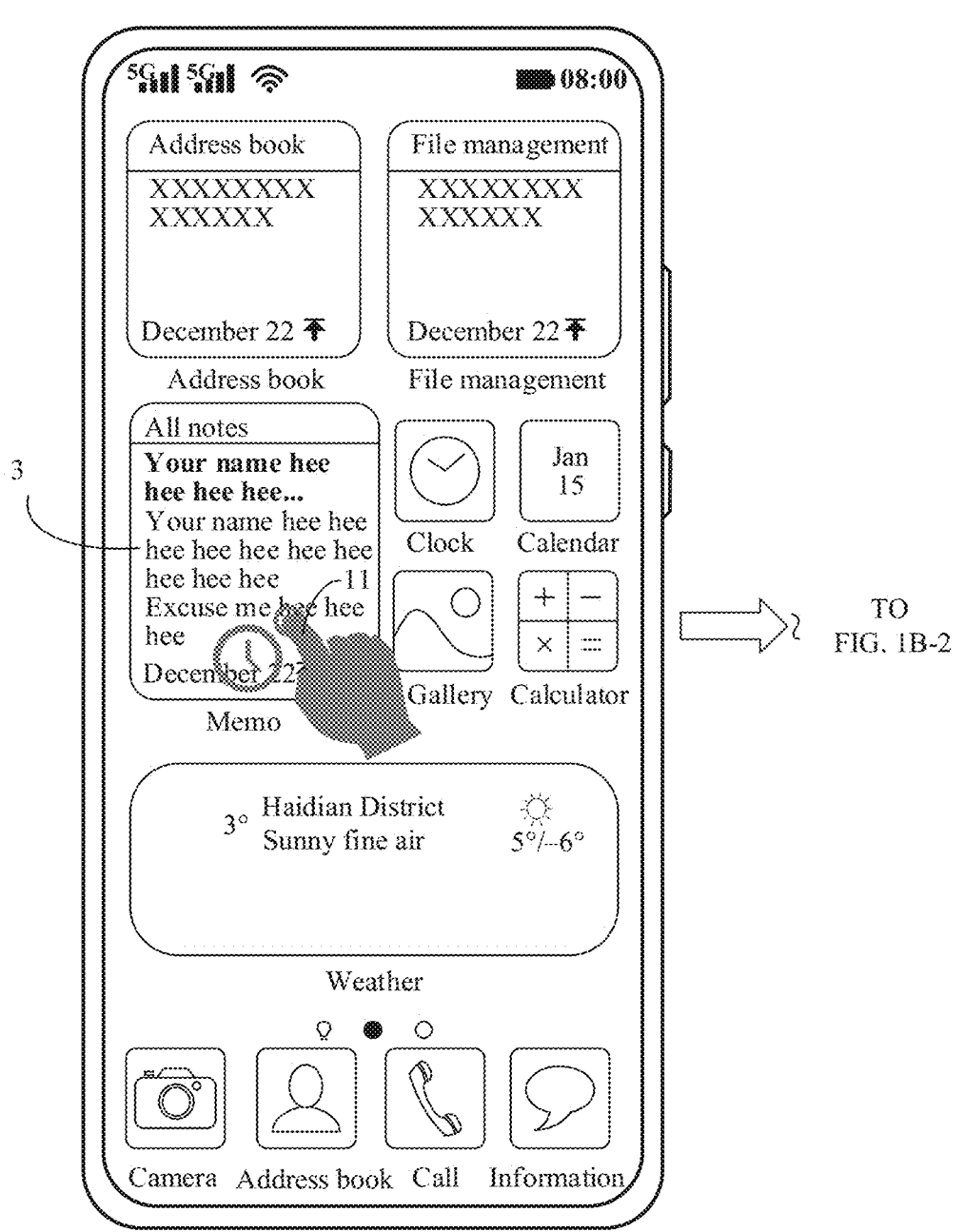
FIG. 1B-1, FIG. 1B-2, FIG. 1B-3, and FIG. 1B-4 are current flowcharts of deleting an application card on a terminal device.

FIG. 1A is a current schematic diagram of displaying an application card on a terminal device. Referring to FIG. 1A, a user can operate a target application program in a terminal device to create an application card of a specified style, and display an application card of each specified style at a specified position of the main interface. For example, three application cards are added to the main interface of the terminal device, and application card 1 is displayed in the upper left corner of the desktop and has a size of 2×2. Application card 2 is displayed in the upper right corner of the desktop and has a size of 2×2. Application card 3 is displayed in the middle position on the left side of the desktop and has a size of 2×2.

At least one application card is displayed on the main interface, and the user can edit the style of any application card, delete any application card, add an application card, and perform other operations.

FIG. 1B-1, FIG. 1B-2, FIG. 1B-3, and FIG. 1B-4 are current flowcharts of deleting an application card on a terminal device. Referring to FIG. 1B-1, FIG. 1B-2, FIG. 1B-3, and FIG. 1B-4, when the user wants to edit application card 3, the user can long-press (11) application card 3 with a finger. In response to the long-press (11) operation performed by the user on application card 3, the terminal device adds a blurred mask layer or another non-transparent mask layer on the main interface, and displays application card 3 and edit box 100A on the mask layer. The mask layer can block other content in the main interface, and application card 3 and edit box 100A in the main interface can be clearly displayed. In a possible implementation, edit box 100A can be displayed on a side of the application card 3. As shown in FIG. 1B-1, FIG. 1B-2, FIG. 1B-3, and FIG. 1B-4, edit box 100A is displayed below application card 3.

Edit item 101, adding item 102, removing item 103, and the like are displayed in edit box 100A. Edit item 101 is used to modify content of the application card, adding item 102 is used to add a new application card on the desktop, and removing item 103 is used to delete a current application card from the desktop.

When the user wants to delete application card 3, the user can click (12) the removing item 103 in the edit box. The terminal device cancels the display of the edit box in response to the user's click (12) operation, and pops up a confirmation pop-up window 200 at the bottom of the main interface. Removing button 201 and cancel button 202 are displayed in the confirmation pop-up window 200. Next, if the terminal device detects that the user clicks (13) removing button 201, application card 3 in the main interface is deleted. If it is detected that the user clicks cancel button 202, display of the confirmation pop-up window 200 is canceled, a removal operation on application card 3 is not performed, and application card 3 is still located at the original position of the main interface.

FIG. 1C-1, FIG. 1C-2, FIG. 1C-3, and FIG. 1C-4 are current flowcharts of adding an application card on a terminal device. Referring to FIG. 1C-1, FIG. 1C-2, FIG. 1C-3, and FIG. 1C-4, when the user wants to add an application card in the main interface, the user can click (14) adding item 102 in the edit box 100A. An application corresponding to the newly added application card provided by adding item 102 is the same as an application corresponding to an application card touched by the user's finger when the user long-presses (11) to call out the edit box 100A, that is, an application card of a same application program is added. For example, the user long-presses (11) application card 3 through a finger to call out edit box 100A. If application card 3 is an application card of the application program "memo", a text displayed on an entry of adding item 102 in the edit box 100 A is "more'memo' cards", that is, a new application card of "memo" can be added through adding item 102. In response to the user's click (14) operation on adding item 102, the terminal device pops up adding pop-up window 300 in the main interface, candidate application cards displayed in adding pop-up window 300 are of the same type as application cards that can be provided by the adding item 102, and the home page of adding pop-up window 300 displays an application card with a same style as that of application card 3. If the user wants to add application cards of other styles, the terminal device detects the user's operation of sliding leftwards (15) on adding pop-up window 300, and displays application cards of other styles provided by other pages.

For example, if adding item 102 provides the addition of an application card of the "memo" type, a candidate application card of the "memo" type is displayed in adding pop-up window 300. Next, when the terminal device detects that the user slides leftwards (15) to select an application card displayed on the second page, and clicks (16) to add adding button 301 in pop-up window 300, adding pop-up window 300 is hidden, and a selected application card form is added to desktop.

It can be seen that the existing interaction process of adding a new application card is relatively complicated, if the current screen has enough vacant space, the newly added application card is displayed in the vacant space, and if the current screen has no vacant space, the newly added application card needs to occupy a new screen of the smart device. In both cases, too much screen space is occupied and it is not convenient for user management. In addition, original position replacement of the original application card cannot be implemented. For example, after the user triggers the edit box based on application card 3 and adds a new application card 4, application card 4 cannot replace the content of application card 3, and is displayed at a vacant position of the current screen or displayed on another screen. Moreover, the card type of the newly added application card depends on the application corresponding to the added card, application cards of other applications cannot be added, and user experience is not good.

FIG. 1D-1, FIG. 1D-2, FIG. 1D-3, and FIG. 1D-4 are current flowcharts of replacing an application card at an original position on a terminal device. Referring to FIG. 1D-1, FIG. 1D-2, FIG. 1D-3, and FIG. 1D-4, if the user wants to replace with and display another new application card 4 at the original position of application card 3, and add application cards of other applications, application card 3 can be deleted first. An implementation process of deleting the application card 3 can be found in content shown in FIG. 1B-1, FIG. 1B-2, FIG. 1B-3, and FIG. 1B-4 and is not repeated herein. Adding an application card corresponding to an address book is used as an example. A floating card 400 is displayed by long-press (17) operation on the application program of address book. An operation identification of long-press (17) in FIG. 1D-1, FIG. 1D-2, FIG. 1D-3, and FIG. 1D-4 is a combination of a finger identification and a time identification, and is used to represent that this operation is an operation in which the finger is kept in contact with the screen, such as long-press, dragging, and other operations. For a same operation identification in other accompanying drawings, refer to descriptions herein. The adding button in the upper right corner is clicked (18) in the floating card 400 to generate application card 4 based on the new application program, and application card 4 is displayed at the original position of application card 3. The interaction process of replacing the application card is relatively complicated, and the operation consumes a lot of time.

It can be seen that the current interaction process for editing application cards is complicated, and there are few editing functions. It is impossible to replace application cards through simple operations, and it is also impossible to customize styles, types, and the like of application cards, and user interaction experience is not good.

Therefore, in order to reduce operation paths for replacing application cards and further improve the user's operation experience, an embodiment of the present application provides an application card replacing method. In the method provided by the embodiments of the present application, the application card can be replaced through simple operations, and a card type, a style, or the like can be customized for the replacing new application card. In this way, the application card is replaced across applications, and user's interaction experience is better. The customizable style includes but is not limited to size, color, layout, and the like.

The method provided in this embodiment of the present application is applicable to a terminal device. The terminal device includes but is not limited to mobile phones, tablet computers, personal computers, workstation devices, large-screen devices (such as smart screens and smart TVs), wearable devices (such as smart bracelets and smart watches), palmtop game consoles, home game consoles, virtual reality devices, augmented reality devices, mixed reality devices, vehicle-mounted smart terminals, and the like.

Figures 1, 1B, 2:
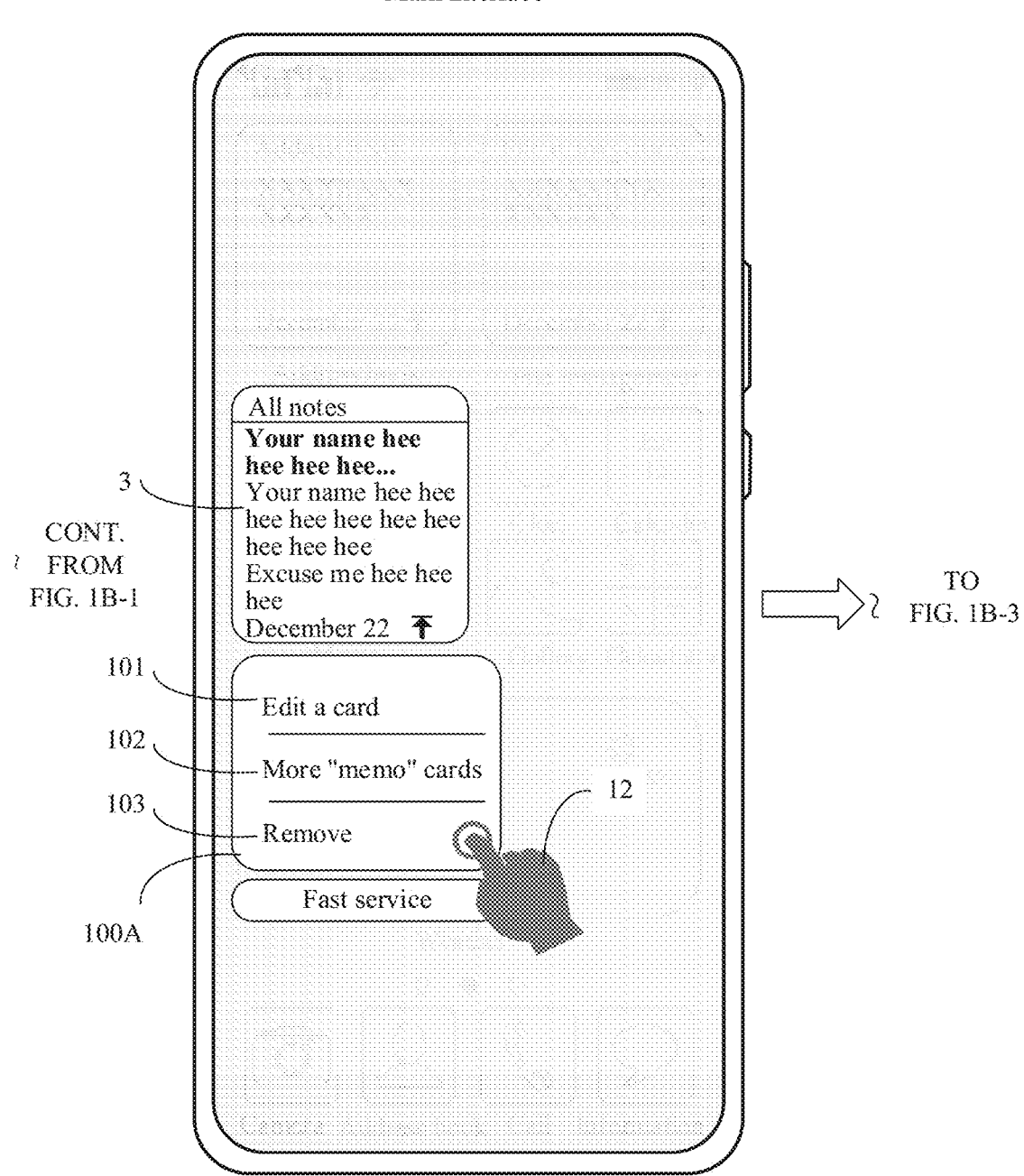

FIG. 2 is a schematic structural diagram of a terminal device according to an embodiment of the present application. As shown in FIG. 2, the terminal device 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, an air pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation to the terminal device 100. In some other embodiments of the present application, the terminal device 100 may include more or fewer components than those shown in the figure, or combine some components, or split some components, or have different component arrangements. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors. The controller may generate an operation control signal according to instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instruction or the data again, the processor may directly call the instruction or the data from the memory.

The USB interface 130 is an interface that complies with the USB standard specification, and may be specifically a Mini USB interface, a Micro USB interface, a USB Type C interface, and the like. The USB interface 130 may be configured to connect to the charger to charge the terminal device 100, or may be used for data transmission between the terminal device 100 and a peripheral device, and may also be configured to connect to a headset to play audio through the headset. The interface may alternatively be configured to connect to another terminal device such as an AR device.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input by using a wireless charging coil of the terminal device 100. While charging the battery 142, the charging management module 140 may further supply power to the terminal device by using the power management module 141.

The power management module 141 is configured to be connected to the battery 142, the charging management module 140, and the processor 110. The power management module 141 receives an input of the battery 142 and/or the charging management module 140, to supply power to the processor 110, the internal memory 121, a display screen 194, the camera 193, the wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may also be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover a single communication frequency band or a plurality of communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 can provide a solution for wireless communication including 2G/3G/4G/5G and the like to be applied to the terminal device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify, a signal modulated by the modem processor, and convert the signal into an electromagnetic wave by using the antenna 1 for radiation. In some embodiments, at least some function modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a low frequency baseband signal to be sent into a medium and high frequency signal. The demodulator is configured to demodulate the received electromagnetic wave signal into a low-frequency baseband signal. Then, the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another function module.

The wireless communication module 160 can provide solutions for wireless communication such as wireless local area networks (wireless local area networks, WLAN) (such as Wi-Fi networks) and Bluetooth applied to the terminal device 100. The wireless communication module 160 may be one or more components into which at least one communication processing module is integrated.

The terminal device 100 implements a display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The terminal device 100 can implement a photographing function by using the ISP, the camera 193, the video codec, the GPU, the display screen 194, the application processor, and the like.

The external memory interface 120 may be configured to connect to an external storage card such as a micro SD card, to extend a storage capability of the terminal device 100. The external storage card communicates with the processor 110 by using the external memory interface 120, to implement a data storage function, for example, store files such as music and a video into the external storage card.

The internal memory 121 may be configured to store computer-executable program code. The executable program code includes an instruction. The internal memory 121 may include a program storage region and a data storage region. The program storage region can store an operating system, an application program required for at least one function (such as a file transfer function and an album function), and the like. The data storage region may store data (for example, files, photos, and videos) and the like created during use of the terminal device 100.

The terminal device 100 can implement an audio function, for example, music playback and recording, by using the audio module 170, the speaker 170A, the phone receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display screen 194. In a case that a touch operation acts on the display 194, the terminal device 100 measures the intensity of the touch operation by using the pressure sensor 180A. The terminal device 100 may also calculate a touch position based on a detection signal of the pressure sensor 180A. In some embodiments, touch operations that are applied to a same touch position but have different touch operation intensity may correspond to different operation instructions.

The gyro sensor 180B may be configured to determine a moving posture of the terminal device 100. In some embodiments, an angular velocity of the terminal device 100 around three axes (namely, x, y, and z axes) may be determined by using the gyro sensor 180B.

The air pressure sensor 180C is configured to measure an air pressure. In some embodiments, the terminal device 100 calculates an altitude by using a barometric pressure value measured by the air pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a foldable mobile phone, the terminal device 100 may detect opening and closing of the foldable mobile phone by using the magnetic sensor 180D.

The acceleration sensor 180E may measure magnitudes of accelerations of the terminal device 100 in various directions (generally three axes); and may detect magnitude and a direction of the gravity when the terminal device 100 is static.

The distance sensor 180F is configured to measure a distance. The terminal device 100 may measure the distance by using infrared or laser.

The proximity light sensor 180G may include, for example, a light-emitting diode (LED) and a light detector, for example, a photodiode. The light-emitting diode may be an infrared light-emitting diode. The terminal device 100 emits infrared light by using the light-emitting diode. The terminal device 100 uses a photodiode to detect infrared reflected light from an object nearby. When sufficient reflected light is detected, it may be determined that there is an object near the terminal device 100. When insufficient reflected light is detected, the terminal device 100 may determine that there is no object near the terminal device 100.

The ambient light sensor 180L is configured to perceive ambient light brightness. The terminal device 100 may adaptively adjust brightness of the display screen 194 based on the sensed ambient light brightness. The ambient light sensor 180L may also be configured to automatically adjust white balance during photographing. The ambient light sensor 180L may also cooperate with the proximity light sensor 180G to detect whether the terminal device 100 is in a pocket to prevent a false touch.

The fingerprint sensor 180H is configured to obtain a fingerprint. The terminal device 100 may use a feature of the collected fingerprint to implement fingerprint-based unlocking, accessing an application lock, fingerprint-based photographing, fingerprint-based call answering, and the like.

The temperature sensor 180J is configured to detect temperature. In some embodiments, the terminal device 100 executes a temperature processing policy by using the temperature detected by the temperature sensor 180J.

The touch sensor 180K is also referred to as a "touch device". The touch sensor 180K may be disposed on the display screen 194. The touch sensor 180K and the display screen 194 form a touchscreen. The touch sensor 180K is configured to detect a touch operation on or near the touch sensor The touch sensor may transfer the detected touch operation to the application processor to determine a type of the touch event. A visual output related to the touch operation may be provided by using the display screen 194.

The bone conduction sensor 180M may collect a vibration signal. In some embodiments, the bone conduction sensor 180M may obtain a vibration signal of an acoustic portion vibrating bone of a human body. The bone conduction sensor 180M may also come into contact with a human pulse to receive a blood pressure pulse signal. In some embodiments, the bone conduction sensor 180M may alternatively be disposed in the headset, to combine into a bone conduction headset. The audio module 170 may obtain a speech signal through parsing based on the vibration signal of the vibration bone of the vocal-cord part that is obtained by the bone conduction sensor 180M, to implement a speech function.

The key 190 includes a power key, a volume key, and the like. The key 190 may be a mechanical key, or a touch-type key. The terminal device 100 may receive key input, and generate key signal input related to a user setting and function control of the terminal device 100.

The motor 191 may generate a vibration prompt. The motor 191 may be used for an incoming call vibration prompt and a touch vibration feedback. For example, touch operations performed on different applications (for example, photo taking and audio playing) may correspond to different vibration feedback effects. The motor 191 may alternatively correspond to different vibration feedback effects for touch operations applied to different regions of the display screen 194.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195 to come into contact with or be separated from the terminal device 100. The terminal device 100 may support 1 or N SIM card interfaces. N is a positive integer greater than 1. The SIM card interface 195 can support a nano SIM card, a micro SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may also be compatible with an external memory card. The terminal device 100 interacts with a network by using the SIM card, to implement a call function, a data communication function, and the like.

It will be apparent to those skilled in the art that some of the specific details presented above with respect to the terminal device 100 may not be required to practice specific described implementations or their equivalents. Similarly, other terminal devices may include a larger number of modules, components, and the like. Some modules may be implemented as software or hardware in appropriate circumstances. Therefore, it should be understood that the above description is not intended to be exhaustive or to limit the present application to the accurate form described herein. Conversely, it will be apparent to those of ordinary skill in the art that many modifications and variations are possible according to the above teachings.

Figures 1, 1B, 2, 3, 4:
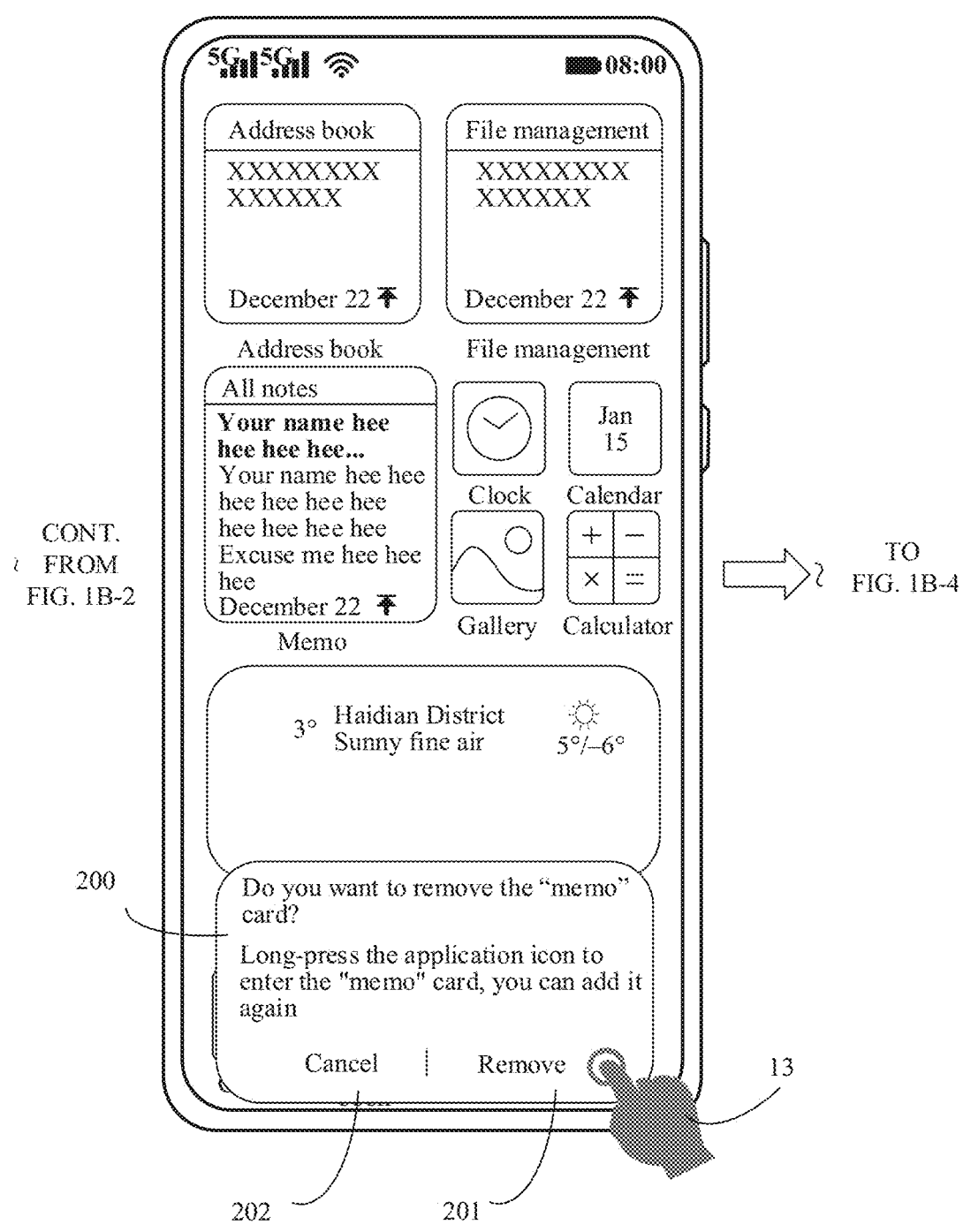
Figures 1, 1B, 2, 3, 4:
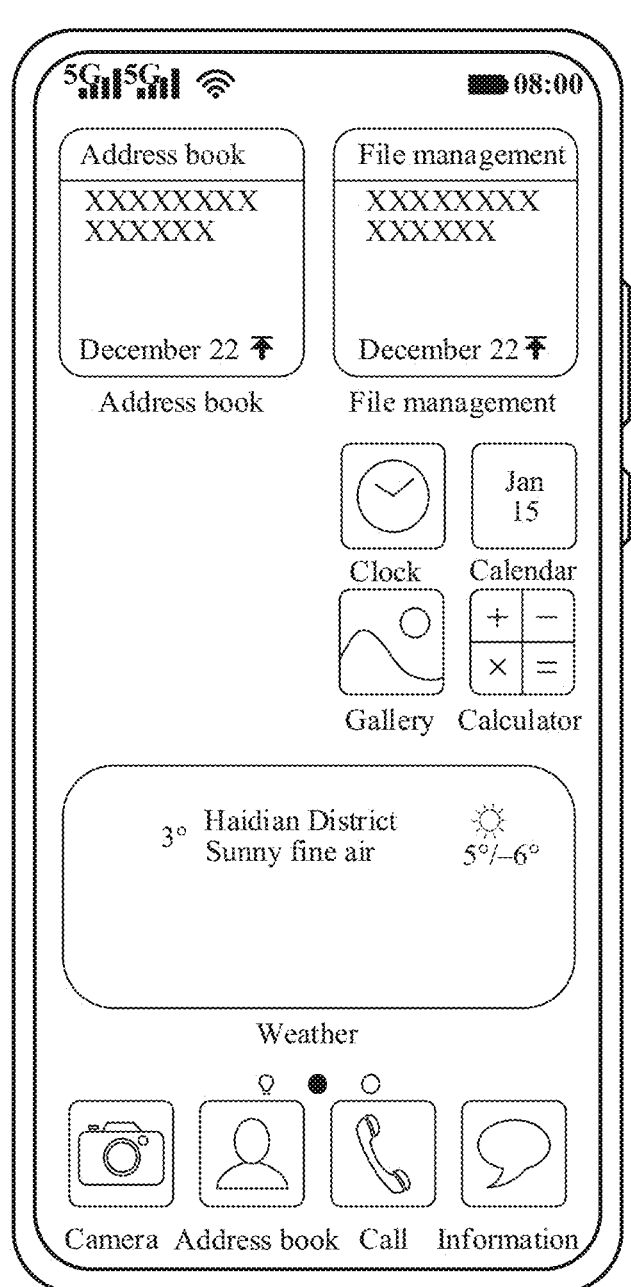
Figures 1, 1C, 2:
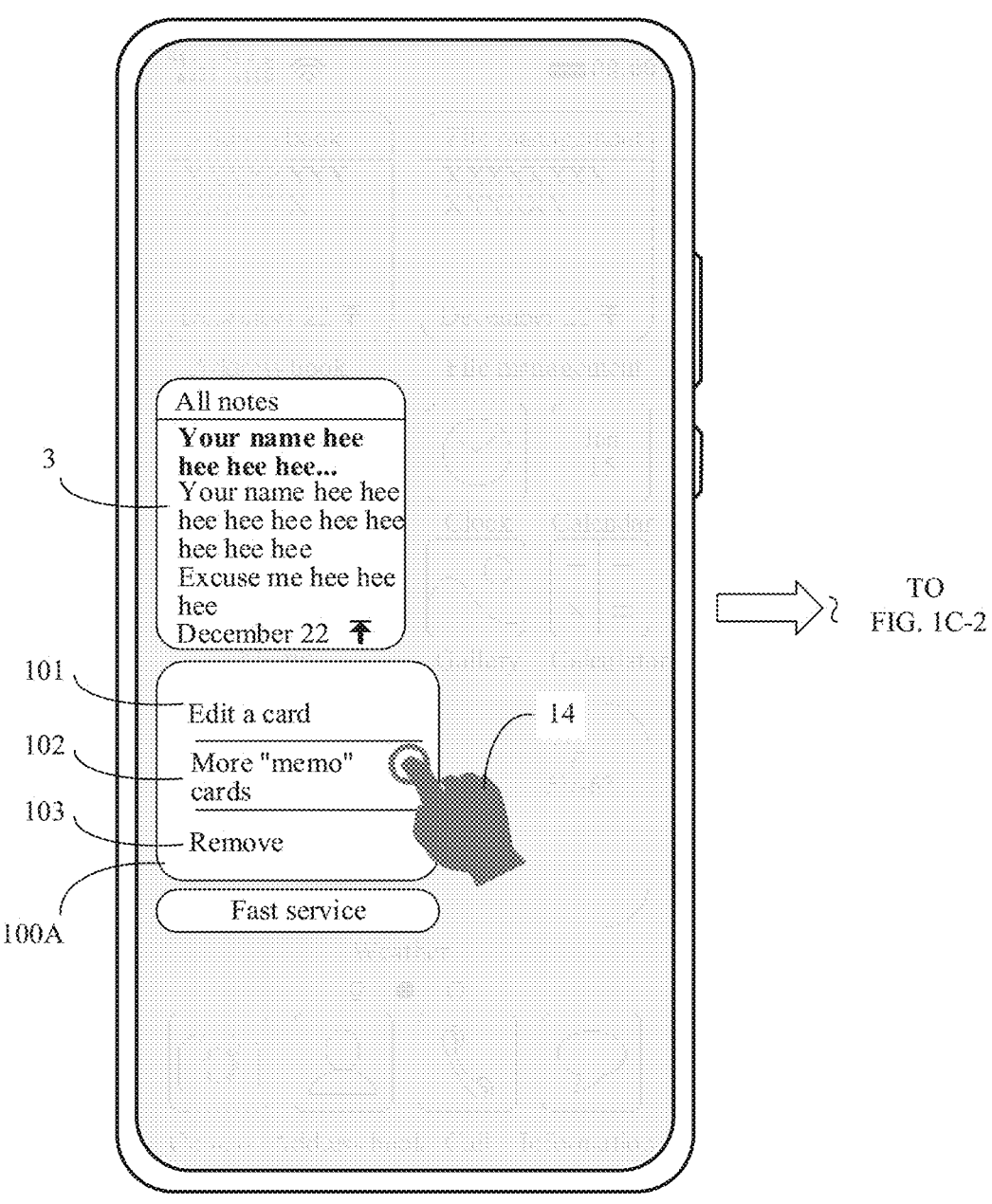
Figures 1, 1C, 2, 3:
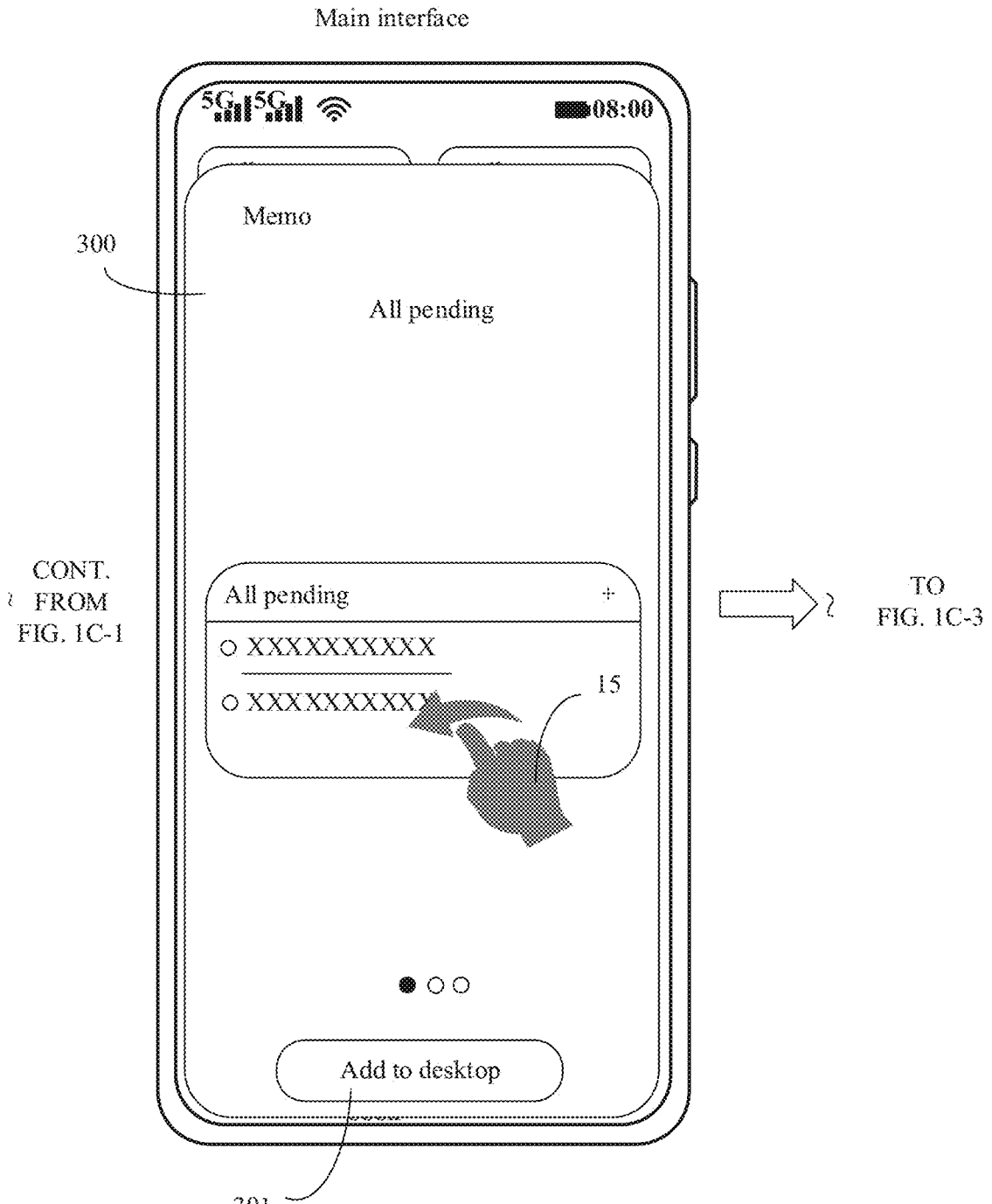
Figures 1, 1C, 2, 3, 4:
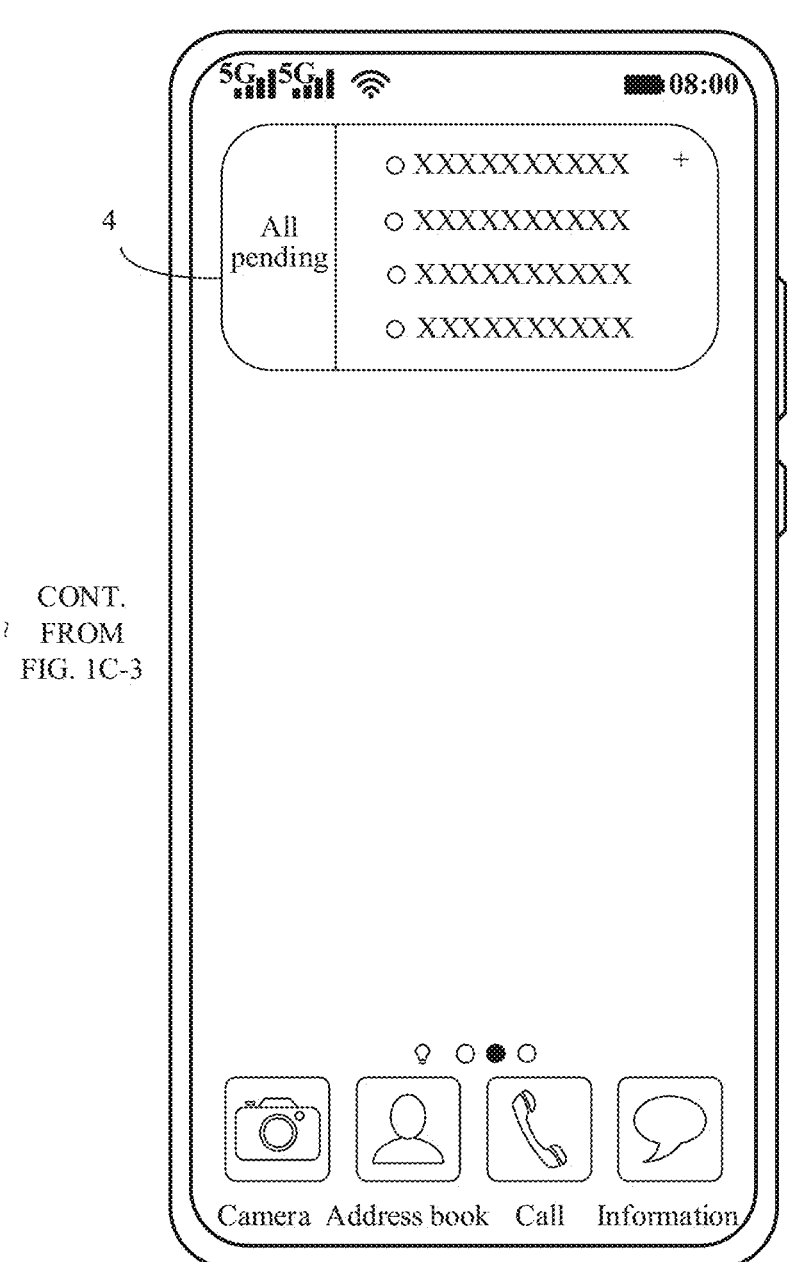
Figures 1, 1D:
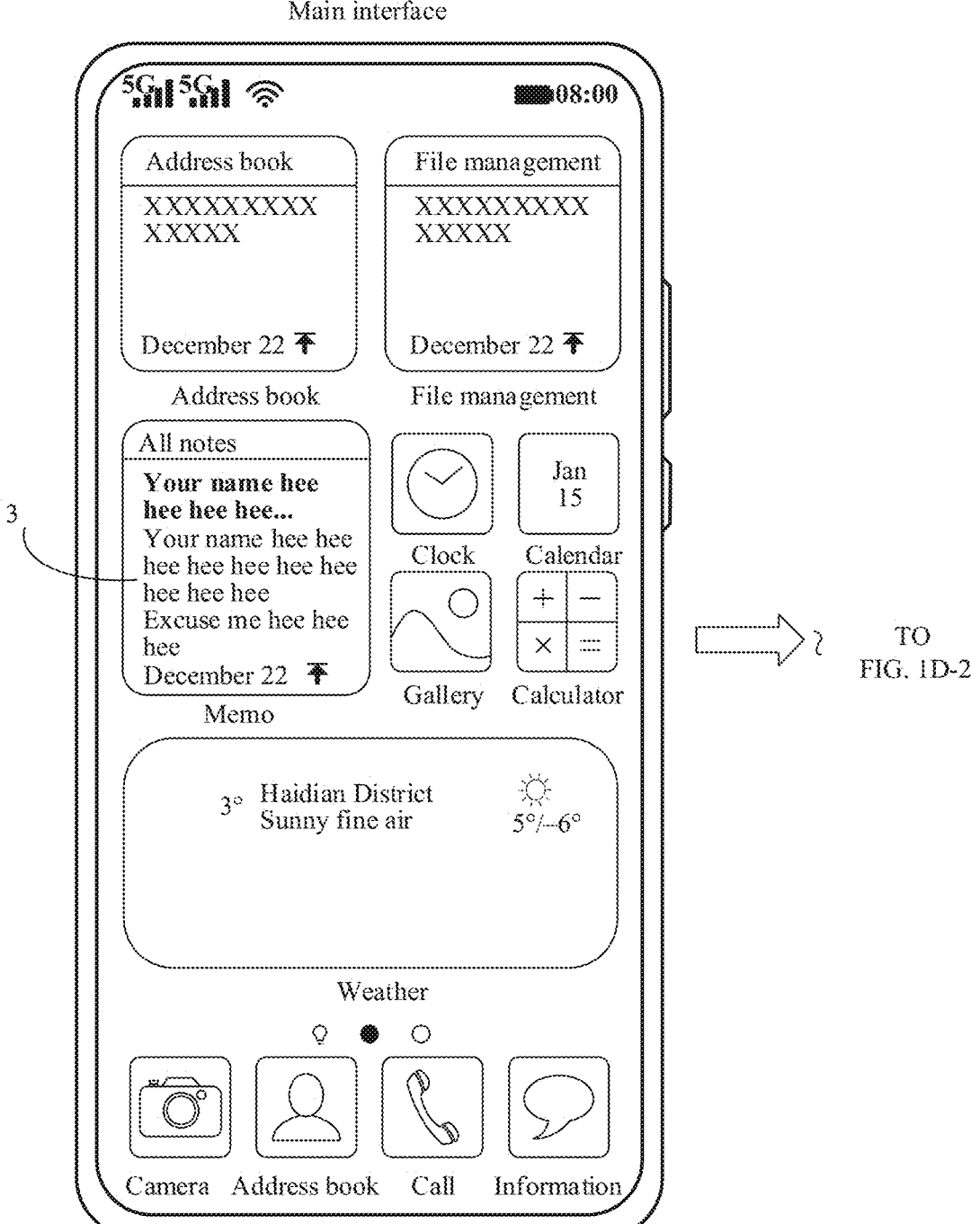
Figures 1, 1D, 2, 3:
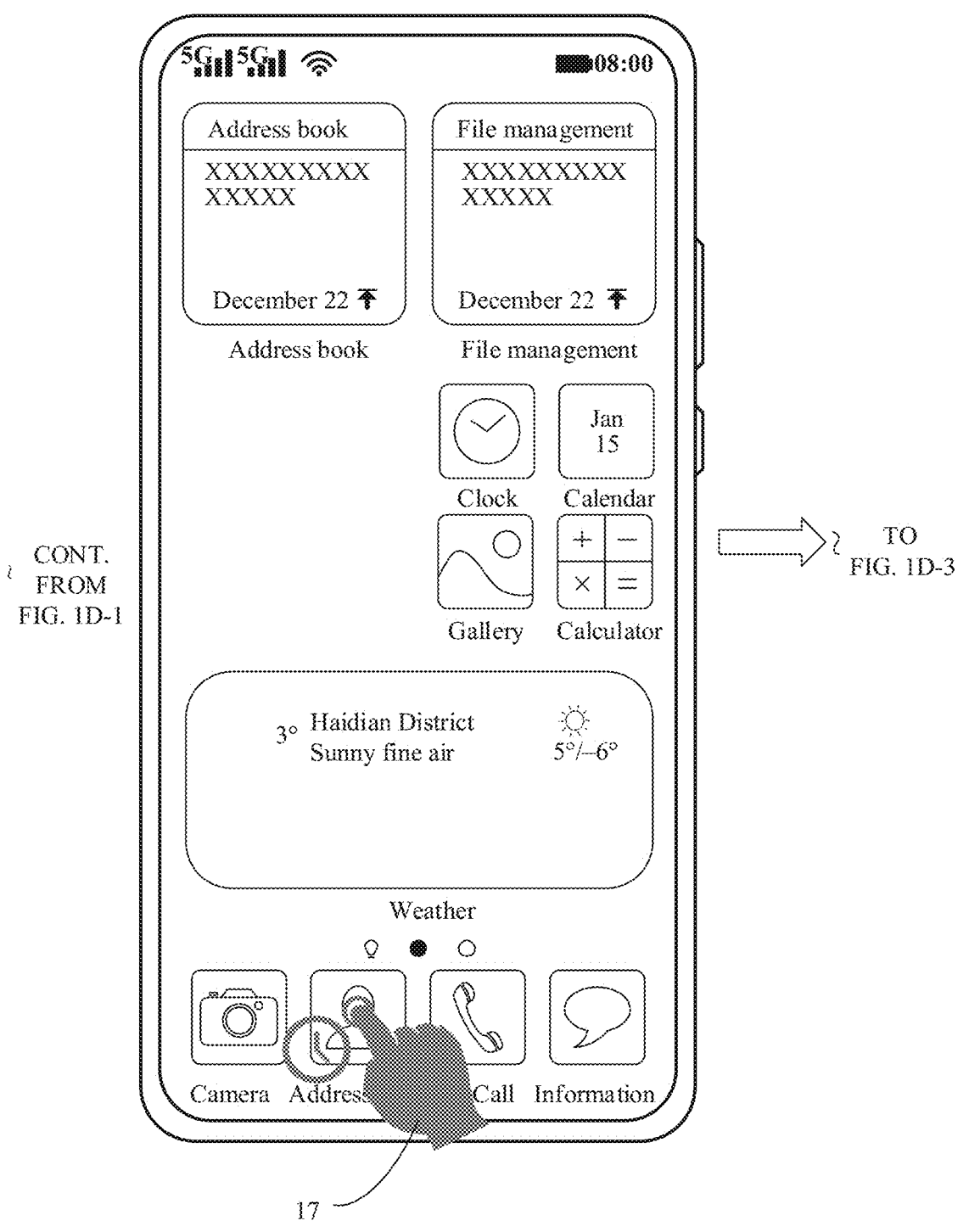
Figures 1, 1D, 2, 3, 4:
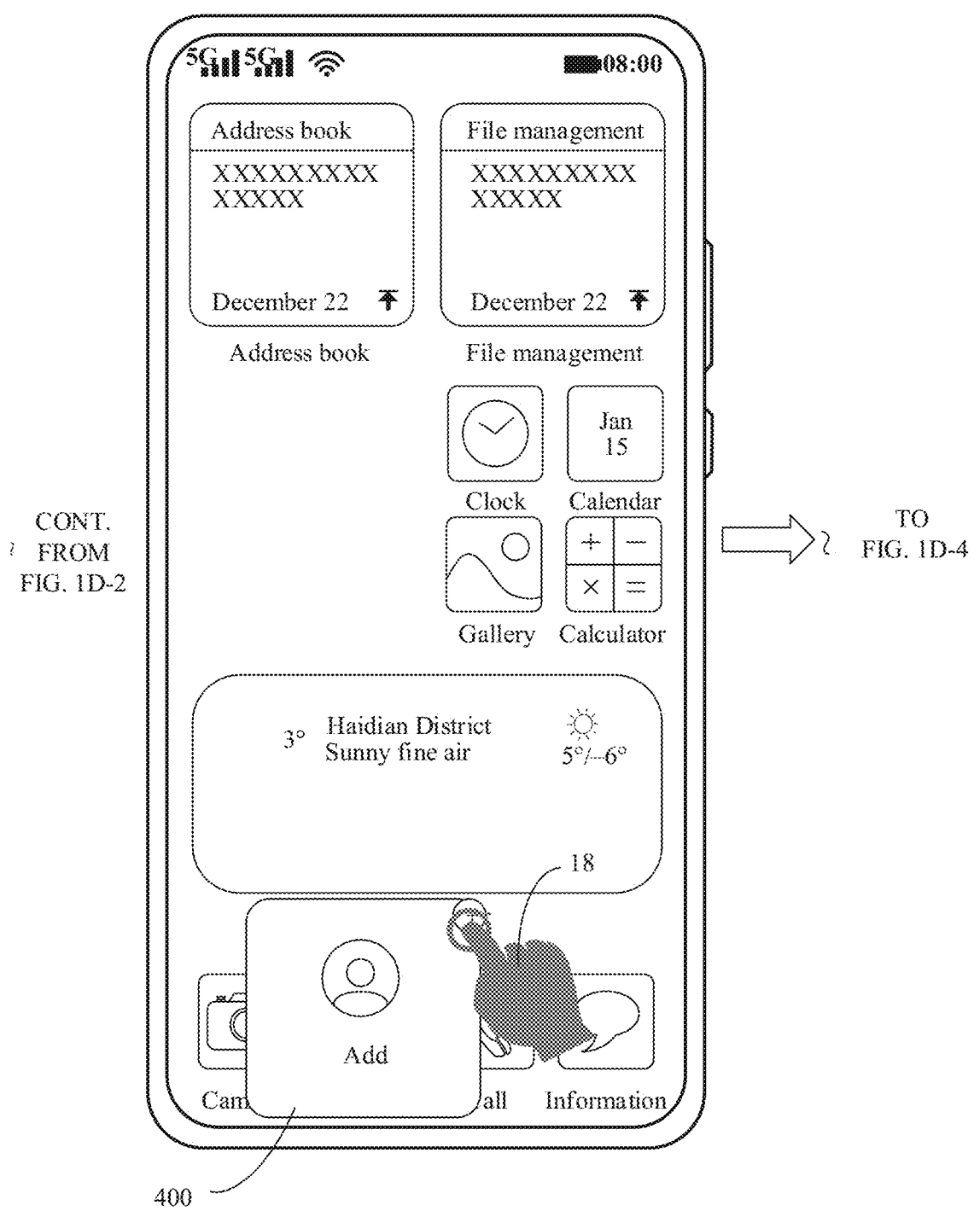
Figures 1, 1D, 2, 3, 4:
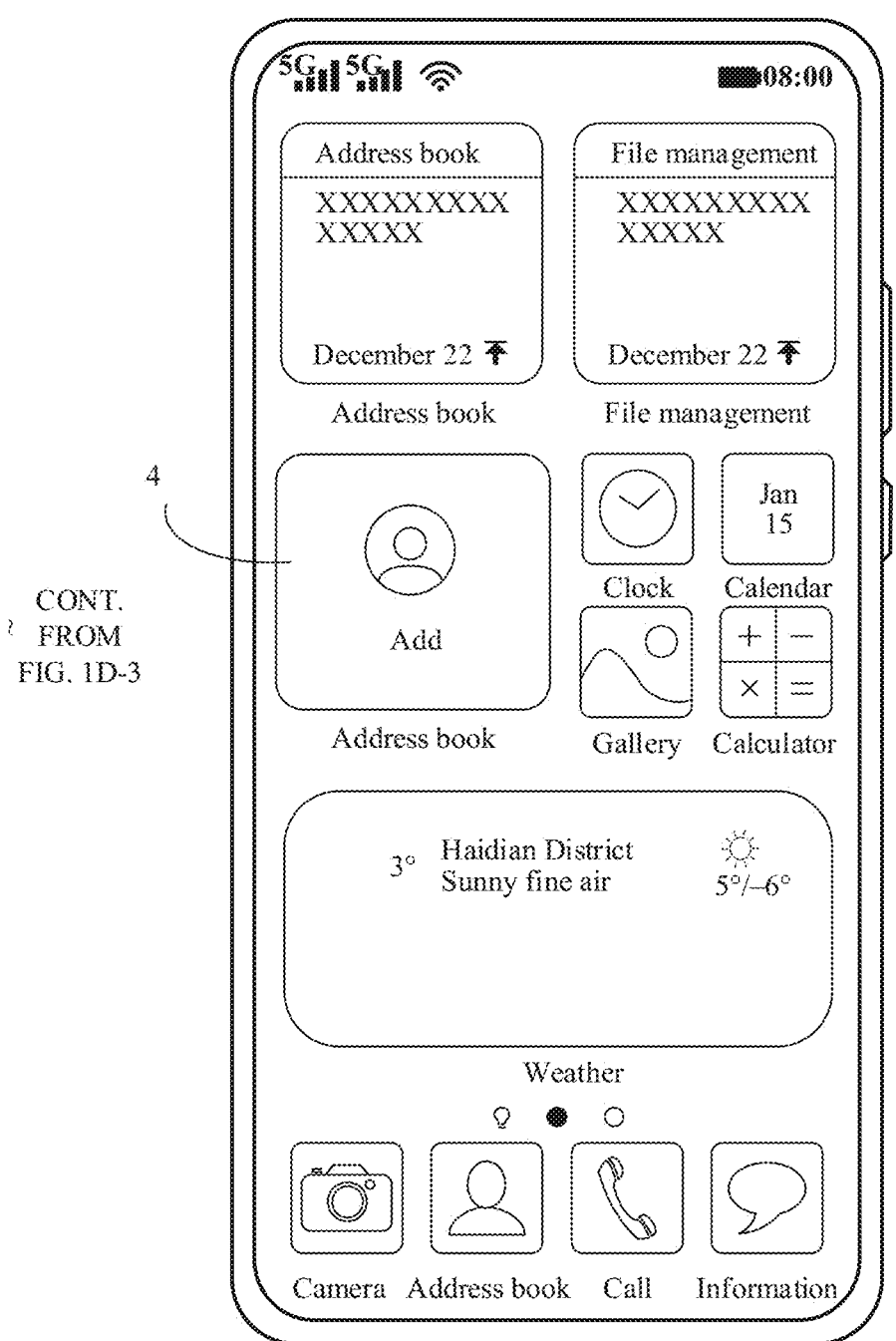
Figure 2:
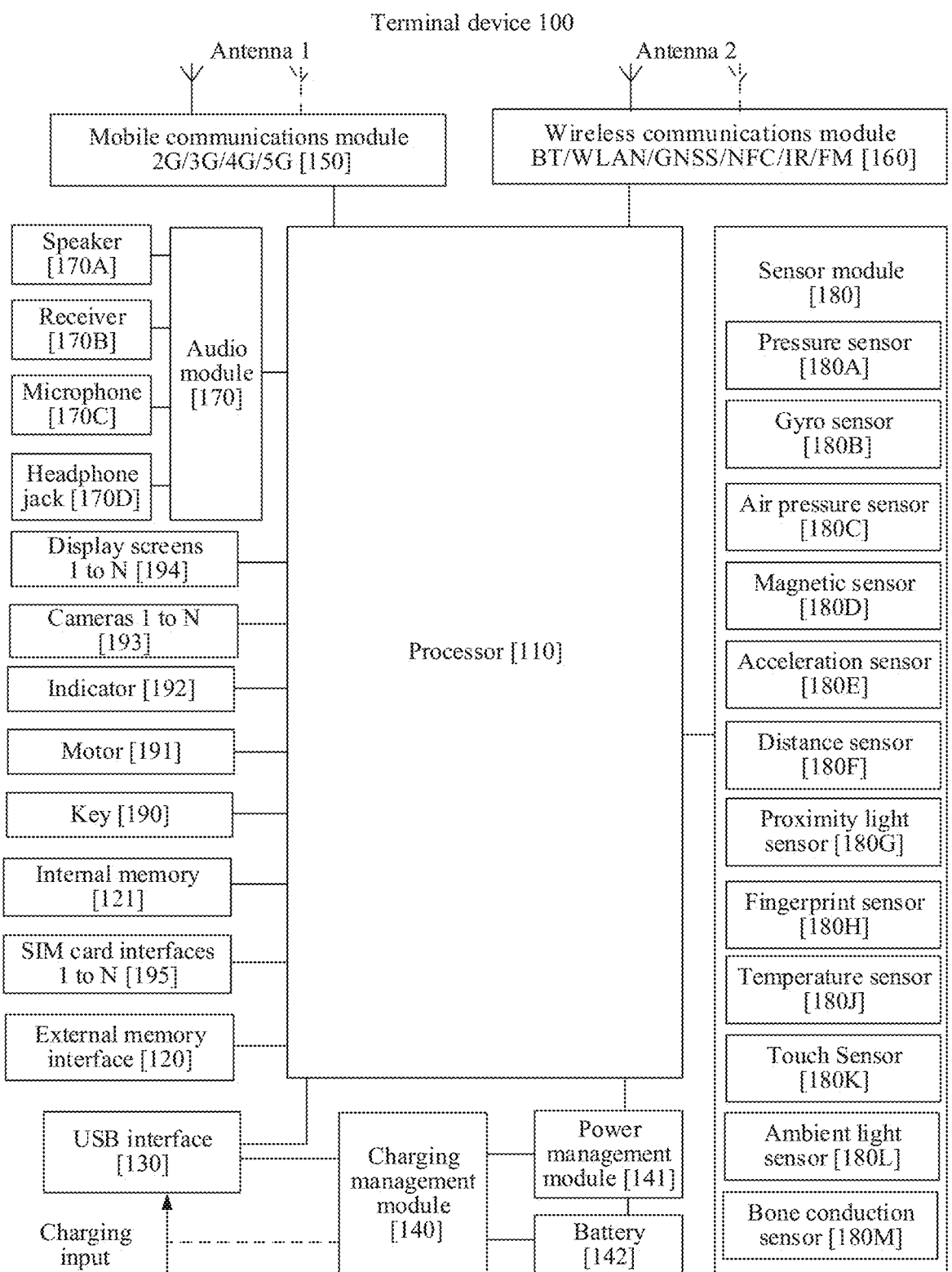
Figure 3:
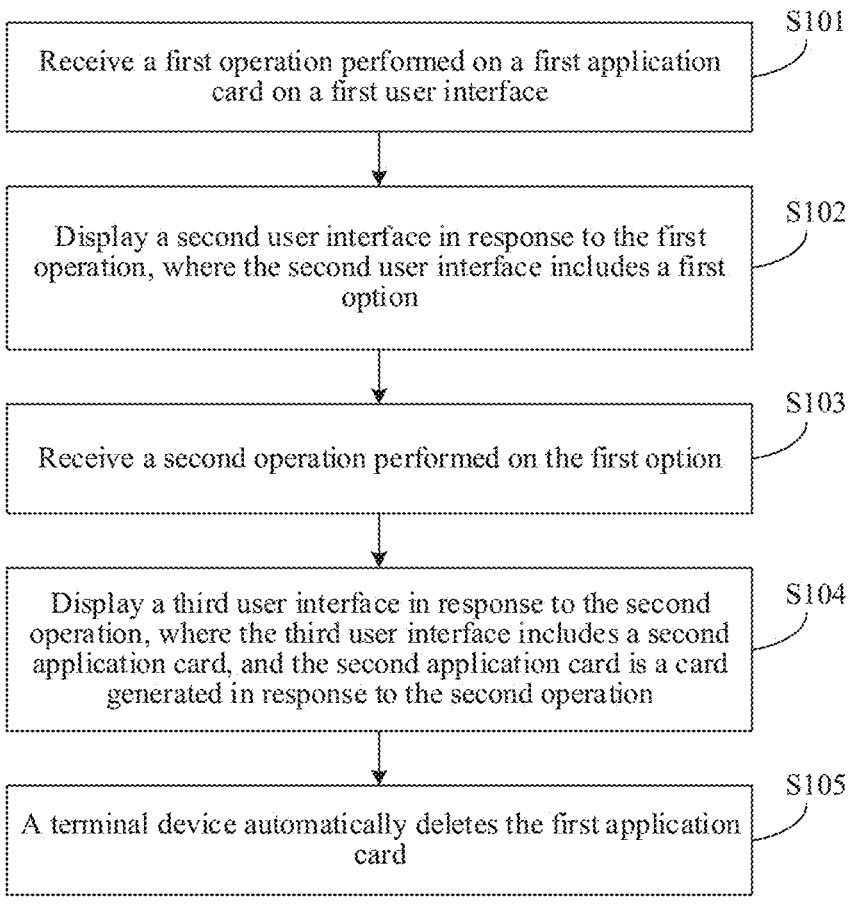

FIG. 3 is a flowchart of an application card replacing method according to an embodiment of the present application.

As shown in FIG. 3, the application card replacing method can be applied to a terminal device 100, and the method can include the following steps:

Step S101: Receive a first operation performed on a first application card on a first user interface.

Step S102: Display a second user interface in response to the first operation, where the second user interface includes a first option.

Step S103: Receive a second operation performed on the first option.

Step S104: Display a third user interface in response to the second operation, where the third user interface includes a second application card, and the second application card is a card generated in response to the second operation.

Step S105: The terminal device automatically deletes the first application card.

The first user interface may be a main interface of the terminal device, the main interface displays at least one application card pre-added by the user, and the first application card is one of the at least one application card. When the user needs to replace any application card in the main interface with a new application card, the terminal device displays the second application card in the third user interface, and deletes the first application card. The first application card corresponds to the replaced application card, and the second application card corresponds to the new application card.

The first user interface and the third user interface are desktops of the terminal device, the second user interface is an interface for the user to set the second application card, and the second user interface includes: one or more of the preview region, the first option, and the like. The first option includes one or more of a parameter setting option, a first control, a second control, and the like, and the first option is used to select a parameter of the second application card.

In this embodiment of the present application, both the first operation and the second operation may include one or more of a sliding operation, a multi-finger sliding operation, a single-click screen operation, a multi-click screen operation, a multi-finger single-click screen operation, and a multi-finger multi-click screen operation performed by the user on the first user interface. This is not specifically limited in the embodiments of the present application. An operation to which the terminal device can respond to trigger the display of the second user interface can be the first operation. An operation to which the terminal device can respond to generate the second application card may be the second operation. The multi-finger sliding operation of the user may be, for example, a multi-finger sliding operation of the user's single hand, or a multi-finger sliding operation of the user's two hands, or a sliding operation of a plurality of fingers in a same direction, or a sliding operation of a plurality of fingers in different directions. This is not specifically limited in the embodiments of the present application. The multi-finger multi-click screen operation of the user may be, for example, a single-hand multi-finger multi-click screen operation of the user, or a two-hand multi-finger multi-click screen operation of the user. This is not specifically limited in the embodiments of the present application.

In some embodiments, the first operation may be a combination of two or more operations, for example, the first operation includes a plurality of sub-operations. In an implementation, the plurality of sub-operations may be continuous operations, that is, the finger is not lifted from the screen during the continuous execution of the plurality of sub-operations. In an implementation, multiple sub-operations may be performed discontinuously, that is, after a first sub-operation is performed, the finger is lifted from the screen, and then a second sub-operation is performed on the screen.

Figure 4A:
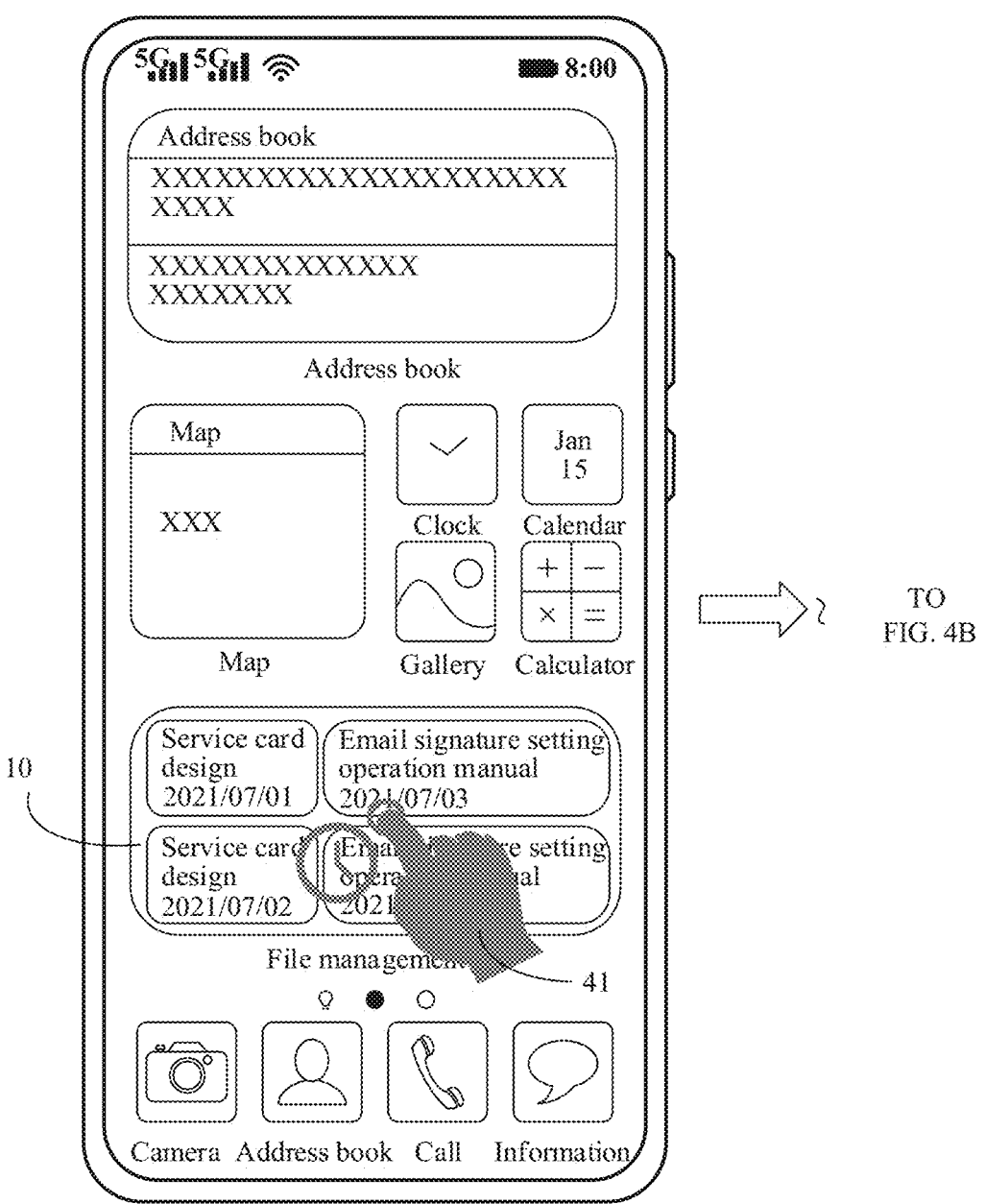
FIG. 4A, FIG. 4B, FIG. 4C, and FIG. 4D are schematic diagrams of displaying a second user interface according to an embodiment of the present application.
Figures 4A, 4B, 4C:
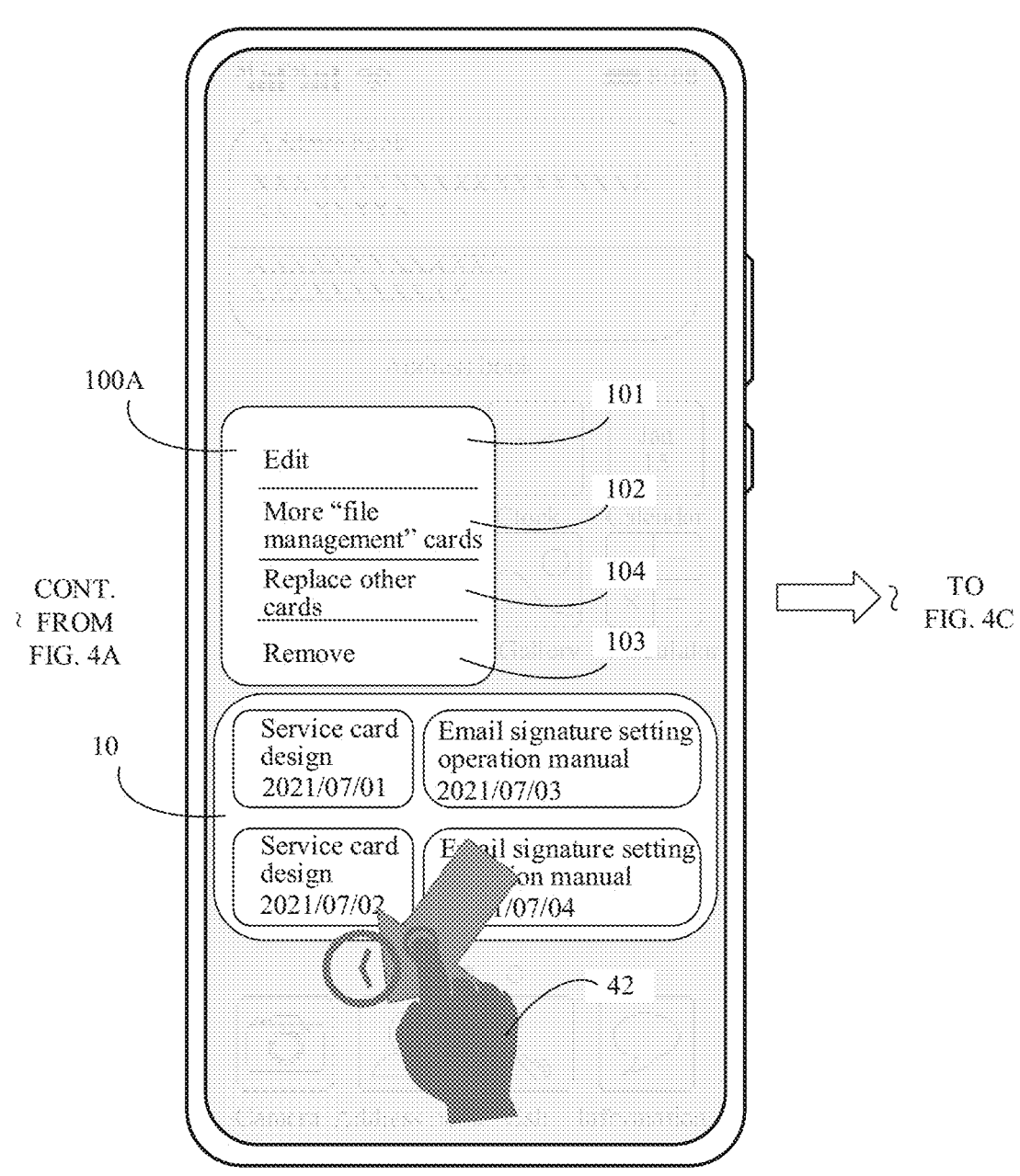
Figure 4C:
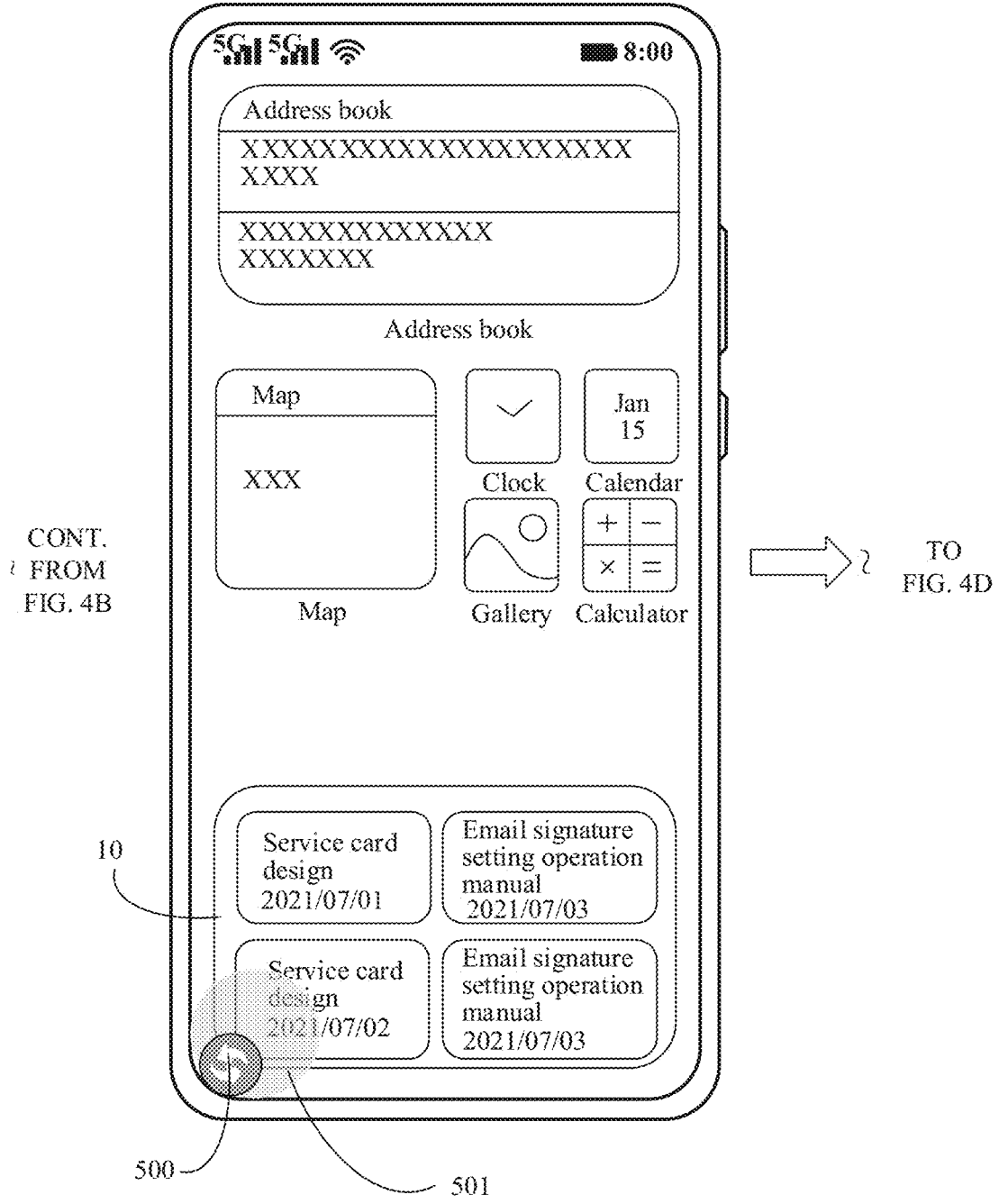
Figures 4C, 4D:
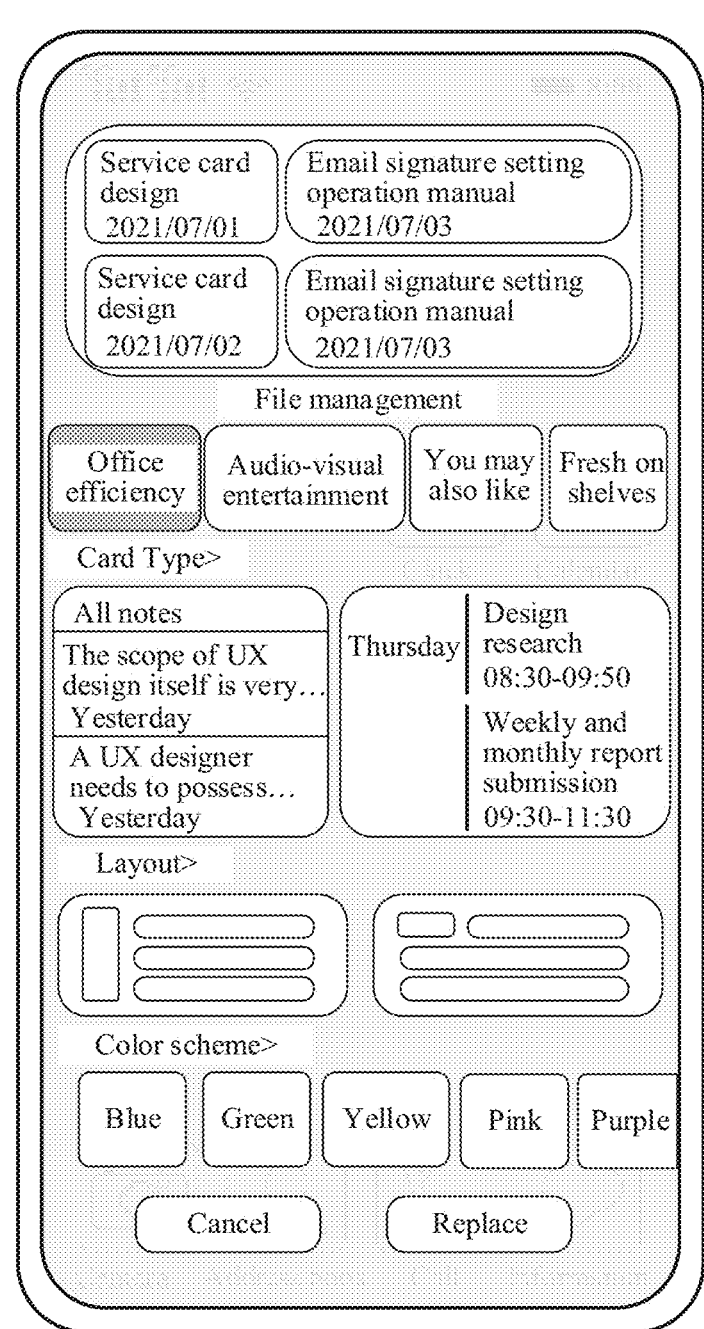

FIG. 4A. FIG. 4B, FIG. 4C, and FIG. 4D are schematic diagrams of displaying a second user interface according to an embodiment of the present application.

In an implementation, as shown in FIG. 4A, FIG. 4B, FIG. 4C, and FIG. 4D, when the second user interface for generating the second application card is switched to and displayed, the first operation may be multiple sub-operations continuously performed by the user on the first user interface. To this end, step S102 may specifically include the following steps S201 to S203:

Step S201: Receive a first sub-operation performed on the first application card.

Step S202: Select the first application card in response to the first sub-operation.

Step S203: Receive a second sub-operation performed on the first application card.

Step S204: Move the first application card to a target position in response to the second sub-operation.

Step S205: Receive a third sub-operation performed on the first application card.

Step S206: Generate the second user interface m response to the third sub-operation.

Exemplarily, the first sub-operation may be an operation in which the user long-presses (41) the first application card 10. The second sub-operation may be an operation of dragging (42) the first application card to a target position, and the third sub-operation may be an operation of lifting the user's finger from the first application card. The first sub-operation, the second sub-operation, and the third sub-operation are performed continuously, that is, the user's finger is always in contact with the screen during the process of executing the first sub-operation and the second sub-operation based on the first application card, and the execution of the third sub-operation is completed when the finger is lifted from the first application card.

In steps S201 and S202, when the terminal device detects that the user performs the first sub-operation on the first application card 10 in the first user interface, for example, long presses (41) the first application card 10, edit pop-up window 100A pops up on a side of the first application card 10 for display, for example, edit pop-up window 100A pops up on an upper side (or a lower side) of the first application card 10. The terminal device performs blurring processing on the first user interface, and adds a blurred mask layer or another non-transparent mask layer on the first user interface, so as to block other display content in the first user interface through the mask layer, and clearly display the first application card 10 and the edit pop-up window 100A.

When the first user interface presents a mask layer, and/or when edit pop-up window 100A is displayed on a side of the first application card 10, it indicates that the first operation has been executed, and then the user slides (42) to the target position with the finger always in contact with the screen.

Exemplarily, the target position may be one of the lower left corner of the screen, the lower right corner of the screen, the center of the bottom of the screen, the upper right corner of the screen, the upper left corner of the screen, the center of the top of the screen, and the like. Then, a target sliding direction can be one of a direction of sliding to the lower left corner of the screen, a direction of sliding to the lower right corner of the screen, a direction of sliding to the center of the bottom of the screen, a direction of sliding to the upper right corner of the screen, a direction of sliding to the upper left corner of the screen, a direction of sliding to the center of the top of the screen, and the like.

In steps S203 and S204, when the terminal device detects that the user performs a second sub-operation on the first application card 10 in the first user interface, for example, drags (42) the first application card to the target position of the screen, the target position of the screen displays prompt region 500, for example, prompt region 500 is located at the lower left corner of the screen. The terminal device may also cancel the display of edit pop-up window 100A, and restore the first user interface to a visible state. That is, when dragging (42) the first application card at the target position on the user's screen, the user can see other content displayed in the first user interface.

As the user drags (42) the first application card 10 to the lower left corner, a distance between the first application card 10 and prompt region 500 becomes closer. When the first application card 10 is in contact with the prompt region 500, the terminal device displays a prompt animation 501 around the prompt region 500. The prompt animation 501 is used to prompt the user to perform the third sub-operation to trigger the display of the second user interface. An initial area of the prompt animation 501 is the same as that of the prompt region 500, and is in a state of diverging to the surroundings. For example: as the first application card 10 is dragged (42) so that a contact area between the first application card and the prompt region 500 gradually increases, a divergence area of the prompt animation 501 around the prompt region 500 also gradually increases, that is, a degree of diverging around gradually increases. When the first application card 10 responds to the dragging (42) operation so that the contact area between one end of the first application card 10 and the prompt region 500 reaches the maximum, the degree of divergence of the prompt animation 501 reaches the maximum.

In steps S205 and S206, when the terminal device detects that the user performs a third sub-operation on the first application card 10, for example, when the user's finger is lifted from the first application card, the second user interface is generated.

Figures 5A, 5B:
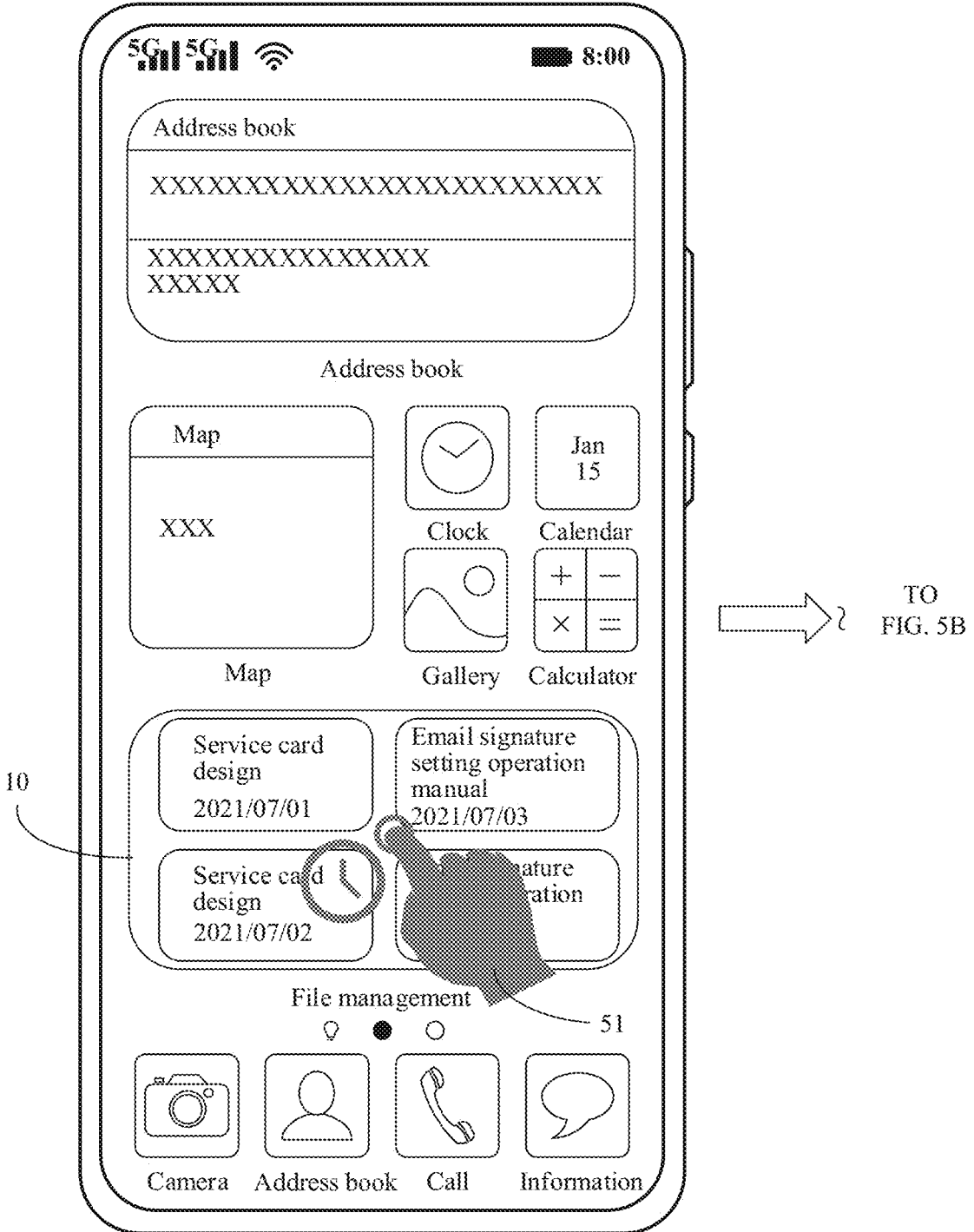
FIG. 5A, FIG. 5B, and FIG. 5C are other schematic diagrams of displaying a second user interface according to an embodiment of the present application.
Figures 5A, 5B, 5C:
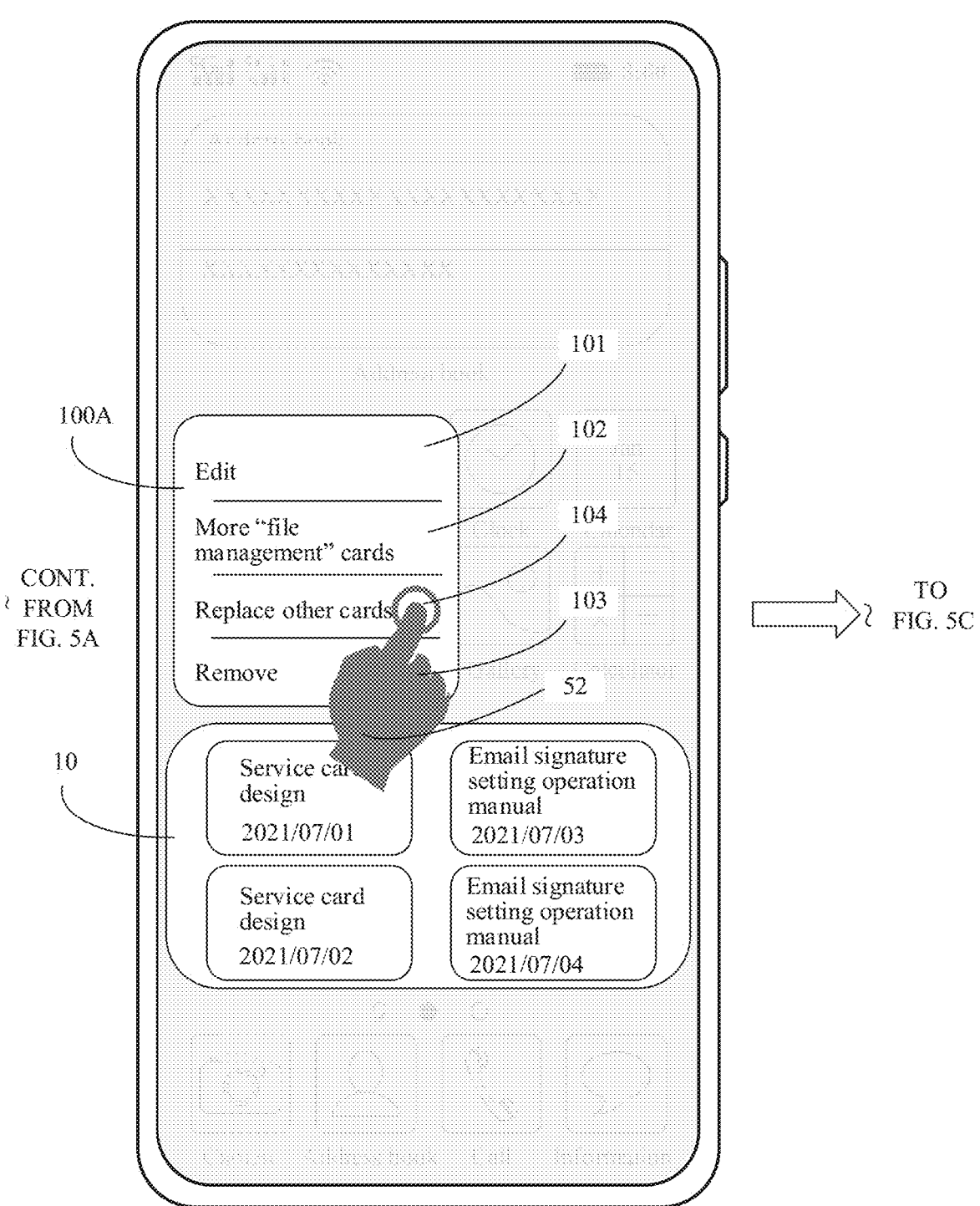
Figures 5B, 5C:
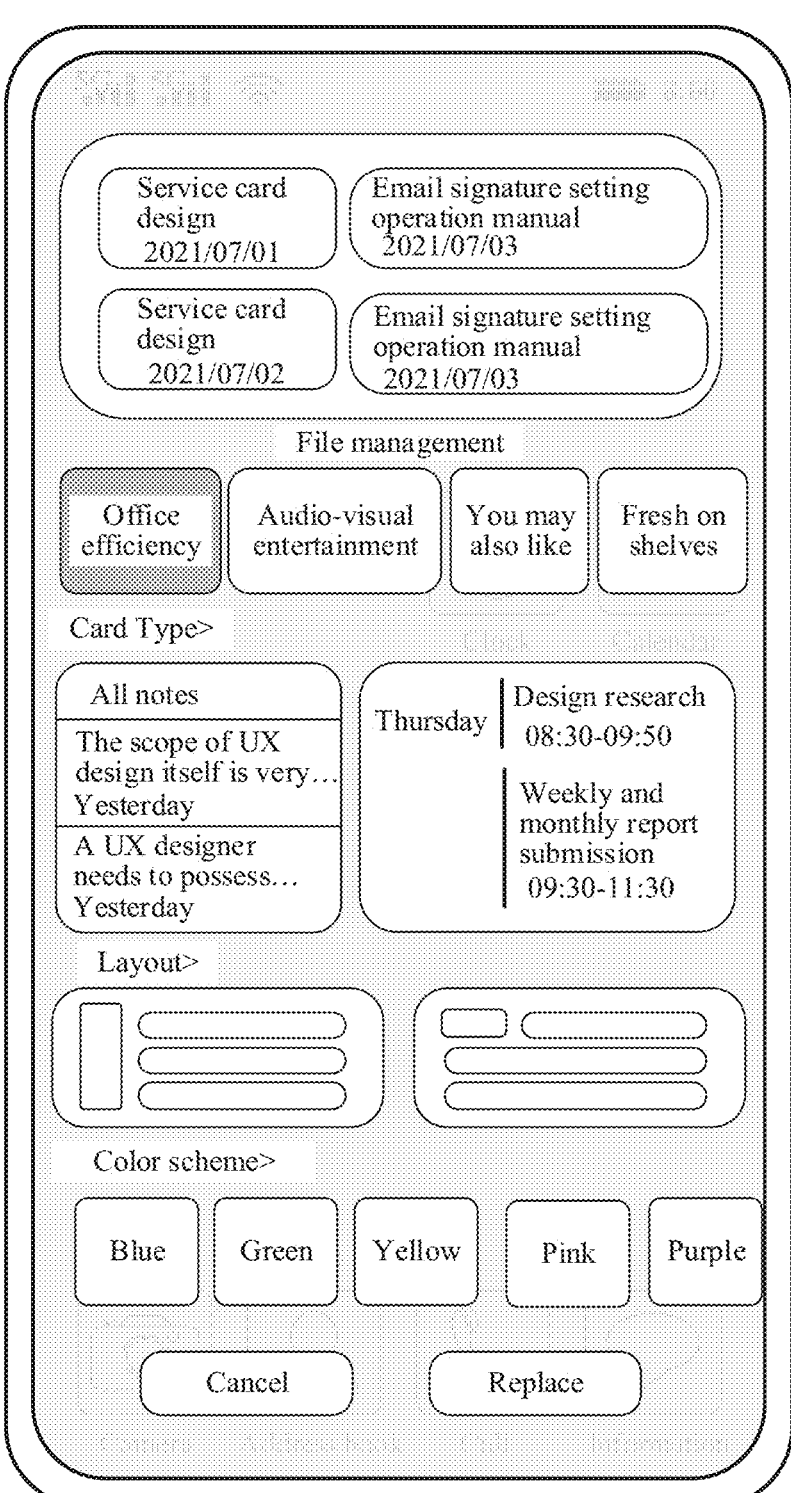

FIG. 5A, FIG. 5B, and FIG. 5C are other schematic diagrams of displaying a second user interface according to an embodiment of the present application.

In an implementation, as shown in FIG. 5A, FIG. 5B, and FIG. 5C, when the second user interface for generating the second application card is switched to and displayed, the first operation may be multiple sub-operations discontinuously performed by the user on the first user interface. To this end, step S102 may specifically include the following steps S301 to S302:

Step S301: Receive a fourth sub-operation performed on the first application card.

In S302: In response to the fourth sub-operation, select the first application card, and display an edit pop-up window on a side of the first application card, where the edit pop-up window includes a third control.

In S303: Receive a fifth sub-operation performed on the third control.

Step S304: Generate the second user interface in response to the fifth sub-operation.

Exemplarily, the fourth sub-operation may be a long-press screen operation, that is, an operation in which the user long-presses (51) the first application card 10. The fifth sub-operation may be a single-click screen operation, that is, an operation in which the user clicks (52) on the screen. The fourth sub-operation and the fifth sub-operation are performed discontinuously, that is, the user first performs the first operation based on the first application card 10, then lifts the finger from the screen, and then performs the second operation.

In steps S301 and S302, when the terminal device detects that the user performs the fourth sub-operation on the first application card 10 in the first user interface, for example, long presses (51) the first application card 10, edit pop-up window 100A pops up on a side of the first application card 10 for display. The terminal device performs blurring processing on the first user interface, and adds a blurred mask layer or another non-transparent mask layer on the first user interface, so as to block other display content in the first user interface through the mask layer, and clearly display the first application card 10 and the edit pop-up window 100A.

Multiple controls are displayed in the edit pop-up window 100A, and the plurality of controls include but are not limited to edit item 101, adding item 102, replacing item 104, removing item 103, and so on. The edit pop-up window provided by the embodiments of the present application can provide more operation functions than currently commonly used edit boxes, that is, replacing item 104 is configured in the edit pop-up window provided by the embodiments of the present application, such as the "replace other cards" item in FIG. 5A, FIG. 5B, and FIG. 5C, to implement the replacement of the application card at the original position. For the editing function, adding function, and removing function provided by the edit pop-up window 100A, refer to content of currently commonly used editing boxes provided in the foregoing embodiments, and details will not be described herein.

In steps S303 and S304, when the third control is the replacing item 104, and the terminal device detects that the user performs the fifth sub-operation on the replacing item 104 in the edit pop-up window 100A, for example, single-clicks (52) the replacing item 104 in the edit pop-up window 100A, the second user interface is generated and displayed on the screen of the terminal device for replacement.

The embodiments of the present application provide the above two manners of triggering the display of the second user interface through the user's operation. One manner is that the user long-presses the first application card and drags the first application card to the target position, and then lifts the finger at the target position, to trigger generation of the second user interface. The other manner is that the user lifts the finger from the screen after long-pressing the first application card, and then clicks on the replacing item in the edit box, to trigger generation of the second user interface. Both triggering manners can be used to generate the second user interface for configuring parameters of the second application card, and can be applied in different scenarios, so that the user can replace the application card at the original location, and the user's interaction experience is better. It should be noted that the manner in which the second user interface may be generated may also be a combination of other operations or other generation manners, which will not be repeated or limited herein.

Figure 6:
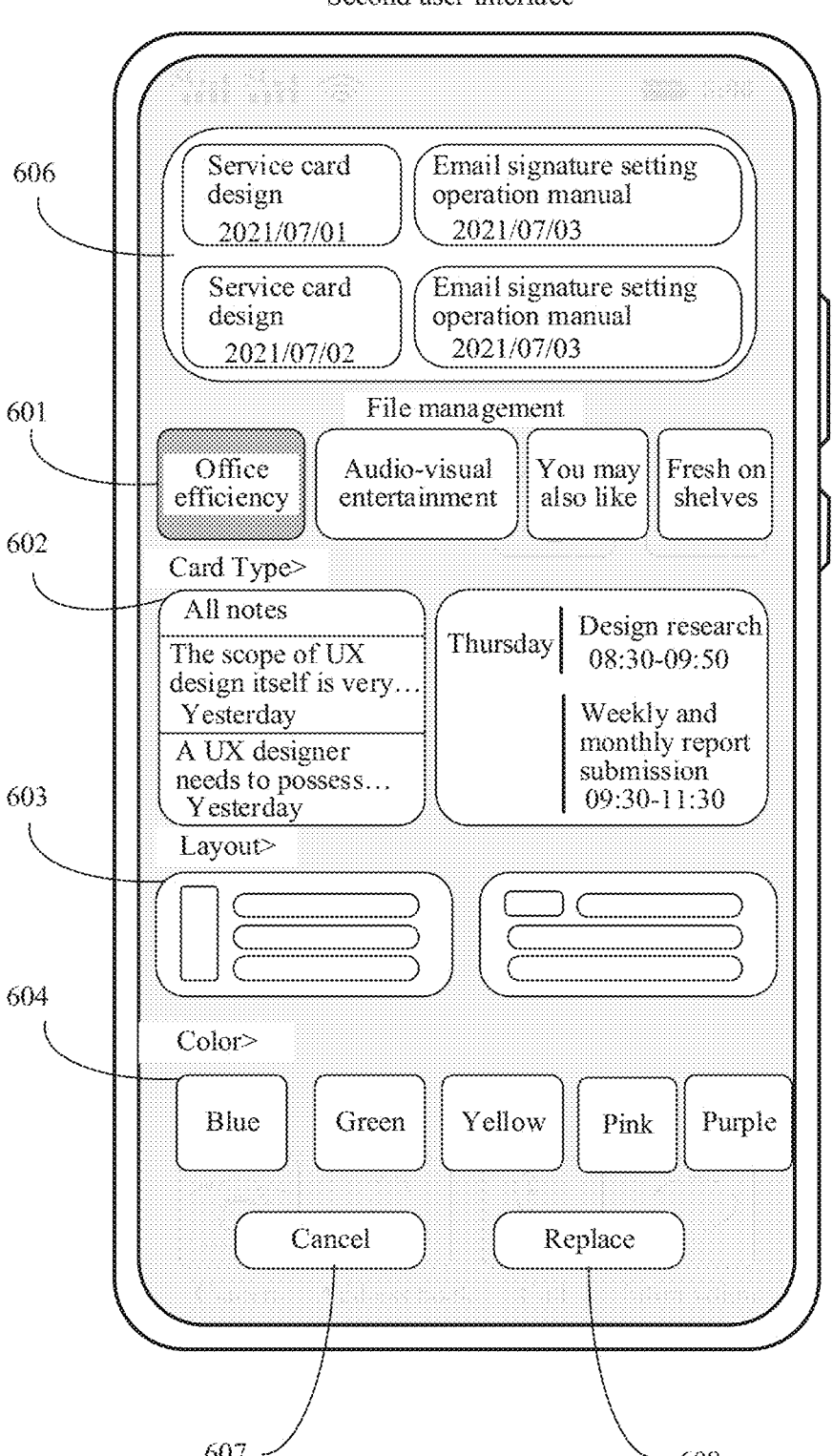
FIG. 6 is a schematic diagram of a second user interface according to an embodiment of the present application.

FIG. 6 is a schematic diagram of a second user interface according to an embodiment of the present application.

As shown in FIG. 6, to facilitate the user to generate the second application card based on the second user interface, the second user interface includes a first option and a preview region, and the first option includes a first control, a second control, and at least one parameter setting option for generating the second application card. Each parameter setting option is used to select a parameter for generating the second application card. The second user interface can allow the user to customize at least one or more parameters such as a size, a color, a layout, a card type, and an application type of the application card, to complete the integration of customization and convenient interaction. The first control may include a replacing button 608 and the second control may include a cancel button 607.

In this embodiment of the present application, the parameter setting option includes at least one or a combination of an application type parameter setting option 601, a card type parameter setting option 602, a layout parameter setting option 603, a color parameter setting option 604, and a size parameter setting option. The application type parameter setting option 601 is used to provide different application categories, such as one or more of application types such as office efficiency, audio-visual entertainment, guess what you like, and fresh supply on shelves. An application category corresponds to at least one application. The card type parameter setting option 602 is used to provide application cards corresponding to different applications under the same application type (that is, the same application category). For example, under an application type of office efficiency, the option can provide applications such as memo and schedule, and then the card type is an application card corresponding to applications such as memo and schedule. The application card provided by the memo application is an "all notes" card, and the application card provided by the schedule application is a "schedule" card. The layout parameter setting option 603 is used to provide a plurality of layout manners for different information displayed on the application card. When two parts of content, that is, a title and a content, are displayed on the application card, the layout refers to a relative positional relationship between the title and the content, for example, the title and the content are a left-right layout structure, and the title and the content are a top-bottom layout structure. The color parameter setting option 604 provides a plurality of color blocks for changing a display color of the application card, such as changing the background color. The size parameter setting option is used to provide a plurality of sizes of application cards, such as 2×2, 4×2, and 4×4. Different sizes are selected, and a shape of the application card may be set to be a square, a rectangle, or the like.

In an implementation, the user can complete parameter setting of the second application card by making corresponding selections on each parameter setting option in the second user interface. To ensure that the user can view the display effect of the set second application card in real time after completing the operation corresponding to the parameter setting option, a preview region 606 may also be displayed in the second user interface in the embodiments of the present application. The preview region can be displayed on the top or the bottom of the second user interface, and the remaining part is used to display the content of each parameter setting option. The state shown in FIG. 6 is a state in which the preview region 606 is located at the top of the second user interface.

In an implementation, due to the limited display region of the second user interface, when various parameter setting options are displayed on the second user interface, the options may not be simultaneously presented in the visible region of the second user interface. As a result, the second user interface includes a first parameter setting option located within the field of view of the display screen of the terminal device and a second parameter setting option located outside the field of view of the display screen region of the terminal device. To this end, some parameter setting options can be displayed in the visible region of the second user interface, while the rest of the parameter setting options are displayed in the invisible region of the second user interface. When the user needs to operate the parameter setting option in the invisible region, the terminal device moves the second parameter setting option into the field of view of the display screen of the terminal device in response to the fifth operation performed by the user on the second user interface. Exemplarily, the fifth operation may include a sliding (71) operation, then the user performs the sliding (71) operation on the second user interface, and the terminal device displays, in the visible region of the second user interface, the parameter setting options in the invisible region by sliding, to facilitate the user to perform an interaction operation.

Figure 7A:
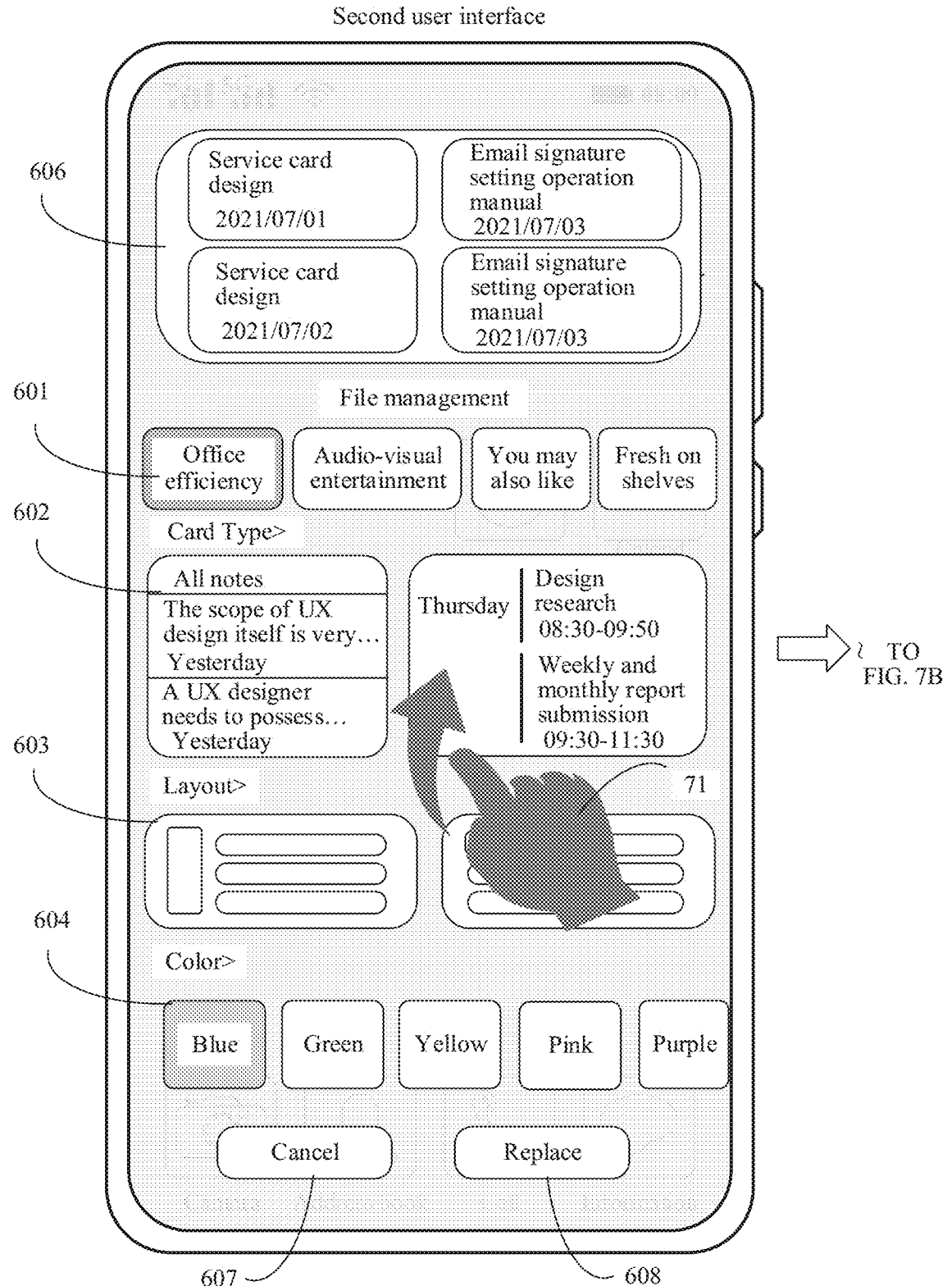
FIG. 7A and FIG. 7B are schematic diagrams of sliding a second user interface according to an embodiment of the present application.
Figure 7B:
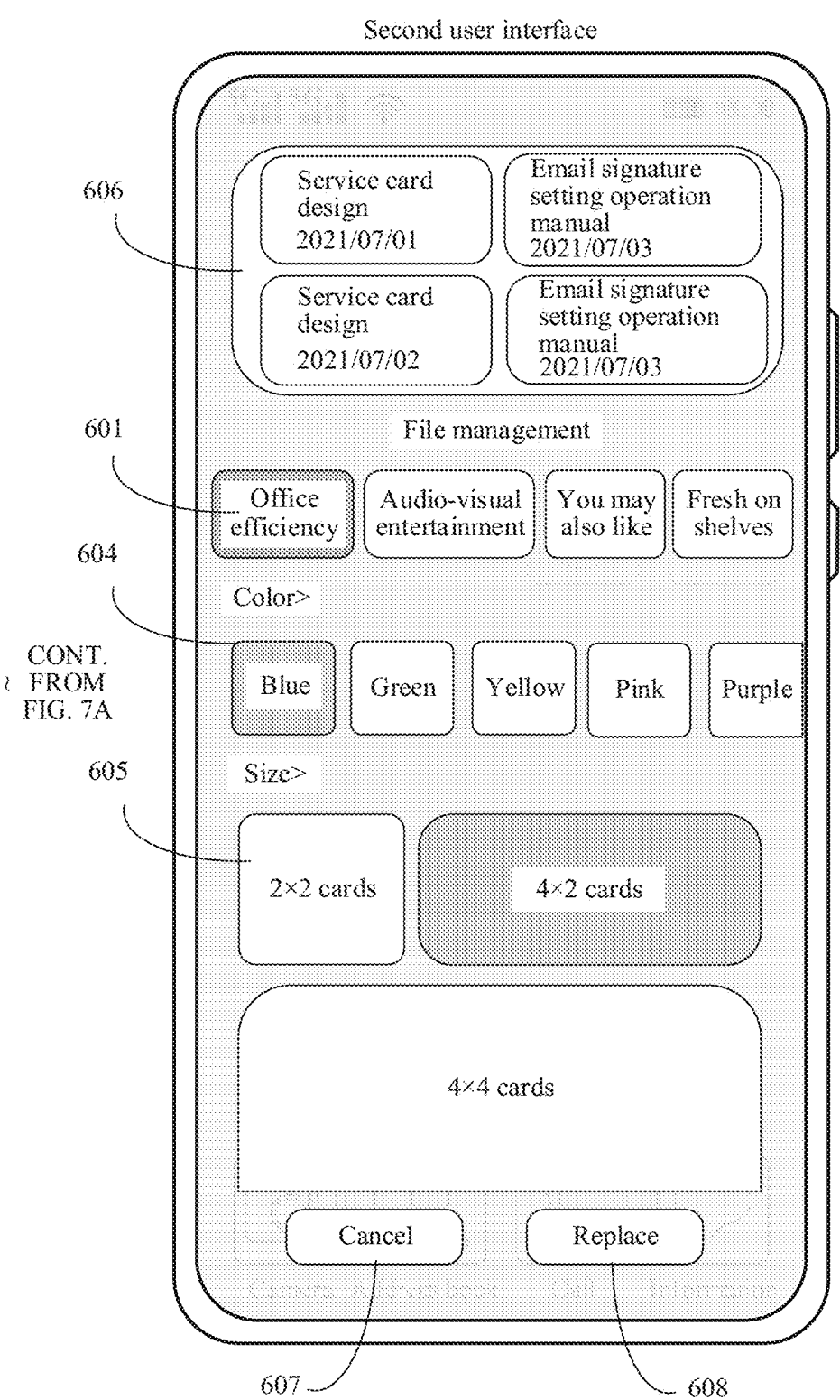

FIG. 7A and FIG. 7B are schematic diagrams of sliding a second user interface according to an embodiment of the present application.

As shown in FIG. 7A and FIG. 7B, to facilitate the user to operate the parameter setting options that are not displayed in the visible region of the second user interface, the terminal device responds to the sliding (71) operation performed by the user on the second user interface, and displays, in the visible region by sliding, the parameter setting options originally not displayed in the visible region.

Exemplarily, if a sorting manner of parameter setting options in the second user interface is to put the size parameter setting option at the last position, the size parameter setting option 605 is located in the invisible region of the second user interface. Then, when the user needs to change the size of the second application card, the size parameter setting option 605 is displayed in the visible region of the second user interface through an upward sliding (71) operation. In response to the user's upward sliding (71) operation on the second user interface, the terminal device slides upward the parameter setting options in the invisible region to display the options in the visible region of the second user interface. If the user wants to view the parameter setting options that are slid into the invisible region by sliding upwards, the terminal device slides downwards the parameter setting options in the invisible region in response to the user's downward sliding operation on the second user interface, to display the options within the viewable region of the second user interface.

When sliding upwards or downwards the second user interface, the preview region 606, the application type parameter setting option 601, the cancel button 607, and the replacing button 608 are fixed, and the rest of the parameter setting options move along the sliding direction.

In an implementation, when the user sets relevant parameters of the second application card based on the various parameter setting options provided by the second user interface, since each parameter setting option provides a plurality of parameter setting option contents and the horizontal space of the screen is limited, it is impossible to display, in the visible region of the second user interface, the content of a plurality of parameter setting options provided by the target parameter setting option. Therefore, to facilitate the user to select a parameter setting option content located relatively behind, the terminal device may respond to the leftward or rightward sliding operation performed by the user on the target parameter setting option, so as to display more parameter setting option contents through the sliding operation within the viewable region of the second user interface.

When leftward or rightward sliding is performed on the second user interface, for the target parameter setting option in response to the leftward or rightward sliding operation, a corresponding parameter setting option content is switched along the sliding direction, while the remaining parameter setting options, preview region 606, cancel button 607, and replacing button 608 are fixed.

In an implementation, the second user interface further includes a cancel button 607 and a replacing button 608, the cancel button 607 is used to cancel the replacement operation of the application card, and the replacing button 608 is used to determine the replacement operation of the application card, so as to determine the generation of the second application card.

In an implementation, the second user interface is an interface presented after the user performs the first operation on the first application card in the first user interface. Therefore, the first application card 10 is displayed by default in the preview region 606 of the second user interface, and a control focus corresponding to each parameter setting option selects a corresponding parameter of the first application card by default. Therefore, when the parameter of the second application card is not configured, the terminal device uses the parameter of the first application card as the default parameter of the second application card, and displays a preview image of the second application card in the preview region.

Exemplarily, the terminal device obtains a configuration parameter of the first application card, including: an application type is "office efficiency", a card type is "file management", a layout is tiled, a color is beige, and a size is 4×2. Then, in combination with the contents shown in FIG. 6 and FIG. 7A and FIG. 7B, in response to obtaining the parameter of the first application card, the terminal device displays an application card with the application type "office efficiency", the card type "file management", the layout of tiled, the color of blue, and the size of 4×2 in the preview region 606 in the second user interface. Besides, the terminal device controls the application type parameter setting option 601 in the second user interface to select "office efficiency" by default, controls the card type parameter setting option 602 to select the style of "file management" by default, controls the color parameter setting option 604 to select the blue block by default, and controls the size parameter setting option 605 to select the size item of 4×2 by default. Since the "file management" style type may not have title and content division, regardless of whether layout uses a left-right or top-bottom layout structure, the presentation effect is a tiled effect. Therefore, in the layout parameter setting option 603, the layout may not be selected by default, or a first layout mode provided by the layout parameter setting option may be selected by default.

In an implementation, the control focus corresponding to each parameter setting option in the second user interface may not select a corresponding parameter of the first application card by default, and instead sequential display is performed according to a sequence of the parameter setting option content provided by each parameter setting option, and the selected state of the control focus is not displayed on each parameter setting option content. Alternatively, the control focus selects, by default, a first parameter setting option content provided by each parameter setting option.

It can be understood that, the foregoing manners of displaying the initial state of the second user interface may be determined according to actual application conditions, and are not specifically limited in this embodiment of the present application.

In this embodiment of the present application, the application type parameter setting option 601 belongs to a main parameter setting option, the card type parameter setting option 602 and the layout parameter setting option 603 belong to an auxiliary parameter setting options, and the color parameter setting option 604 and the size parameter setting option 605 belong to general parameter setting options. Then, when the user switches between different application types based on the application type parameter setting option 601, the content of the parameter setting option provided as the auxiliary parameter setting options is changed along with the switching of the main parameter setting option. However, the content of the parameter setting options provided as general parameter setting options is not changed along with the switching of the main parameter setting option, that is, the content of the parameter setting option provided by the general parameter setting option remains unchanged.

Exemplarily, when the user selects the "office efficiency" type in the application type parameter setting option 601, the card type parameter setting option 602 provides application cards of different applications corresponding to the "office efficiency" type, such as application cards corresponding to applications such as memo and calendar. The layout parameter setting option 603 provides a layout manner that meets display requirements of application cards such as all notes and schedule, such as a left-right layout structure and a top-bottom layout structure. When the user selects the "audio-visual entertainment" type in the application type parameter setting option 601, the card type parameter setting option 602 provides application cards of different applications corresponding to the "audio-visual entertainment" type, such as applications corresponding to applications such as music and video; and the layout parameter setting option 603 provides a layout manner that meets display requirements of music, video, and the like, such as a tiled layout structure.

In an implementation, when each parameter setting option is displayed in the second user interface, the application type parameter setting option (a main parameter setting option) that causes changes in the option content of other parameter setting options is displayed first, and then the parameter setting option (an auxiliary parameter setting options) that may change along with the switching of the application type is then displayed, and finally the parameter setting option (a general parameter setting option) that does not change along with the switching of the application type is displayed.

For example, when the preview region 606 is displayed on the top of the second user interface, the application type parameter setting option 601 is displayed below the preview region 606. The card type parameter setting option 602 and the layout parameter setting option 603 are displayed below the application type parameter setting option 601, and a sequence between the card type parameter setting option and the layout parameter setting option is not limited. Finally, the color parameter setting option 604 and the size parameter setting option 605 are displayed, and a sequence between the color parameter setting option and the size parameter setting option is not limited.

In an implementation, a display sequence of each parameter setting option displayed on the second user interface may also be determined according to actual application conditions, which is not specifically limited herein.

FIG. 8A, FIG. 8B, FIG. 8C, FIG. 8D, FIG. 8E, FIG. 8F, and FIG. 8G are schematic diagrams of setting a second application card based on a second user interface according to an embodiment of the present application.

Figure 8A:
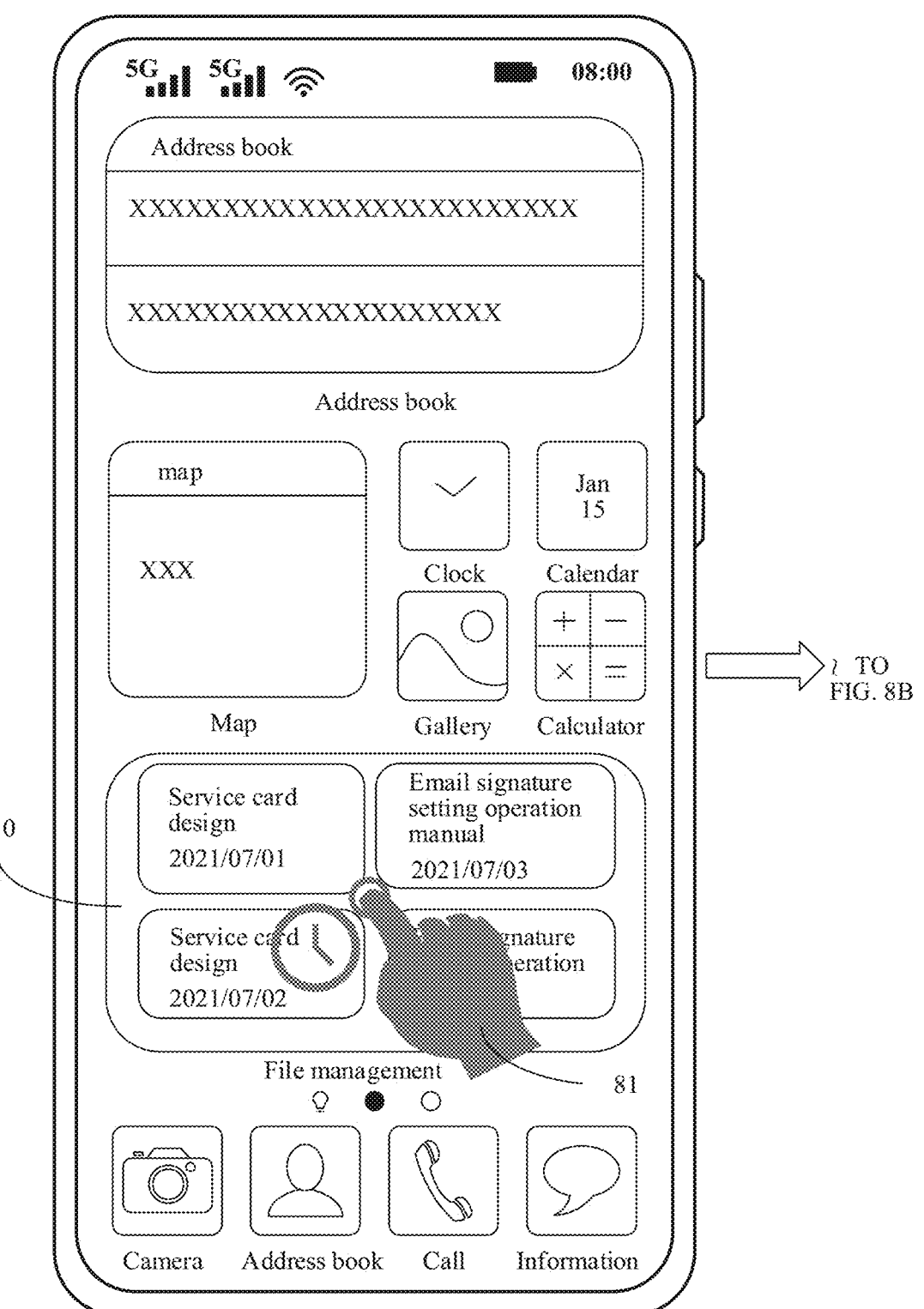
FIG. 8A.
Figures 8A, 8B, 8C:
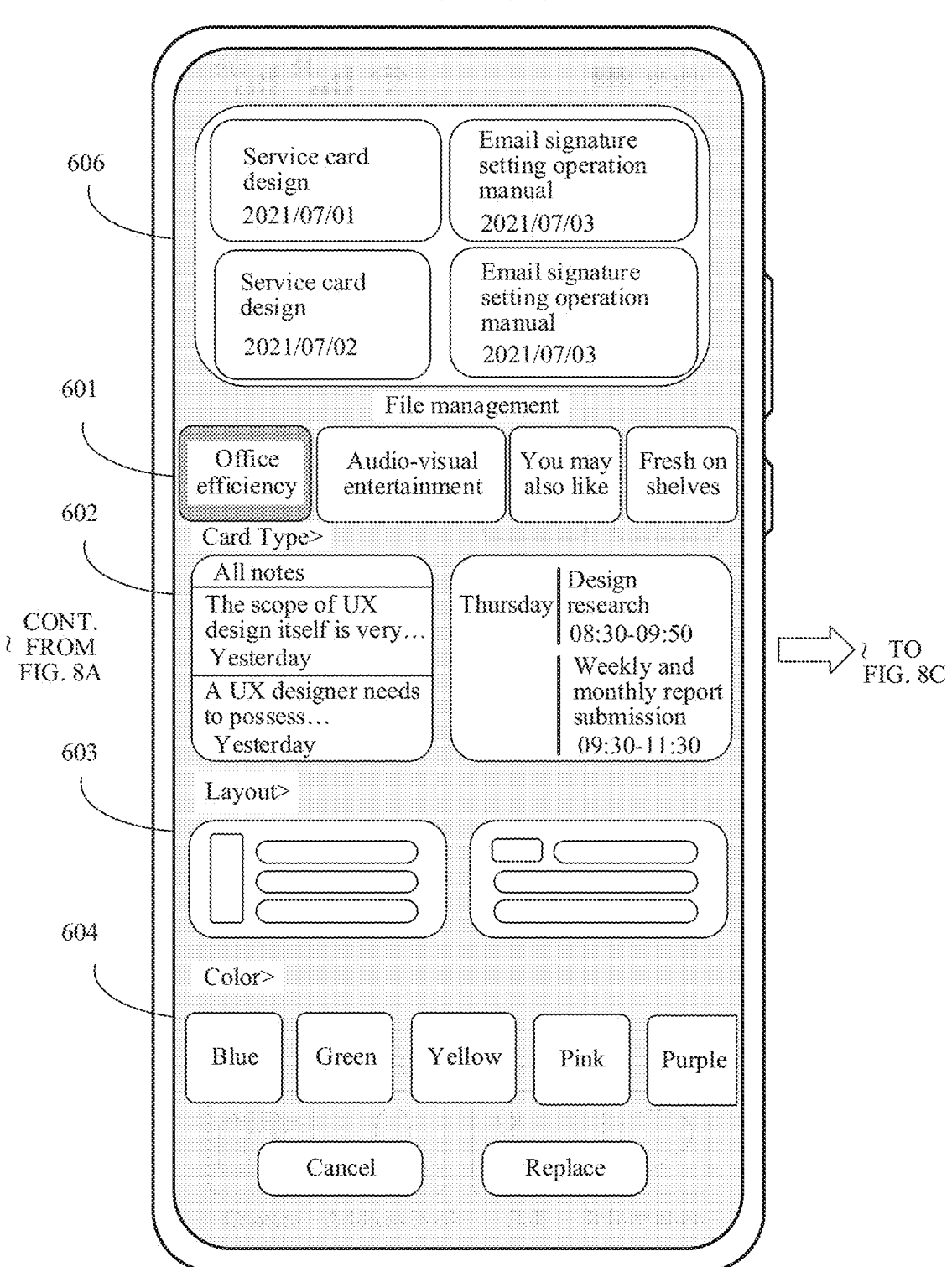
FIG. 8B, FIG. 8C.
Figure 8C:
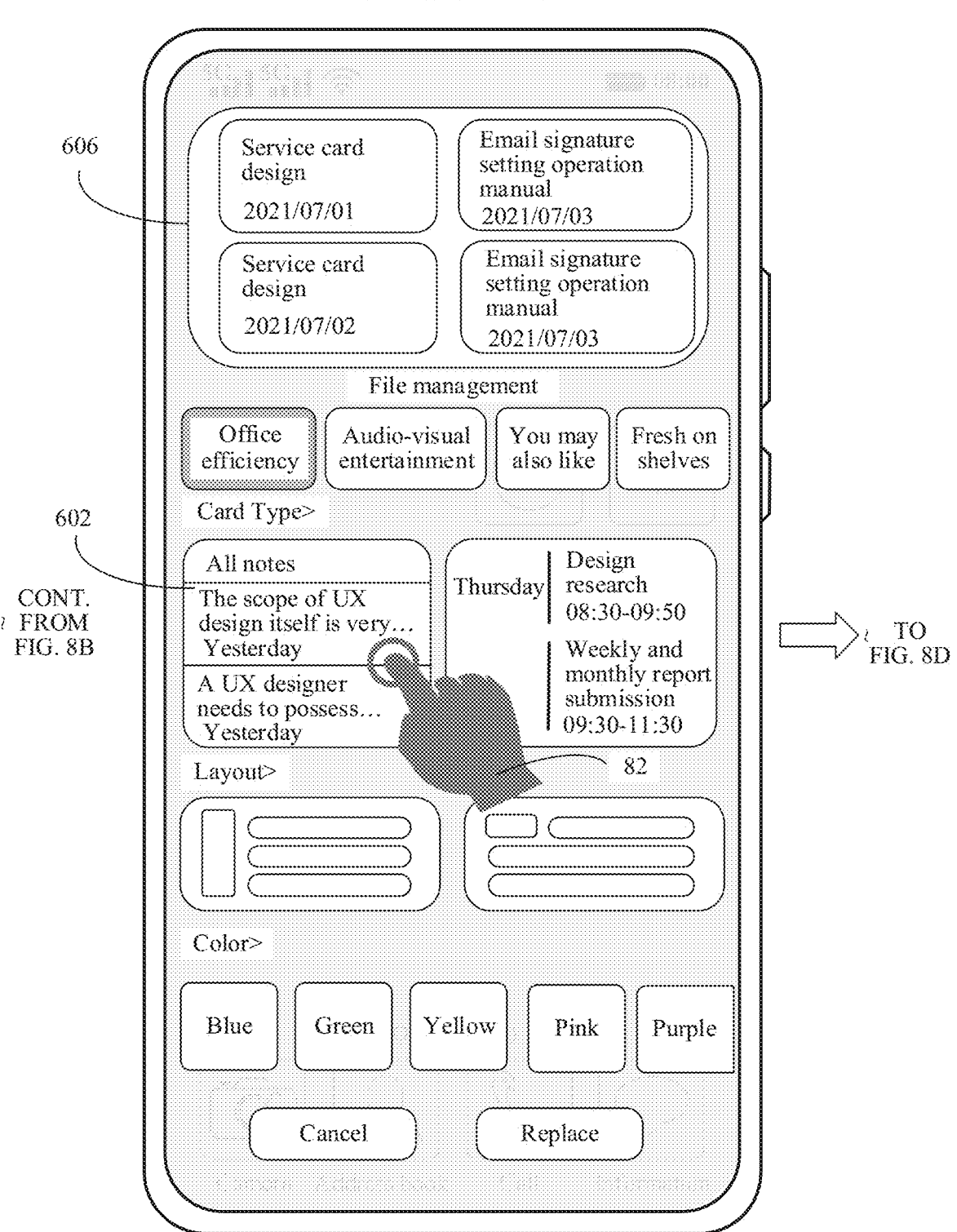
Figures 8C, 8D:
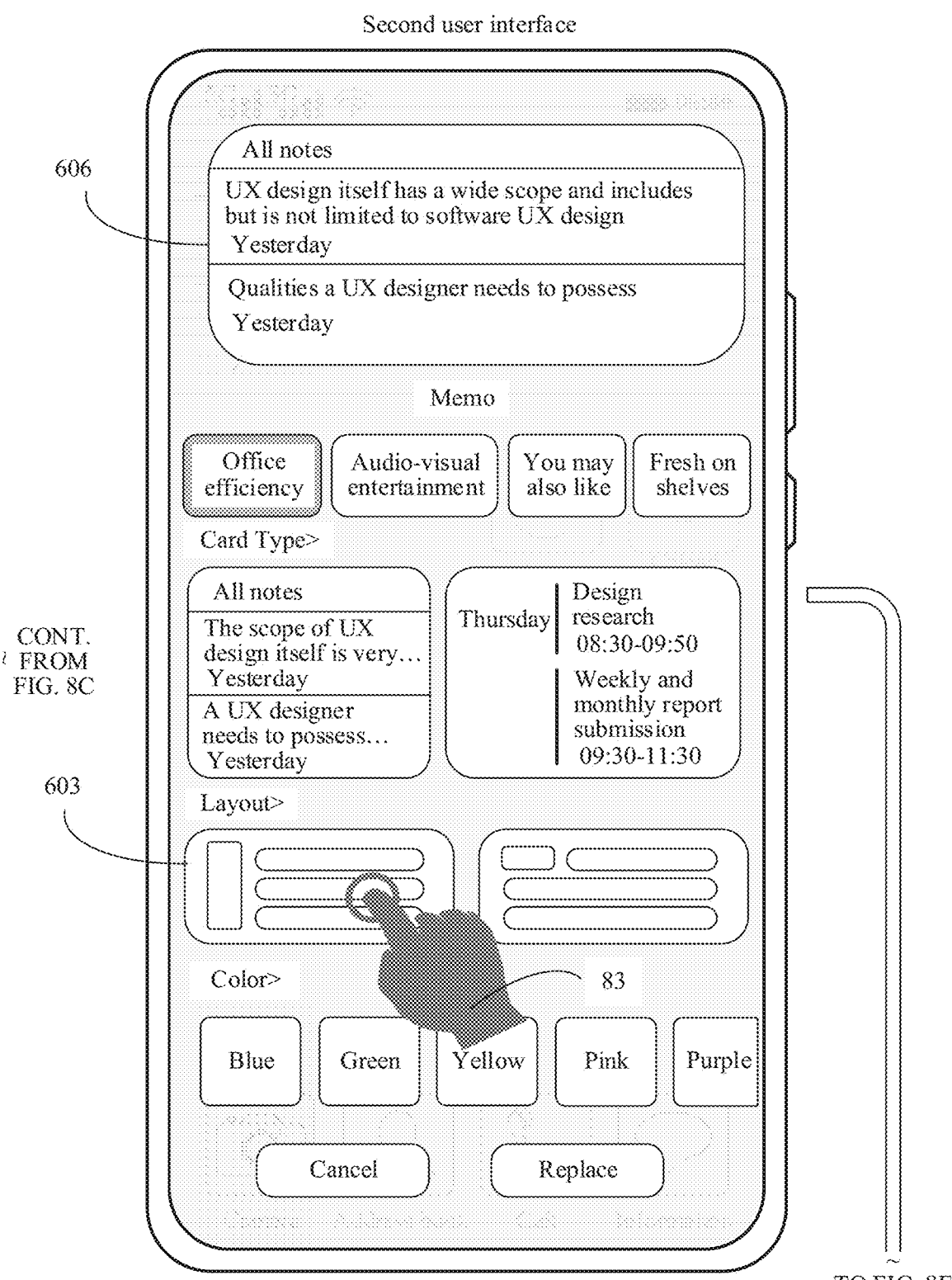
FIG. 8D, FIG. 8E, FIG. 8F, and FIG. 8G are schematic diagrams of setting a second application card based on a second user interface according to an embodiment of the present application.
Figure 8E:
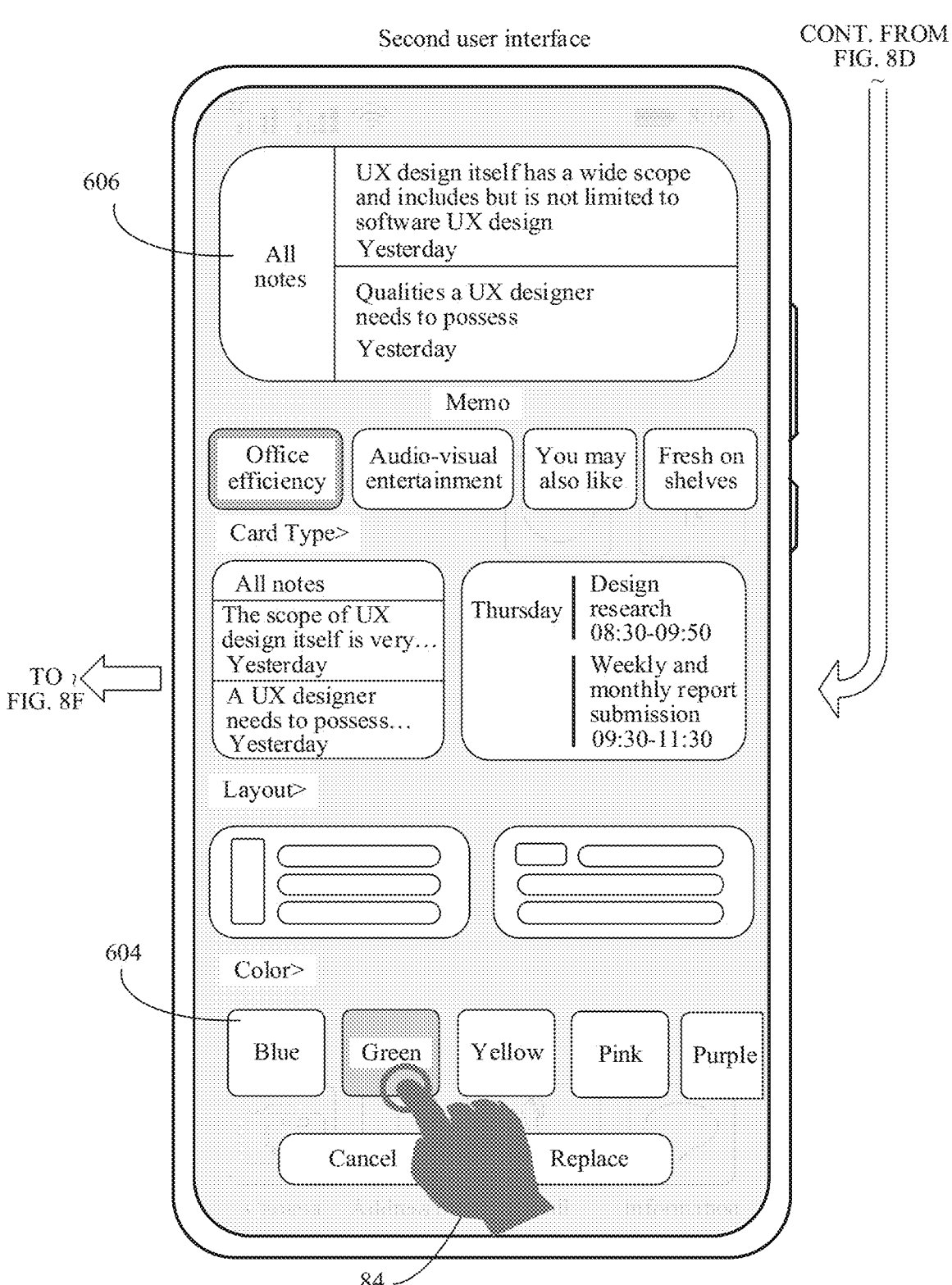
Figure 8F:
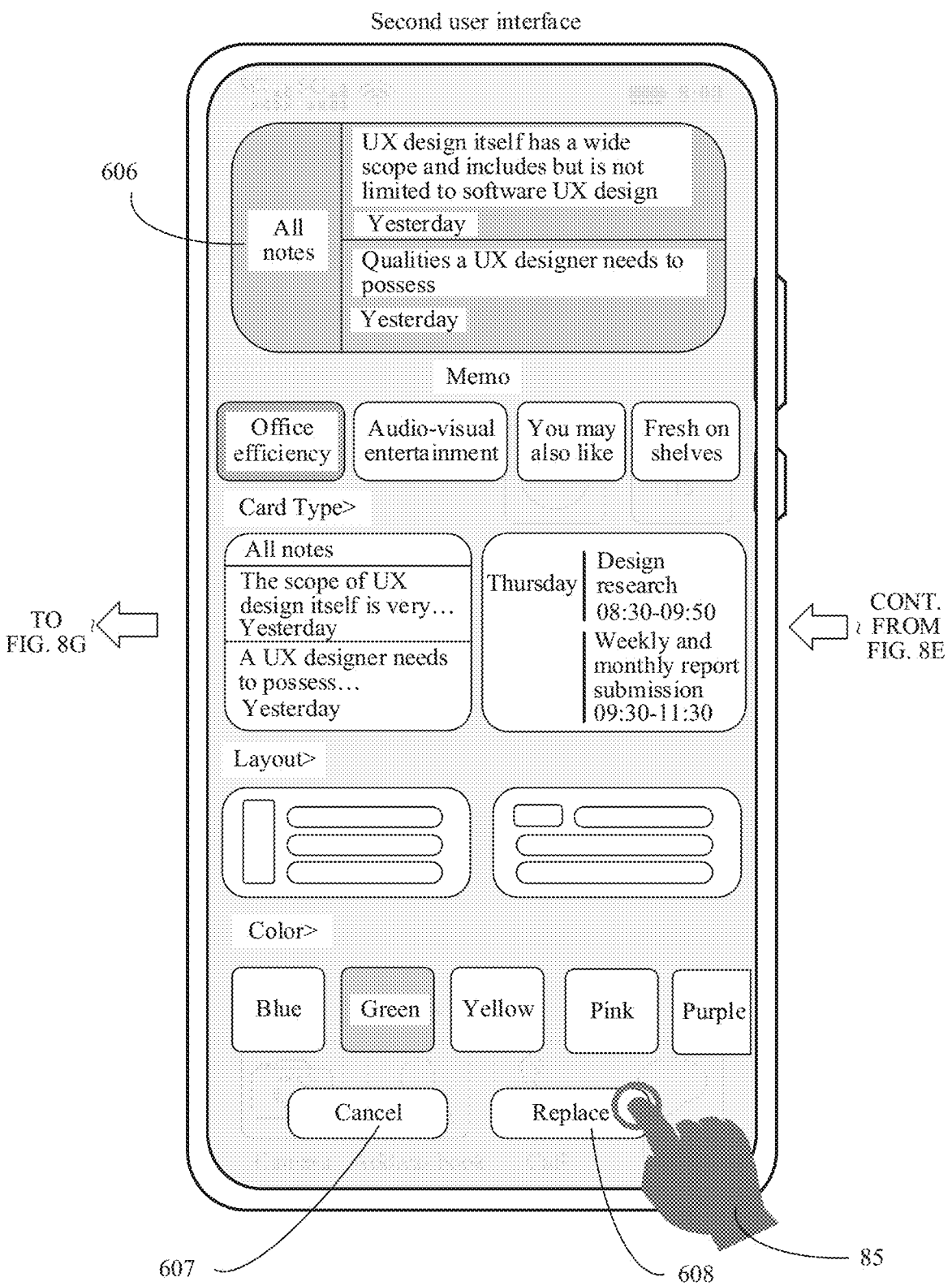
Figure 8G:
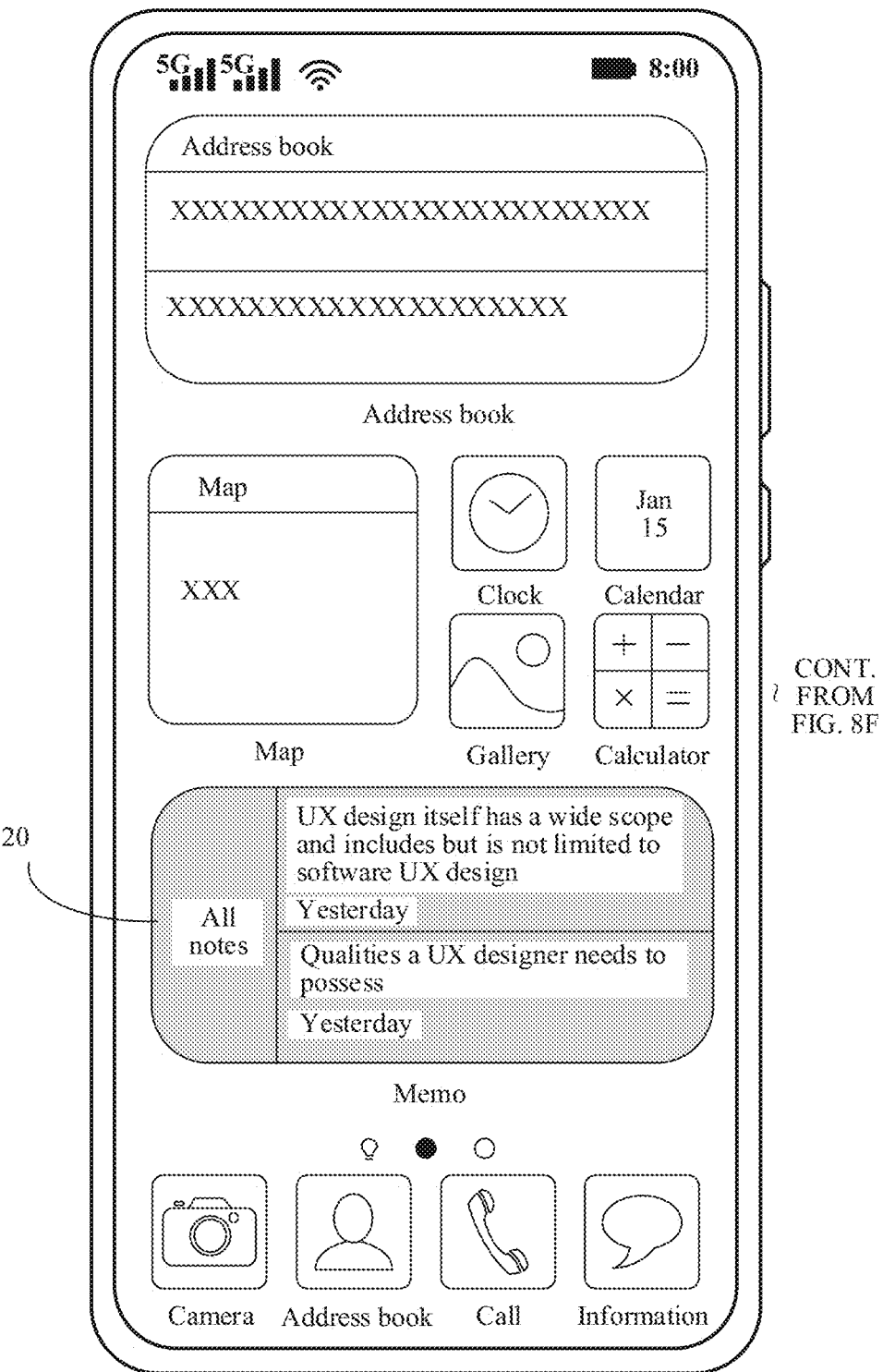

In an implementation, as shown in FIG. 8A, FIG. 8B, FIG. 8C. FIG. 8D, FIG. 8E, FIG. 8F, and FIG. 8G, when the user performs a second operation on at least one parameter setting option in the second user interface to generate the second application card 20, step S103 may specifically include: receiving a third operation performed on the parameter setting option; and the method may further include: in response to the third operation, generating, by the terminal device, a third application card, and displaying the third application card in the preview region 606.

The third application card is equivalent to the preview image of the second application card, and the third application card in the preview region 606 changes as the user operates the option setting parameter.

When the parameter of the second application card is not configured, the third application card displayed in the preview region is an application card with a configuration parameter of the first application card. During configuration of the parameter of the second application card, the third application card displayed in the preview region changes as the user operates the option setting parameter. When the parameter of the second application card is configured, that is, when the first control is clicked, the third application card is the second application card that is finally displayed in the third user interface, that is, the second application card is the third application card with at least one parameter set by the user.

The user may click on at least one parameter setting option to complete the parameter setting of the second application card, and then the second operation may include the third operation discontinuously performed for at least once or more times. Exemplarily, the third operation may be an operation of single-clicking the screen, that is, an operation in which the user clicks on at least one parameter setting option in the second user interface. Each time the user clicks a parameter setting option, the configuration of the corresponding parameter of the second application card can be implemented.

In an implementation, referring to FIG. 8A, FIG. 8B, FIG. 8C, FIG. 8D, FIG. 8E, FIG. 8F, and FIG. 8G, the terminal device generates the second user interface in response to the first operation 81 performed by the user on the first application card 10 in the first user interface. For the specific process, refer to the embodiment in FIG. 4A, FIG. 4B, FIG. 4C, and FIG. 4D or FIG. 5A, FIG. 5B, and FIG. 5C. If the card type of the first application card is "file management", the preview region 606 in the second user interface displays a default parameter of the application card corresponding to "file management".

Exemplarily, since the application type of the "file management" application is "office efficiency", the "office efficiency" type is selected by default in the application type parameter setting option 601. Therefore, if the user needs to replace the application card of another application under the office efficiency category, the parameter setting option of office efficiency does not need to be clicked on. Then, the content in the card type parameter setting option 602 also displays, by default, application card content corresponding to each application under the "office efficiency" category. For example, the content in the card type parameter setting option 602 shows application cards of applications such as memo and schedule, and layout manners that can be provided by the application cards of the applications are displayed in the layout parameter setting option 603, for example: top-bottom layout and left-right layout.

To ensure that the user can see the effect of the customized second application card in real time, the terminal device may update, in the preview region, the display effect of the preview image (the third application card) in the preview region in real time based on the user's selection. The terminal device determines the parameter of the second application card in response to the click operation performed by the user on at least one parameter setting option on the second user interface, and displays a preview image of the second application card in the preview region according to the parameter of the second application card. The terminal device updates the preview image in response to the click operation performed by the user on at least one parameter setting option.

Exemplarily, when the terminal device detects that the user clicks (82) on the application card corresponding to the "all notes" application in the card type parameter setting option 602, the terminal device can display the application card of this type in the preview region 606. The application card in the preview region 606 can initially be displayed in a default layout and color, for example: top-bottom layout, yellow, and the like.

Next, when the terminal device detects that the user clicks (83) on the left-right layout parameter setting option in the layout parameter setting option 603, the layout of the application card in the preview region 606 may be switched from a top-bottom layout structure to a left-right layout structure. When the terminal device detects that the user clicks (84) on the green block in the color parameter setting option 604, the background color of the application card in the preview region 606 may be replaced with green.

As shown in FIG. 7A and FIG. 7B and FIG. 8A, FIG. 8B, FIG. 8C, FIG. 8D, FIG. 8E, FIG. 8F, and FIG. 8G, when the terminal device detects that the user clicks on any size in the size selection item 605, the size of the application card in the preview region 606 may be replaced with this size. For example, when the size of the application card displayed in the preview region 606 is 4×2, if the terminal device detects that the user has clicked on the 2×2 parameter setting option, the size of the application card in the preview region can be switched from 4×2 to 2×2.

In an implementation, step S103 may specifically include: receiving a fourth operation performed on the first control. Then, step S104 may specifically include: displaying a third user interface in response to the fourth operation, and displaying a third application card on the third user interface.

Exemplarily, the first control is the replacing button 608, and the fourth operation may be a click operation. When the terminal device detects that the user clicks (85) on the replacing button 608 in the second user interface, the terminal device displays the third user interface, and displays, on the third user interface, the third application card displayed in the preview region. The third application card generated based on the parameters set above is the second application card 20, and the second application card 20 replaces the first application card 10 for display. For example, the first application card 10 is removed, and the second application card 20 is displayed at the original position of the first application card 10 to display the first user interface including the second application card 20.

In an implementation, the method further includes: receiving a sixth operation performed on the second control, and closing the second user interface and displaying the first user interface in response to the sixth operation.

Exemplarily, the second control is a cancel button 607, and the sixth operation may be a click operation. If the user does not want to replace the application card, the cancel button 607 can be clicked on. When the terminal device detects that the user clicks on the cancel button 607 in the second user interface, the terminal device does not replace the application card, cancels the display of the second user interface, and returns to the first user interface. The first application card 10 in the first user interface is still displayed in the original position.

It can be seen that in the application card replacing method provided by this embodiment of the present application, after the user implements the parameter setting of the second application card in the second user interface based on the foregoing content, the user triggers the replacing button in the second user interface to remove the first application card and display the second application card at the original position of the first application card, so as to implement the interaction effect of replacing with the new application card at the original position without first removing the original application card.

FIG. 9A, FIG. 9B, FIG. 9C, FIG. 9D, FIG. 9E, FIG. 9F, and FIG. 9G are other schematic diagrams of setting a second application card based on a second user interface according to an embodiment of the present application.

Figures 9A, 9B:
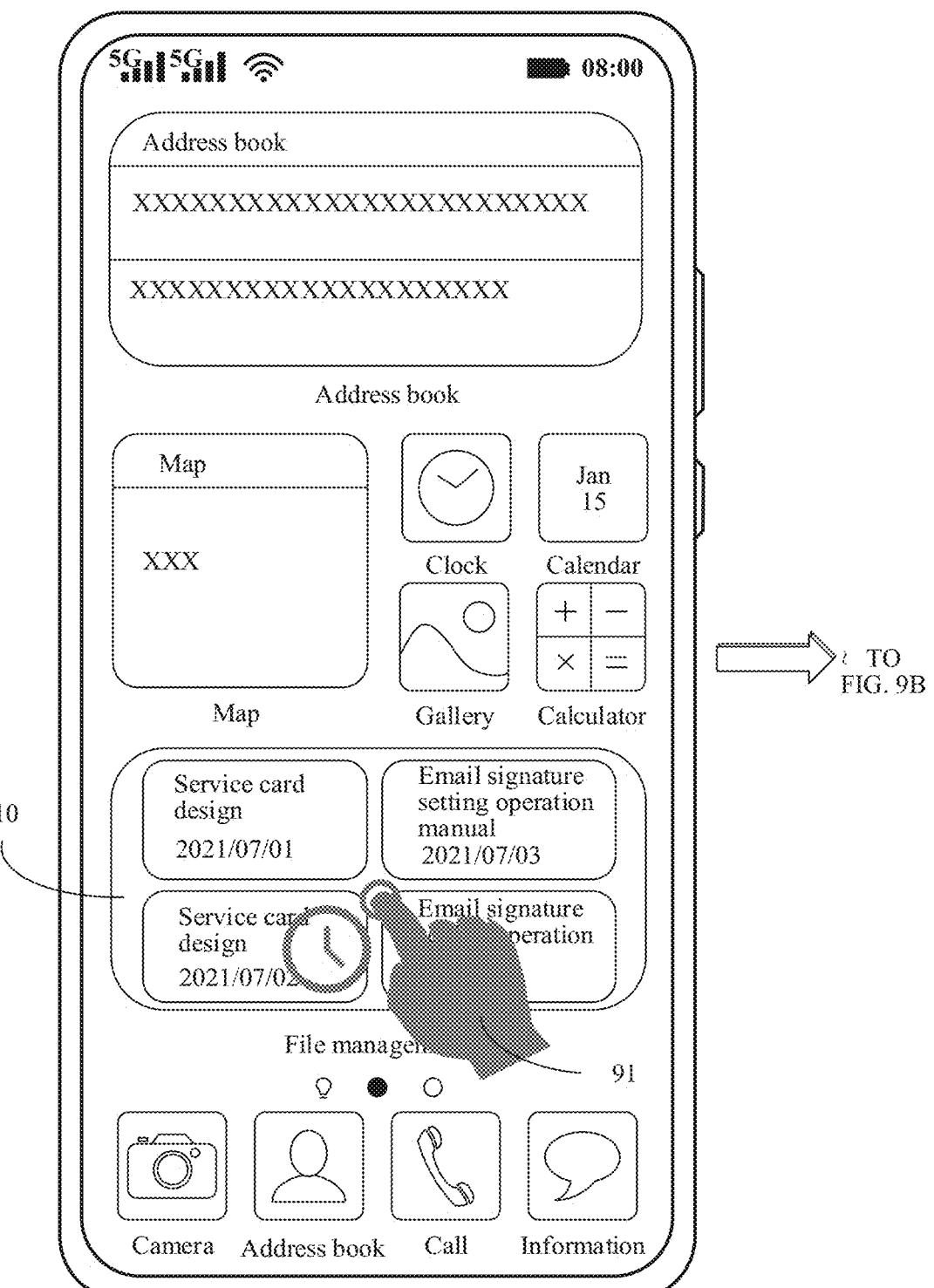
FIG. 9A, FIG. 9B, FIG. 9C, FIG. 9D, FIG. 9E, FIG. 9F, and FIG. 9G are other schematic diagrams of setting a second application card based on a second user interface according to an embodiment of the present application.
Figures 9A, 9B, 9C:
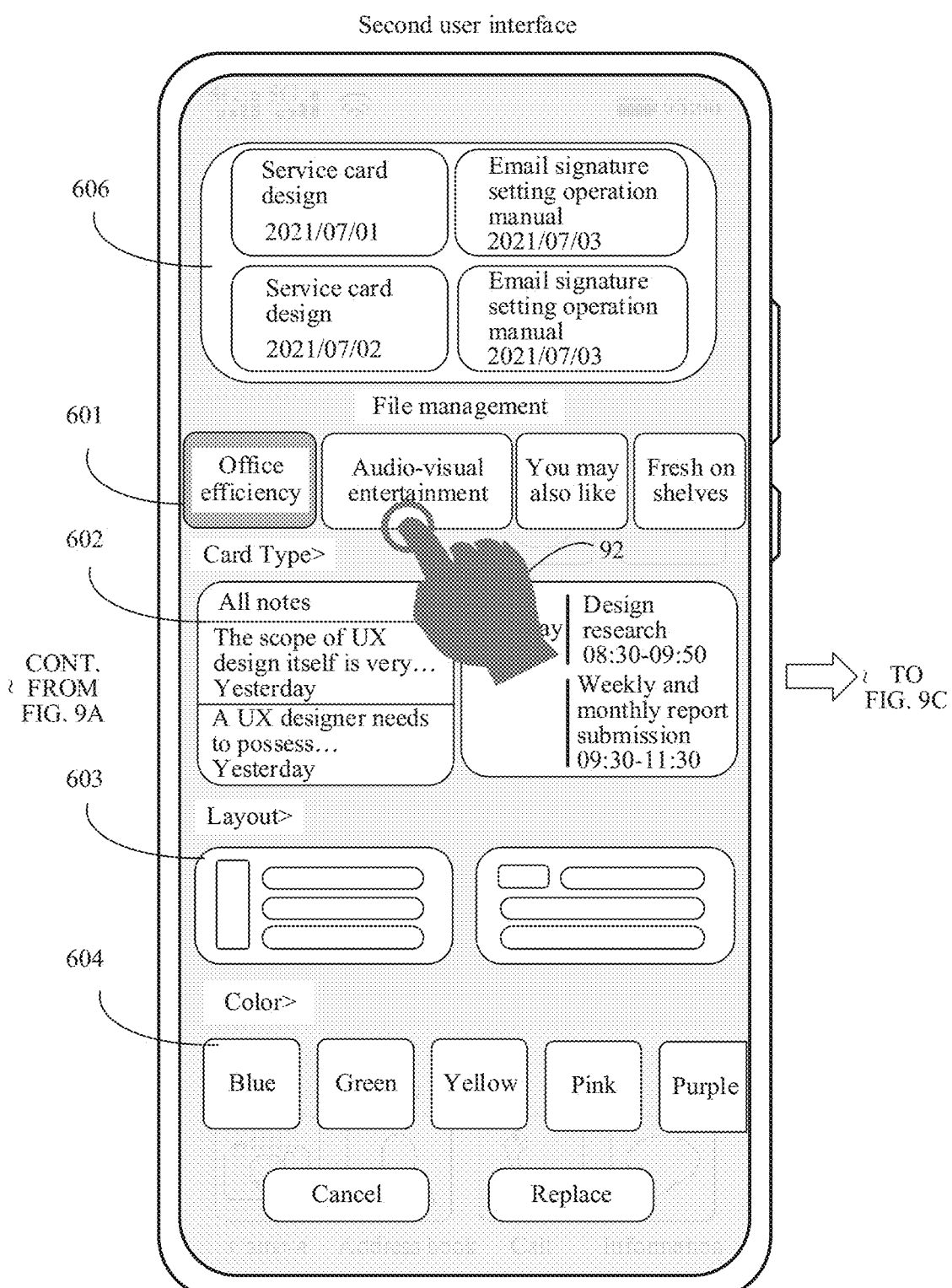
Figure 9C:
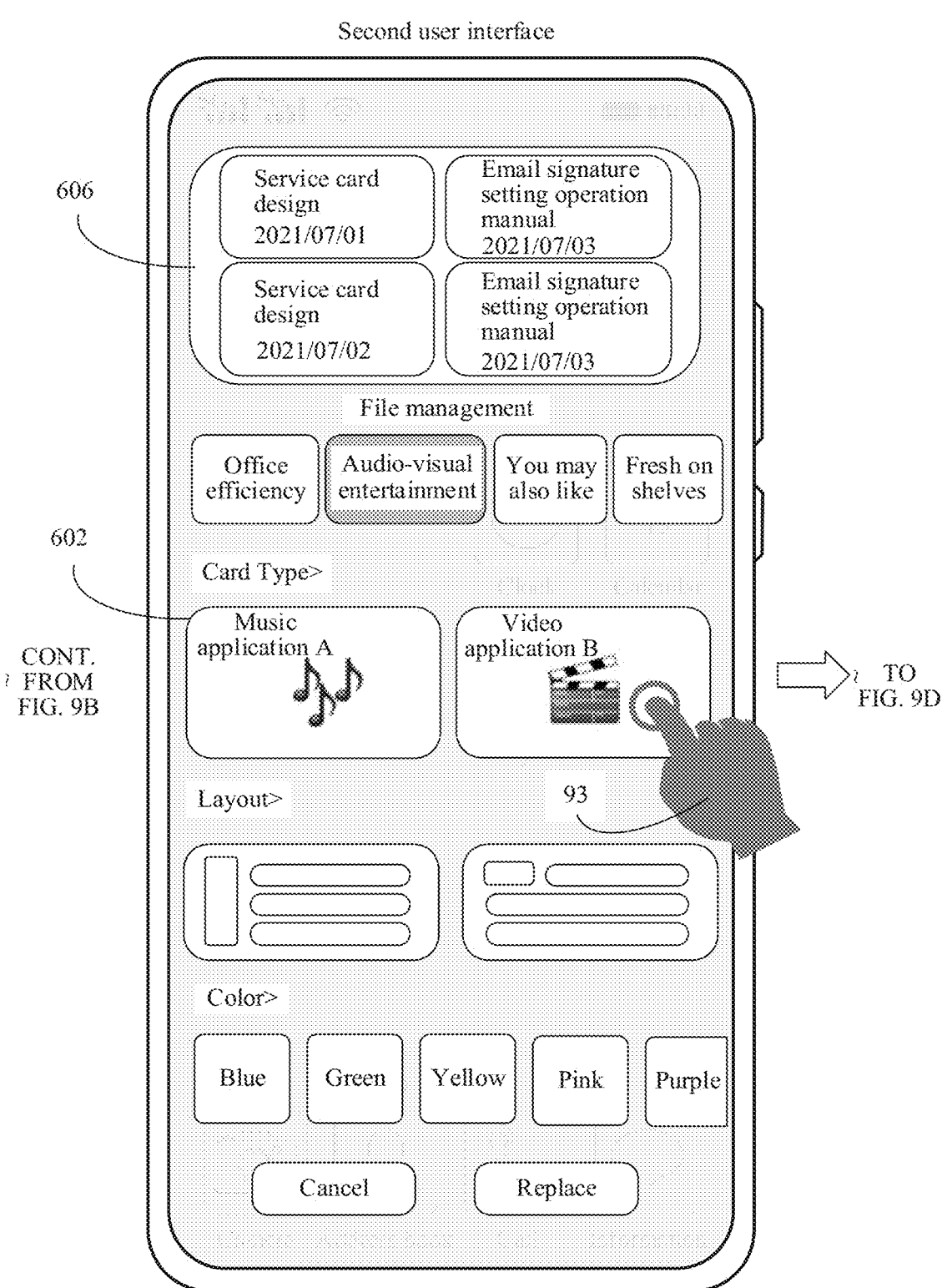
Figure 9D:
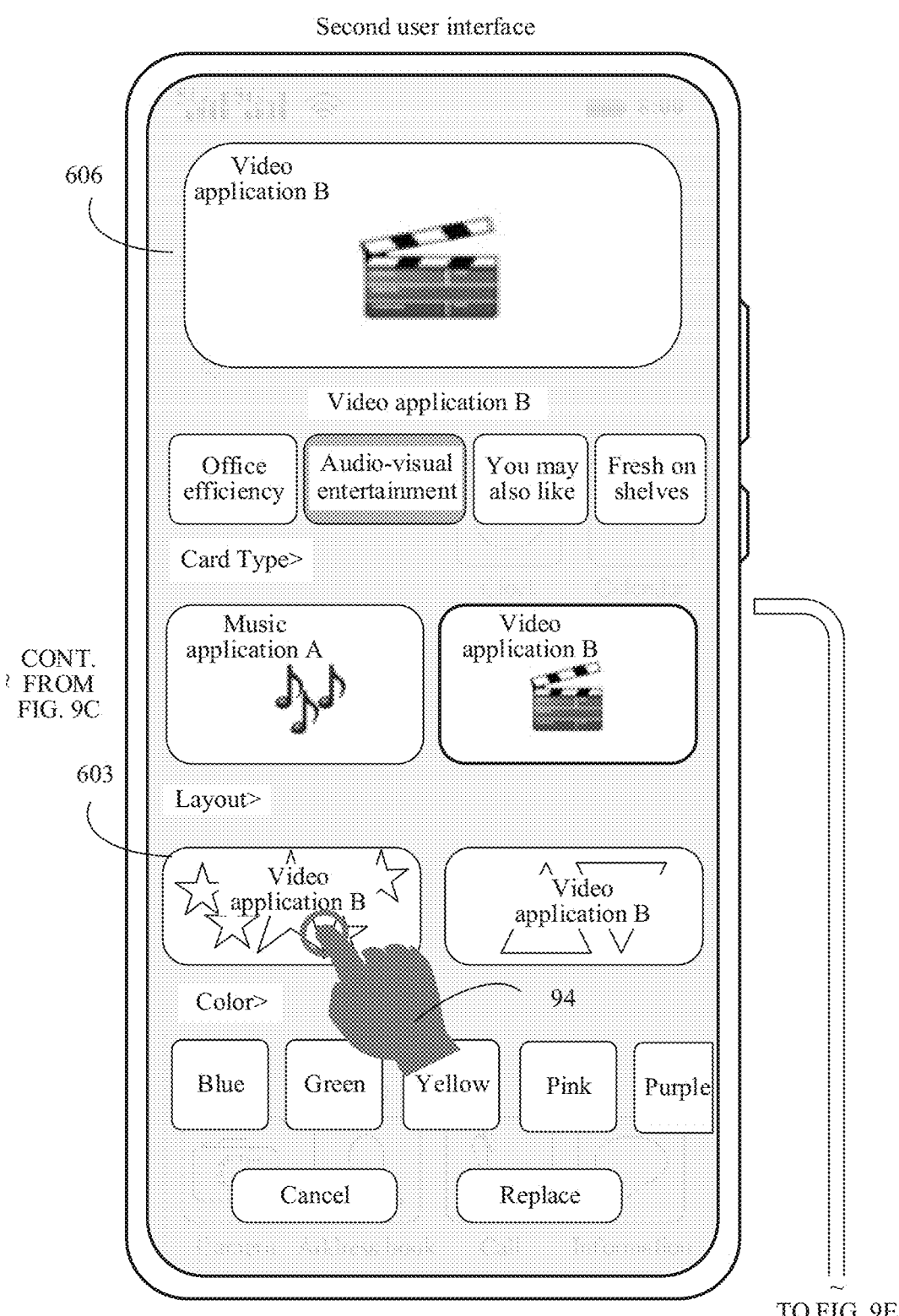
Figure 9E:
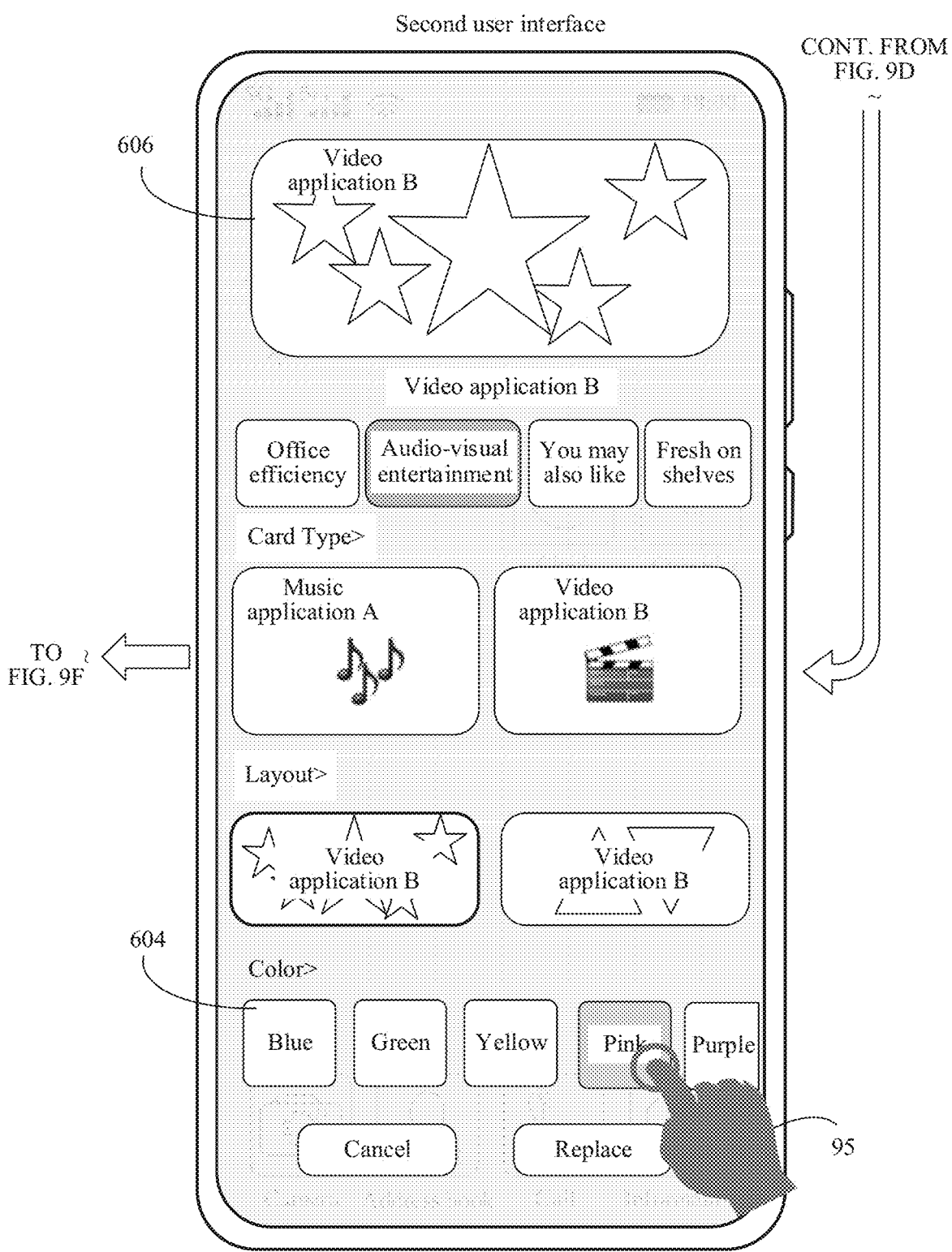
Figure 9F:
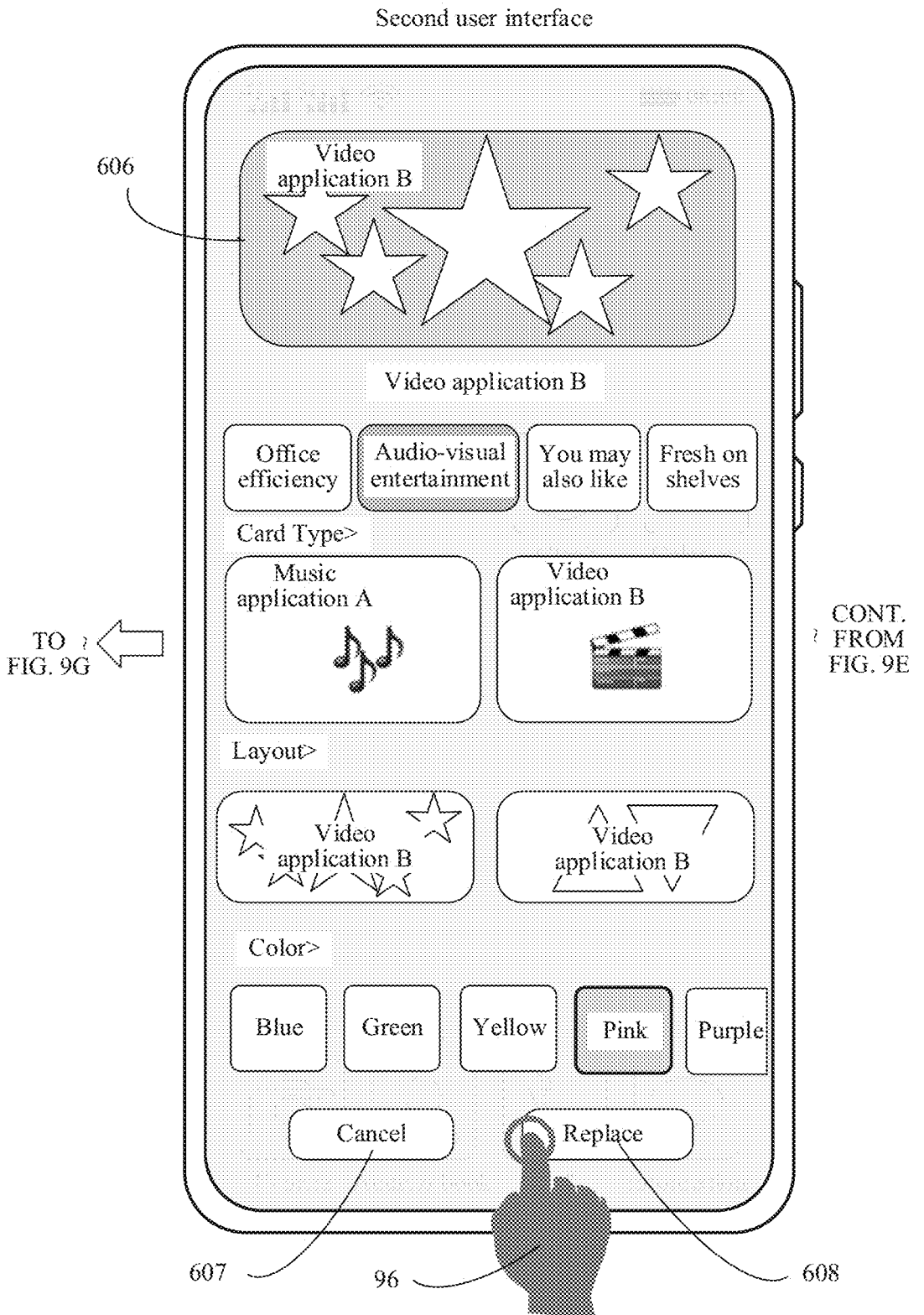
Figures 9F, 9G:
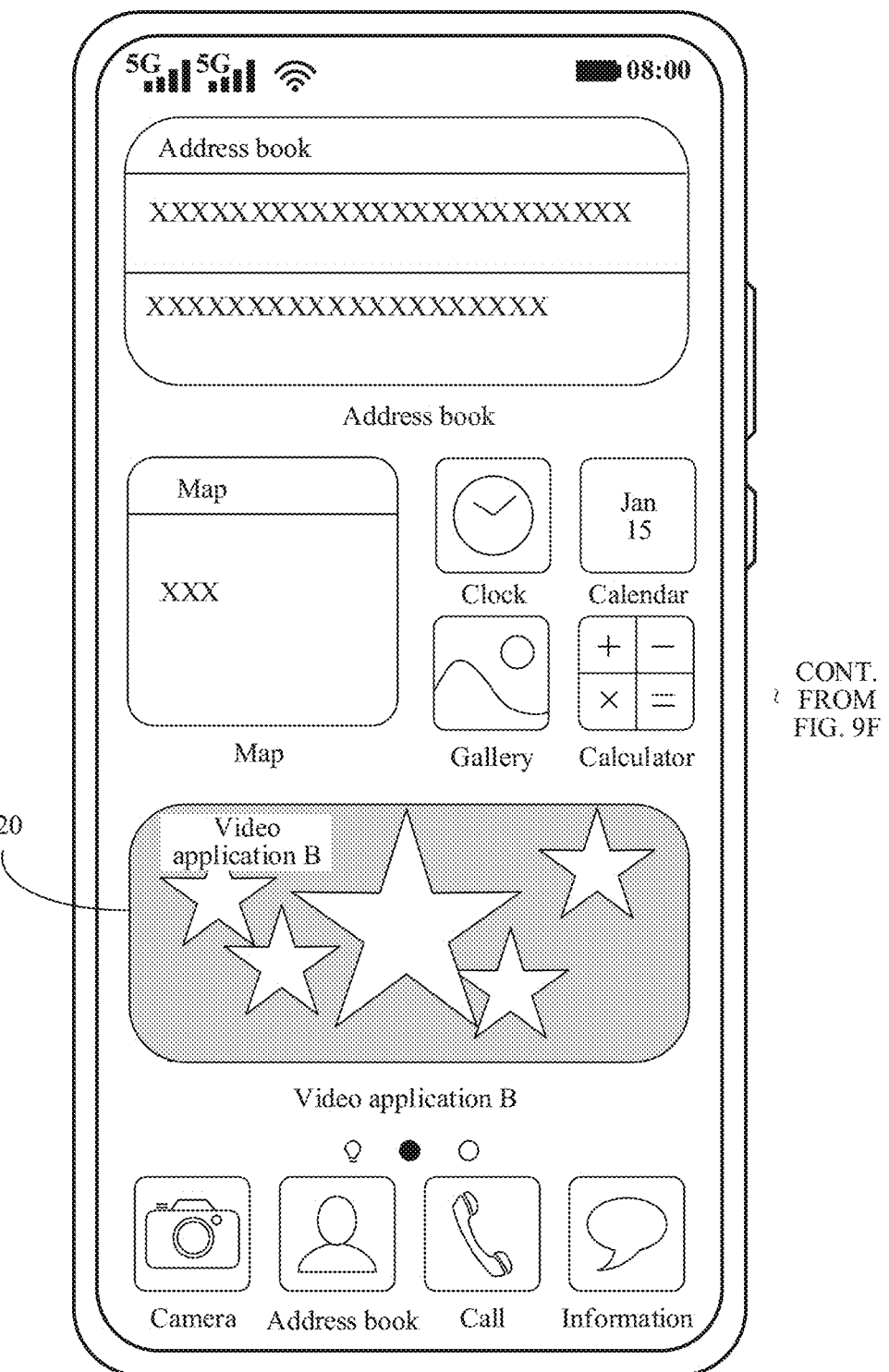

Exemplarily, referring to FIG. 9A, FIG. 9B. FIG. 9C, FIG. 9D, FIG. 9E, FIG. 9F, and FIG. 9G, the terminal device generates the second user interface in response to the first operation (91) performed by the user on the first application card 10 in the first user interface. If the card type of the first application card 10 is "file management", the preview region 606 in the second user interface displays a default parameter of the application card corresponding to the "file management" application. For an implementation process in which the terminal device generates the second user interface in response to the first operation (91), refer to the content of the foregoing embodiments, and details are not described herein.

Since the application type of the first application card is "office efficiency", if the user wants to replace the first application card 10 with an application card of another application type, such as an application card of the "audio-visual entertainment" type, when the terminal device detects that the user clicks (92) on the "audio-visual entertainment" type in the application type parameter setting option 601 in the second user interface, the card type parameter setting option 602 and the layout parameter setting option 603 can be switched to content corresponding to the "audio-visual entertainment" type. For example, the content in the card type parameter setting option 602 can be switched to application cards such as music and video, the music application card can be provided by music application A, and the video application card can be provided by video application B. Besides, in the layout parameter setting option 603, layout manners provided by the above card types are displayed, for example: a star layout manner and a triangle layout manner.

Exemplarily, when the terminal device detects that the user clicks (93) on the application card of the "video" application in the card type parameter setting option 602, the terminal device can display the application card in the preview region 606, such as the application card of "video application B". The size of the application card in the preview region 606 is the same as the size of the first application card 10 by default, and the terminal device switches to display the layout manner corresponding to the application card in the preview region 606 in the layout parameter setting option 603.

Next, when the terminal device detects that the user clicks (94) on the first layout structure parameter setting option in the layout parameter setting option 603, such as the star layout manner, the terminal device can switch the layout of the application card in the preview region 606 from the default layout structure of the "video application B" to the star layout manner. When the terminal device detects that the user clicks (95) on the pink block in the color parameter setting option 604, the background color of the application card in the preview region 606 may be set to pink. When the terminal device detects that the user clicks on a target size in the size parameter setting option 605, the terminal device may replace the size of the application card in the preview region 606 with the target size.

After the user configures the corresponding parameter of the second application card 20 based on at least one parameter setting option in the second user interface, when the terminal device detects that the user clicks (96) on the replacing button 608 in the second user interface, the second application card 20 is generated based on each above set parameter and replaces the first application card 10 for display. For example, the first application card 10 is removed, and the second application card 20 is displayed at the original position of the first application card 10.

If the user does not want to replace the application card, the cancel button 607 can be clicked on. When the terminal device detects that the user clicks on the cancel button 607 in the second user interface, the terminal device does not replace the application card, cancels the display of the second user interface, and returns to the first user interface. In this case, the first application card 10 in the first user interface is still displayed at the original position.

It can be seen that in the application card replacing method provided by this embodiment of the present application, different types of application cards can be replaced across applications at the original position, and the size of the application card can be changed, so as to implement the fast interaction effect of replacing with the new application card at the original position without first removing the original application card, and ensure that the user interaction experience is better.

In an implementation, since the user can modify the size of the second application card 20 when setting the relevant parameters of the second application card 20 based on the second user interface, the size of the second application card 20 may be different from the size of the first application card. Therefore, the second application card is displayed on the first user interface where the first application card is located, or displayed on another screen interface. For example, the size of the first application card 10 is 4×2, while the size of the second application card 20 is 2×2 or 4×4.

If the size of the newly customized application card is smaller than or equal to the size of the first application card 10, the second application card 20 can be displayed at the original position of the first application card 10, indicating that the first user interface and the third user interface are a same desktop of the terminal device. If the size of the second application card 20 is larger than the size of the first application card 10, the second application card 20 cannot be displayed at the original position of the first application card 10.

In an implementation, when the size of the second application card 20 is larger than the size of the first application card 10, if the size of the second application card is smaller than or equal to the first size, the second application card can still be displayed in the first user interface, indicating that the first user interface and the third user interface are a same desktop of the terminal device. If the size of the second application card is larger than the first size, the second application card cannot be displayed in the first user interface, then the third user interface is a newly created desktop, and the third user interface is a different desktop from the first user interface.

The first size is a size of the largest blank region formed after deleting the first application card on the first user interface. Exemplarily, the size of the largest blank region is a sum of the original blank region of the first user interface and the size of the first application card 10.

For this reason, the terminal device may display the second application card 20 in different manners based on a difference in a size relationship between the size of the first application card 10 and the size of the second application card 20 when performing application card replacement and display.

Figure 10A:
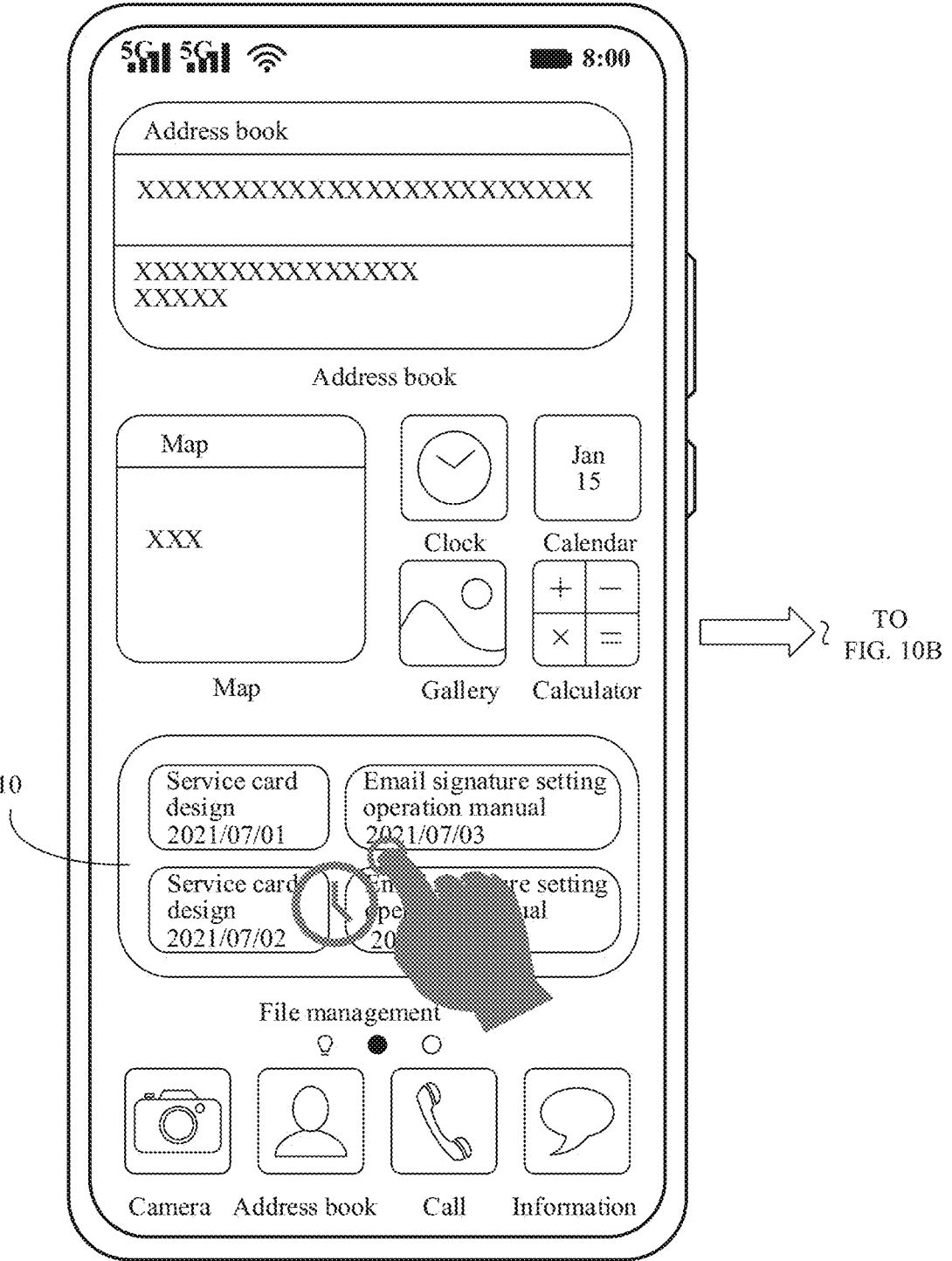
FIG. 10A and FIG. 10B are schematic diagrams of displaying a small-sized second application card according to an embodiment of the present application.
Figures 10A, 10B:
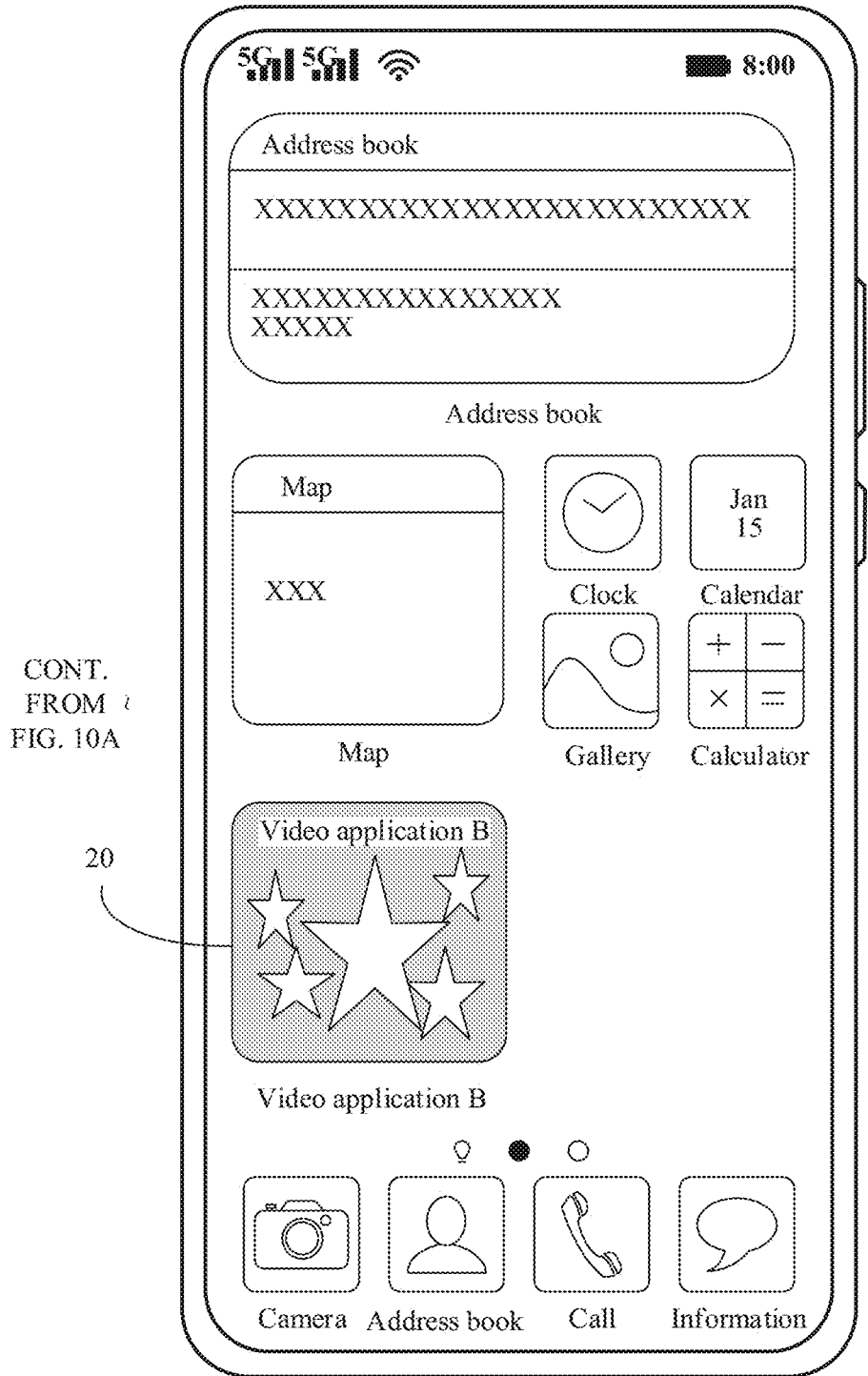

FIG. 10A and FIG. 10B are schematic diagrams of displaying a small-sized second application card according to an embodiment of the present application.

In an implementation, referring to FIG. 10A and FIG. 10B, if the size of the second application card 20 is smaller than or equal to the size of the first application card 10, for example, the size of the first application card is 4×2 and the size of the second application card is 2×2, it indicates that the original position of the first application card 10 can be used to replace with the display the second application card 20, that is, it indicates that the first user interface and the third user interface are a same desktop of the terminal device. Then, when the terminal device detects that the user clicks on the replacing button 608 in the second user interface, the terminal device can remove the first application card 10 and display the second application card 20 at the original position of the first application card 10. Since the small-sized second application card 20 replaces the large-sized first application card 10, the second application card 20 cannot completely occupy the position of the first application card 10, leaving a vacant position.

Figure 11A:
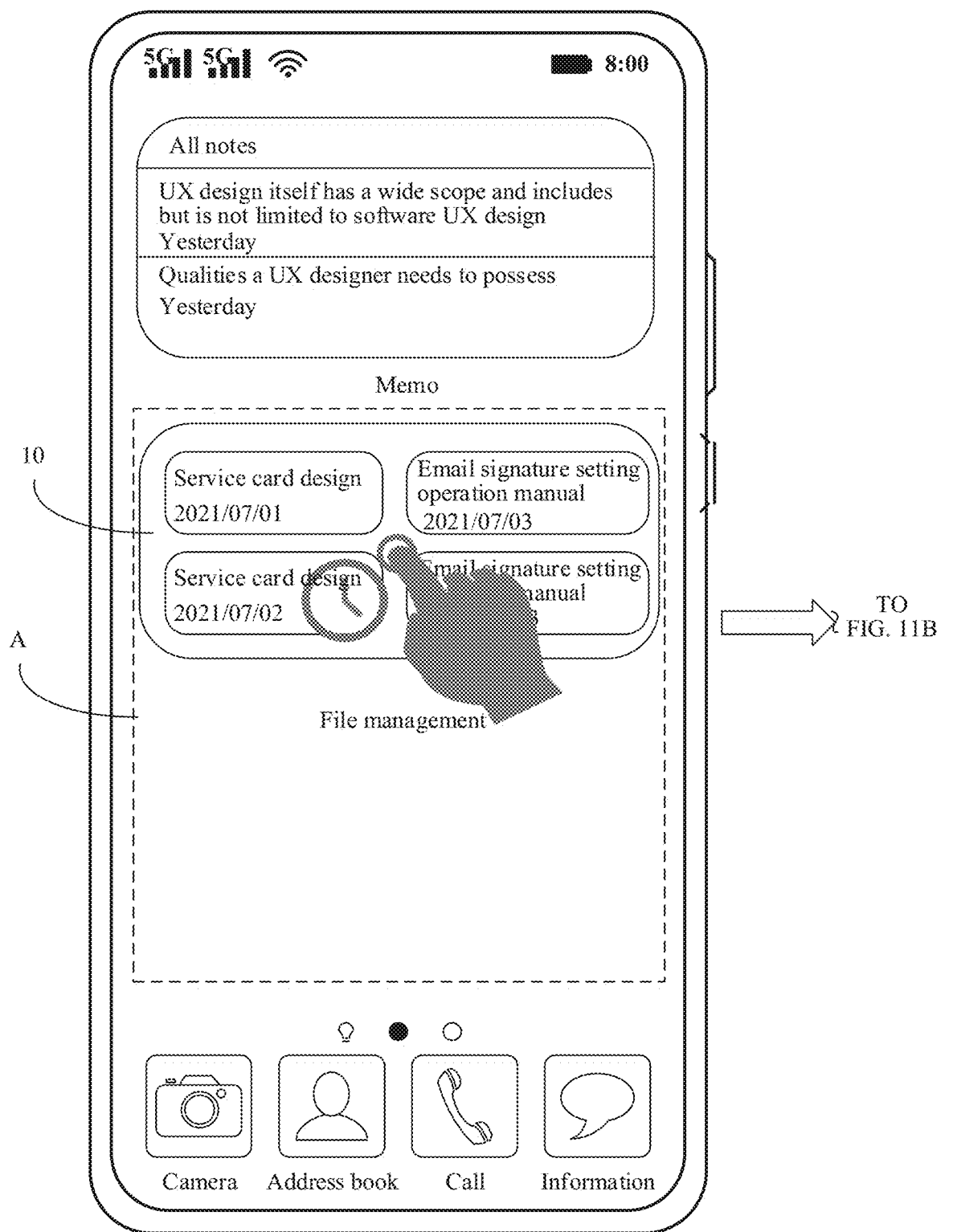
FIG. 11A and FIG. 11B are schematic diagrams of displaying a large-sized second application card according to an embodiment of the present application.
Figures 11A, 11B:
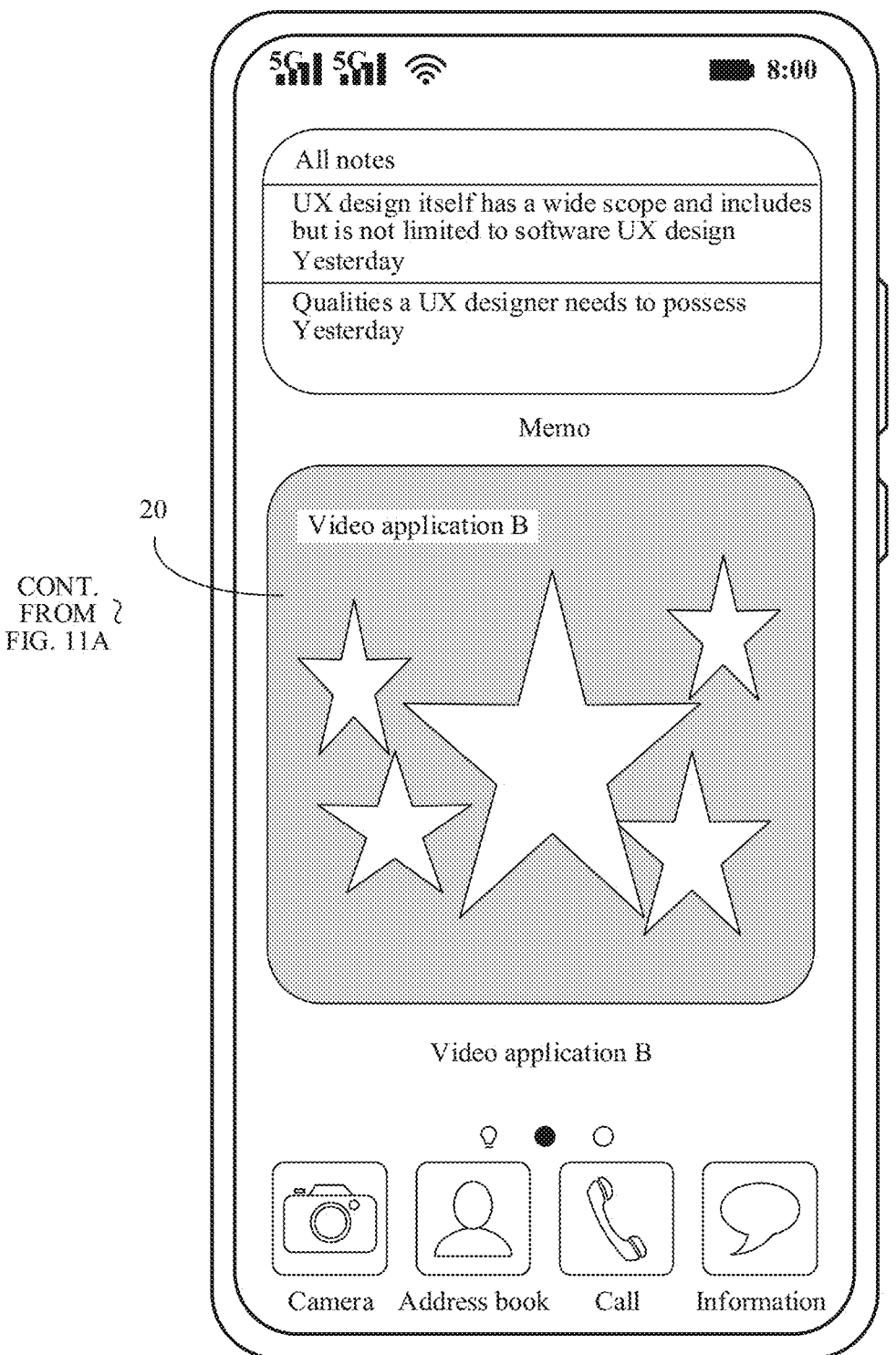

FIG. 11A and FIG. 11B are schematic diagrams of displaying a large-sized second application card according to an embodiment of the present application.

In an implementation, referring to FIG. 11A and FIG. 11B, if the size of the second application card 20 is greater than the size of the first application card 10, for example, the size of the first application card 10 is 4×2 and the size of the second application card 20 is 4×4, it indicates that the original position of the first application card 10 cannot be directly used to replace with the display the second application card 20. Then, to display the second application card

20 in the current screen where the first application card 10 is located, it may be determined whether the current screen where the first application card 10 is located has enough space to display the large-sized second application card 20.

In this embodiment of the present application, the terminal device determines the size relationship between the sum (that is, the first size) of the blank region of the first user interface and the size of the first application card 10 and the size of the second application card 20, to determine whether the second application card 20 is displayed in the field of view of the display screen of the first application card 10 or displayed in another screen interface. The blank region is a region that is within the field of view of the display screen of the first user interface and that does not include application cards.

Exemplarily, referring to FIG. 11A and FIG. 11B, if the sum (that is, the first size) of the blank region and the size of the region A enclosed by the first application card is greater than or equal to the size of the second application card, for example, the total size of the enclosed region A is 4×4 and the size of the second application card is 4×4, it indicates that the large-sized second application card 20 can be displayed in the current screen of the first application card 10, and further indicates that the first user interface and the third user interface are a same desktop of the terminal device. Then, when the terminal device detects that the user clicks on the replacing button 608 in the second user interface, the terminal device can remove the first application card 10 and display the second application card 20 at the original position of the first application card 10 and the position of the region A enclosed by the neighboring blank region.

Figure 12A:
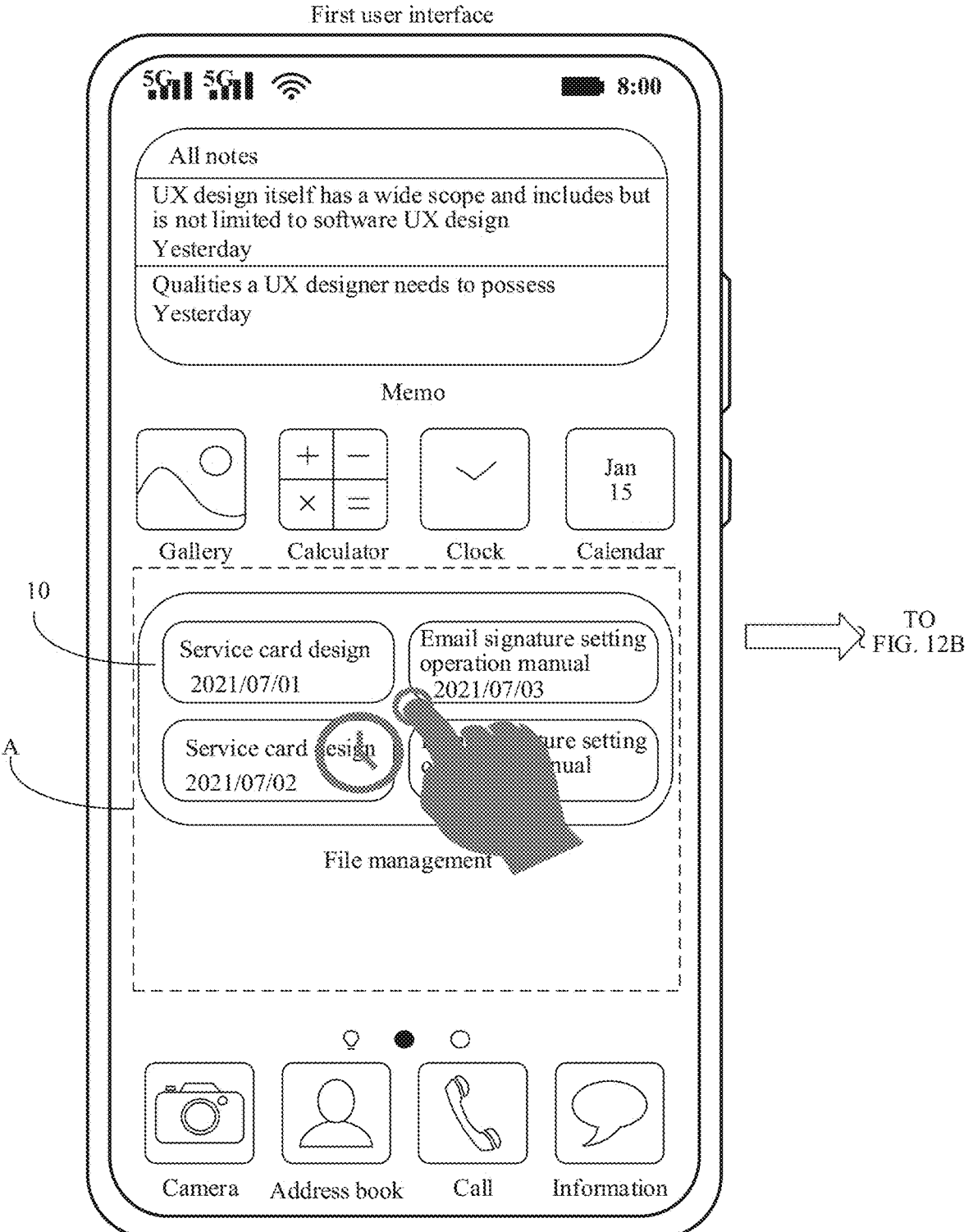
FIG. 12A, FIG. 12B, and FIG. 12C are other schematic diagrams of displaying a large-sized second application card according to an embodiment of the present application.
Figures 12A, 12B:
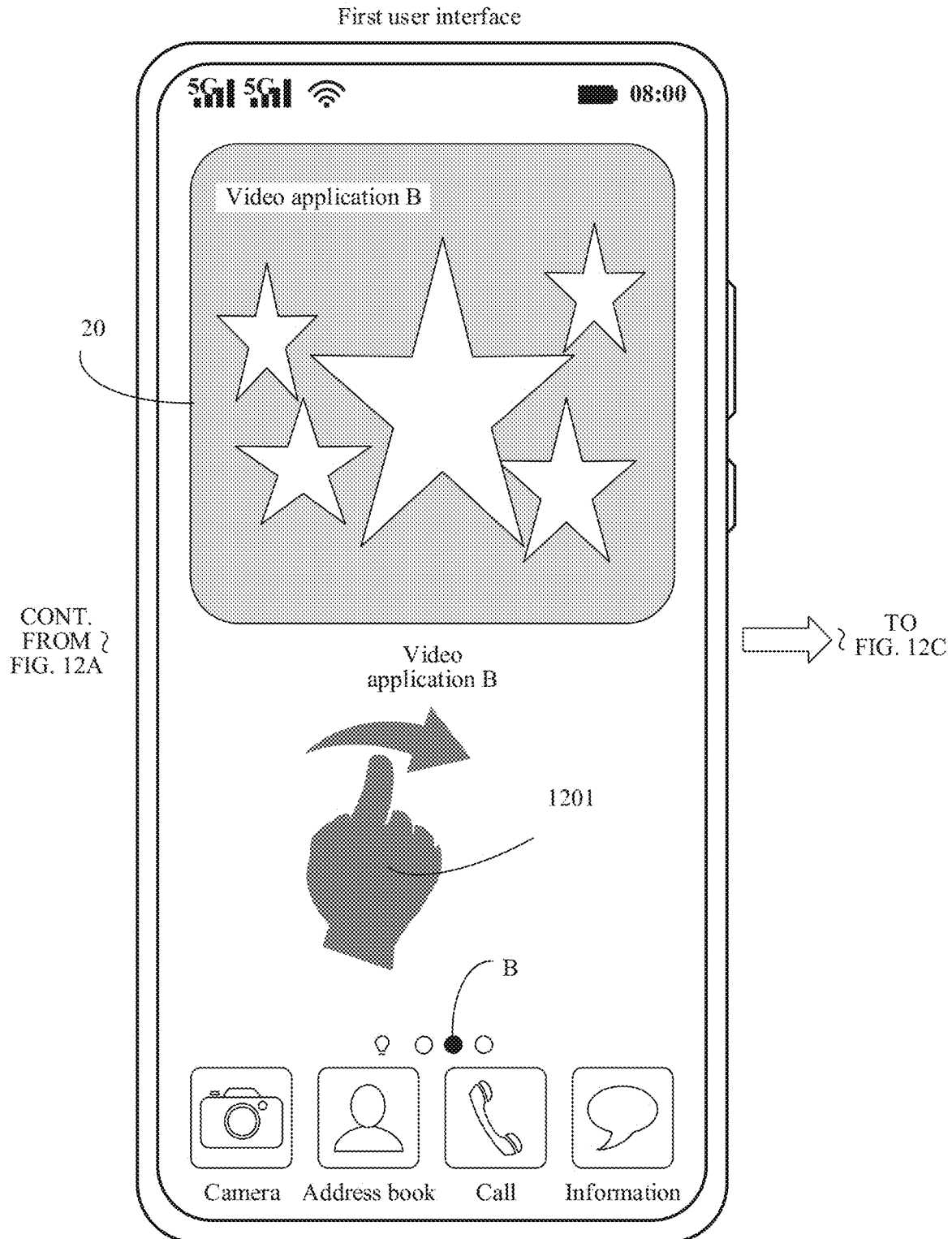
Figure 12C:
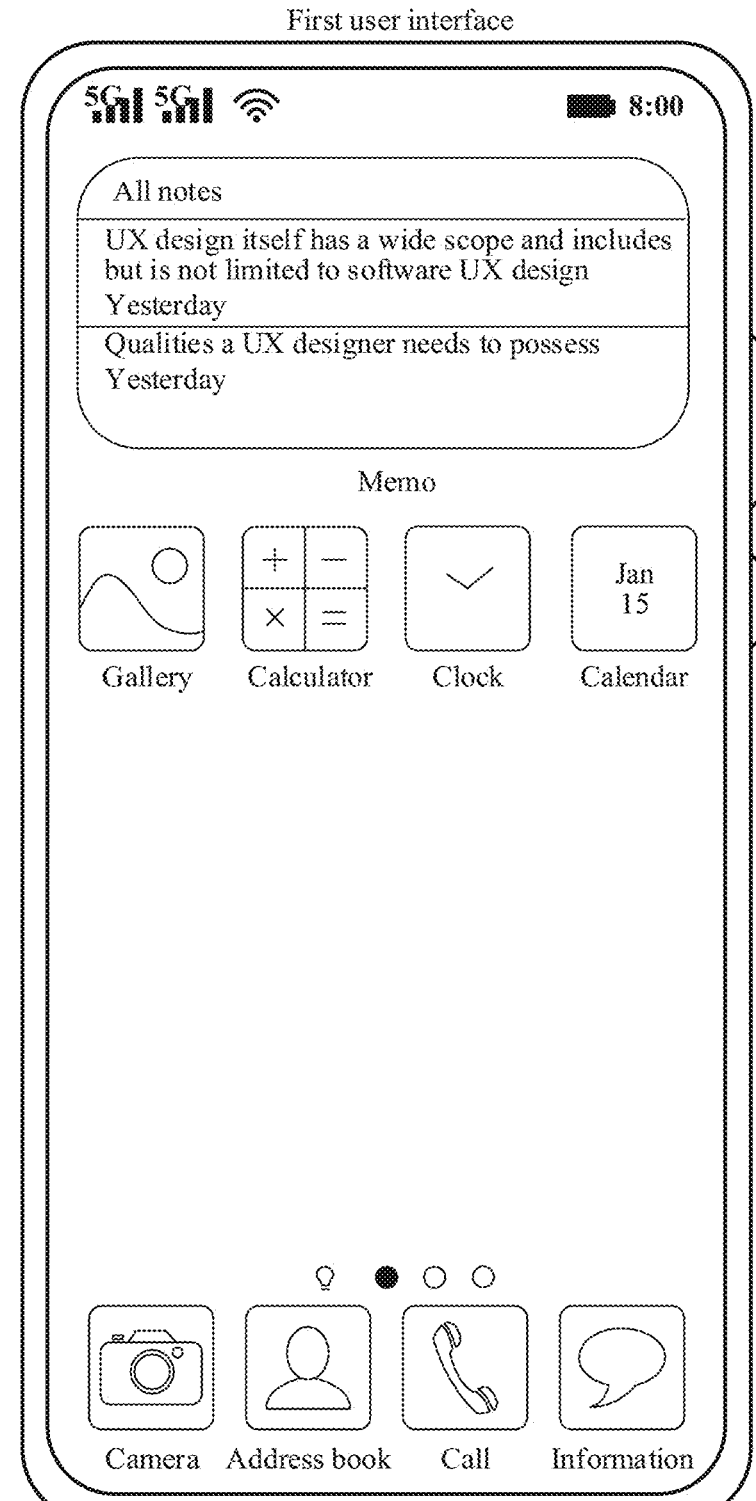

FIG. 12A, FIG. 12B, and FIG. 12C are other schematic diagrams of displaying a large-sized second application card according to an embodiment of the present application.

In an implementation, referring to FIG. 12A, FIG. 12B, and FIG. 12C, if the sum (that is, the first size) of the blank region and the size of the region A enclosed by the first application card is smaller than the size of the second application card 20, for example, the total size of the region A enclosed is 4×3 and the size of the second application card is 4×4, it indicates that the large-sized second application card 20 cannot be displayed in the current screen of the first application card 10, that is, indicates that the third user interface is a newly created desktop and the third user interface is a desktop different from the first user interface. Then, when the terminal device detects that the user clicks on the replacing button 608 in the second user interface, the terminal device displays a new screen interface B in the first user interface, and the new screen interface B is the third user interface. The second application card 20 is displayed in the new interface B, and the first application card 10 is removed. The terminal device responds to the user's rightward slide (1201) operation on the new screen interface B where the second application card 20 is located, and the first user interface is switched from displaying the new screen interface B to the original screen where the first application card 10 is located, and in the screen where the first application card 10 is located, the original position of the first application card 10 is empty.

It can be seen that the embodiments of the present application provide an application card replacing method and a terminal device. The terminal device receives a first operation performed on a first application card on a first user interface; displays a second user interface in response to the first operation, where the second user interface includes a first option; receives a second operation performed on the first option; displays a third user interface in response to the second operation, where the third user interface includes a second application card, and the second application card is a card generated in response to the second operation; and automatically deletes, by the terminal device, the first application card. In the method and the terminal device, an original application card does not first need to be removed during replacing of the application card, the application card can be quickly replaced through simple operations, and a card type, style, or the like can be customized for the replacing new application card. In this way, the application card is replaced across applications, and user's interaction experience is better.

In the above embodiments provided in the present application, various solutions for the application card replacing method provided in the present application are introduced from the perspective of the terminal device. It can be understood that, to implement the functions, the terminal device includes a corresponding hardware and/or software module for executing the functions. A person skilled in the art should be easily aware that, in combination with the units and algorithm steps of the examples described in the embodiments disclosed in this specification, the present application can be implemented by hardware or a combination of hardware and computer software. Whether a function is performed by hardware or computer software driving hardware depends on particular applications and design constraints of the technical solutions. A person skilled in the art can use different methods to implement the described functions for each particular application, but it should not be considered that the implementation goes beyond the scope of the embodiments of the present application.

Figure 13:
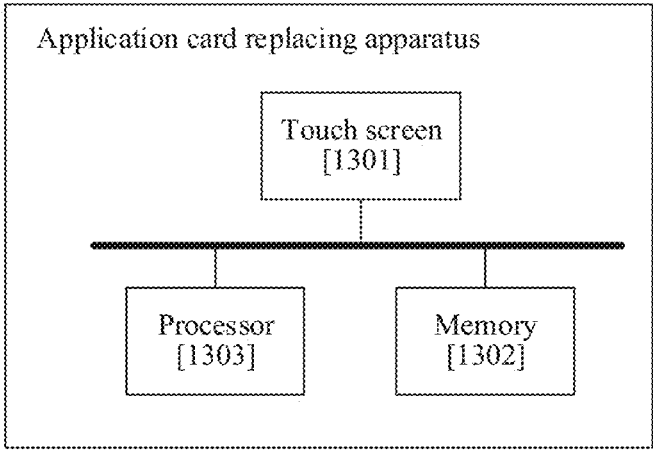
FIG. 13 is a schematic structural diagram of an application card replacing apparatus according to an embodiment of the present application.

FIG. 13 is a schematic structural diagram of an application card replacing apparatus according to an embodiment of the present application. As shown in FIG. 13, the application card replacing apparatus may include: a touch screen 1301, a memory 1302, and a processor 1303.

In some embodiments, the processor 1303 may include one or more processing units. The processor 1303 may include an application processor, a modem processor, a graphics processor, an image signal processor, a controller, a video codec, a digital signal processor, a baseband processor, and/or a neural network processor, etc. Different processing units may be separate devices, or may be integrated into one or more processors. The memory 1302 is coupled to the processor 1303, and is configured to store various software programs and/or a plurality of instructions. In some embodiments, the memory 1302 may include a volatile memory and/or a non-volatile memory. The touch screen 1301 is configured to display a user interface and obtain a user operation.

In an implementation, the application card replacing apparatus shown in FIG. 13 may be configured to implement functions of a terminal device.

In an implementation, when the software program and/or a plurality of sets of instructions in the memory 1302 are executed by the processor 1303, the terminal device is caused to perform the following method steps; receiving a first operation performed on a first application card on a first user interface; displaying a second user interface in response to the first operation, where the second user interface includes a first option; receiving a second operation performed on the first option; displaying a third user interface in response to the second operation, where the third user interface includes a second application card, and the second application card is a card generated in response to the second operation; and automatically deleting, by the terminal device, the first application card. In this way, in the terminal device, an original application card does not first need to be removed during replacing of the application card, the application card can be quickly replaced through simple operations, and a card type, style, or the like can be customized for the replacing new application card. In this way, the application card is replaced across applications, and user's interaction experience is better.

In an implementation, the first user interface and the third user interface are desktops of the terminal device.

In an implementation, when the software program and/or a plurality of sets of instructions in the memory 1302 are executed by the processor 1303, the terminal device is caused to perform the following method steps: The first option includes a parameter setting option and a first control, and the second user interface further includes a preview region; the receiving a second operation performed on the first option includes: receiving a third operation performed on the parameter setting option; and the method further includes: generating a third application card in response to the third operation and displaying the third application card in the preview region. In this way, the terminal device can follow the user's operation performed on the parameter setting option, so that the card in the preview region changes accordingly. In this way, the user can view the display effect of the set second application card in real time after completing the operation corresponding to the parameter setting option.

In an implementation, when the software program and/or a plurality of sets of instructions in the memory 1302 are executed by the processor 1303, the terminal device is caused to perform the following method steps: the receiving a second operation performed on the first option further includes: receiving a fourth operation performed on the first control; and the displaying a third user interface in response to the second operation, where the third user interface includes a second application card includes: displaying a third user interface in response to the fourth operation, and displaying a third application card on the third user interface. In this way, the terminal device allows the user to select a corresponding parameter setting option in the second user interface, to complete parameter setting of the second application card, and the user's interaction experience is better.

In an implementation, when the software program and/or a plurality of sets of instructions in the memory 1302 are executed by the processor 1303, the terminal device is caused to perform the following method steps: the second user interface includes one or more of the following: the preview region and the first option; and the first option includes one or more of the following: the parameter setting option, the first control, and a second control. The parameter setting option includes one or more of the following: an application type, a card type, a layout, a color, and a size. In this way, the terminal device allows the user to customize parameters such as a size, a color, a layout, a card type, and an application type of the application card, to complete the integration of customization and convenient interaction.

In an implementation, when the software program and/or a plurality of sets of instructions in the memory 1302 are executed by the processor 1303, the terminal device is caused to perform the following method steps: the parameter setting option includes a first parameter setting option located within the field of view of the display screen of the terminal device and a second parameter setting option located outside the field of view of the display screen region of the terminal device; and the method further includes: receiving a fifth operation performed on the second user interface; and moving the second parameter setting option into the field of view of the display screen of the terminal device in response to the fifth operation. In this way, the terminal device can allow the user to configure a plurality of parameters of the second application card in the second user interface, and the user's interaction experience is better.

In an implementation, when the software program and/or a plurality of sets of instructions in the memory 1302 are executed by the processor 1303, the terminal device is caused to perform the following method steps: parameter setting of the first option includes size; if the size of the second application card is smaller than or equal to the size of the first application card, the first user interface and the third user interface are a same desktop of the terminal device. In an implementation, the second application card is displayed at an original position of the first application card. In this way, the terminal device compares the size of the generated second application card with the size of the first application card, to ensure that the second application card can be displayed at the original position of the first application card, thereby implementing the replacement of the application card at the original position.

In an implementation, when the software program and/or a plurality of sets of instructions in the memory 1302 are executed by the processor 1303, the terminal device is caused to perform the following method steps: if the size of the second application card is larger than a size of the first application card, the third user interface is a newly created desktop, and the third user interface is a desktop different from that of the first user interface, where the first size is the size of the largest blank region formed after the first application card is deleted in the first user interface. In this way, when the original position of the first application card cannot display the large-sized second application card, the terminal device can display the second application card by occupying other blank positions of the current screen or display the second application card by displaying a new screen interface, to ensure that the second application card can replace the first application card for display, the user's interaction experience is better.

In an implementation, when the software program and/or a plurality of sets of instructions in the memory 1302 are executed by the processor 1303, the terminal device is caused to perform the following method steps: receiving a sixth operation performed on the second control; and closing the second user interface and displaying the first user interface in response to the sixth operation. In this way, the terminal device allows the user to cancel the replacement operation of the application card at any time, and the user's interaction experience is better.

In an implementation, when the software program and/or a plurality of sets of instructions in the memory 1302 are executed by the processor 1303, the terminal device is caused to perform the following method steps: the first operation includes a plurality of continuous sub-operations; and the displaying a second user interface in response to the first operation includes: receiving a first sub-operation performed on the first application card; selecting the first application card in response to the first sub-operation; receiving a second sub-operation performed on the first application card; moving the first application card to a target position in response to the second sub-operation; receiving a third sub-operation performed on the first application card; and generating the second user interface in response to the third sub-operation. In this way, the terminal device can support the user to generate the second user interface through continuous operations, so that the configuration of the second application card can be implemented through the second user interface, and the user's interaction experience is better.

In an implementation, when the software program and/or a plurality of sets of instructions in the memory 1302 are executed by the processor 1303, the terminal device is caused to perform the following method steps: the method further includes: displaying a prompt region at the target position in response to the second sub-operation; and displaying a prompt animation in the prompt region in response to detecting that the first application card is in contact with the prompt region. In this way, when the user moves the first application card, the terminal device can display the prompt region and the prompt animation to inform, through the prompt region, the user of the target position for moving the first application card, and prompt, through the prompt animation, the user that execution of the third sub-operation can trigger display of the second user interface, and the user's interaction experience is better.

In an implementation, when the software program and/or a plurality of sets of instructions in the memory 1302 are executed by the processor 1303, the terminal device is caused to perform the following method steps: The first operation includes a plurality of discontinuous sub-operations: the displaying a second user interface in response to the first operation includes: receiving a fourth sub-operation performed on the first application card; and in response to the fourth sub-operation, selecting the first application card, and displaying an edit pop-up window on a side of the first application card, where the edit pop-up window includes a third control; receiving a fifth sub-operation performed on the third control; and generating the second user interface in response to the fifth sub-operation. In this way, the terminal device can support the user to generate the second user interface through discontinuous operations, so that the configuration of the second application card can be implemented through the second user interface, and the user's interaction experience is better.

An embodiment of the present application provides a computer-readable storage medium. The computer-readable storage medium stores instructions. When the instructions run on a computer, the computer is caused to perform the methods according to the foregoing aspects.

An embodiment of the present application further provides a computer program product including instructions, and when the instructions run on a computer, the computer is caused to perform the methods according to the foregoing aspects.

The foregoing specific implementations further describe the objectives, technical solutions in detail, and beneficial effects of the present invention. It should be appreciated that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A terminal device, comprising:
   one or more processors;
   a touch screen coupled to the one or more processors, wherein the touch screen is configured to display a user interface and receive user operations; and
   one or more memories storing instructions that, when executed by the one or more processors, cause the terminal device to be configured to:

display a first user interface, wherein the first user interface is a desktop of the terminal device, the first user interface comprises a first application card at a first position and a second application card at a second position, the first application card is a card of an application of a first application category, and the second application card is a card of an application of a second application category;

display a third control on a side of the first application card in response to a first operation on the first application card, wherein the third control comprises a selectable option for replacing the first application card in the first user interface with another application card associated with an application other than that of the first application card;

display a second user interface in response to a second operation on the third control, wherein the second user interface comprises a third application card and a fourth application card, and wherein the third application card and the fourth application card are cards of applications of the first application category;

after receiving a third operation associated with the third application card:

display the desktop;

stop displaying the first application card on the desktop; and display the third application card at the first position on the desktop;

display the third control on a side of the second application card in response to a fourth operation on the second application card;

display a third user interface in response to a fifth operation on the third control, wherein the third user interface comprises a fifth application card and a sixth application card, and wherein the fifth application card and the sixth application card are cards of applications of the second application category; and after receiving a sixth operation associated with the fifth application card:

display the desktop;

stop displaying the second application card on the desktop; and display the fifth application card at the second position on the desktop.

2. The terminal device of claim 1, wherein in response to receiving a seventh operation on the first application card, the instructions, when executed by the one or more processors, further cause the terminal device to be configured to:

start an application program corresponding to the first application card; and display an application interface of the application program.

3. The terminal device of claim 1, wherein both the second user interface and the third user interface comprise an application category parameter setting option, wherein when displaying the second user interface in response to the second operation on the third control, a default option of the application category parameter setting option displayed on the second user interface is the first application category, and wherein when displaying the third user interface in response to the fifth operation on the third control, a default option of the application category parameter setting option displayed on the third user interface is the second application category.

4. The terminal device of claim 3, wherein both the second user interface and the third user interface comprise a card category parameter setting option, wherein the card category parameter setting option of the second user interface comprises the third application card and the fourth application card, and wherein the card category parameter setting option of the third user interface comprises the fifth application card and the sixth application card.

5. The terminal device of claim 4, wherein after receiving an eighth operation when displaying the second user interface, the application category parameter setting option is displayed as selecting the second application category, the card category parameter setting option switches from the third application card and the fourth application card to the fifth application card and the sixth application card, and wherein the eighth operation is associated with the second application category.

6. The terminal device of claim 5, wherein the eighth operation comprises a click operation on the second application category, and wherein the application category parameter setting option comprises a filter for filtering a plurality of application cards to limit display of the plurality of application cards to application cards belonging to the second application category.

7. The terminal device of claim 1, wherein the third application card and the fourth application card belong to different applications.

8. The terminal device of claim 1, wherein the third application card and the first application card belong to different applications.

9. The terminal device of claim 3, wherein the application category parameter setting option comprises at least one of the following options: office efficiency and audio-visual entertainment.

10. The terminal device of claim 9, wherein an application category corresponding to office efficiency comprises at least one of the following applications: memo and schedule.

11. The terminal device of claim 9, wherein an application category corresponding to the audio-visual entertainment comprises at least one of the following applications: music and video.

12. The terminal device of claim 1, wherein both the second user interface and the third user interface comprise a first control, and wherein the third operation comprises an operation on the first control, and the sixth operation comprises an operation on the first control.

13. The terminal device of claim 1, wherein the second user interface further comprises a second control, and wherein in response to an operation on the second control, the instructions, when executed by the one or more processors, further cause the terminal device to be configured to close the second user interface and display the first user interface, wherein the first application card on the first user interface is displayed in the first position.

14. The terminal device of claim 1, wherein the first operation is a long press operation on the first application card.

15. The terminal device of claim 1, wherein in response to the first operation on the first application card, the instructions, when executed by the one or more processors, further cause the terminal device to be configured to display an edit pop-up window on a side of the first application card, wherein the edit pop-up window comprises the third control.

16. The terminal device of claim 15, wherein the edit pop-up window further comprises a "remove" control, and wherein in response to an operation on the "remove" control, the instructions, when executed by the one or more processors, further cause the terminal device to be configured to delete the first application card on the first user interface.

17. The terminal device of claim 4, wherein in response to a sliding operation, the instructions, when executed by the one or more processors, further cause the terminal device to be configured to switch a card displayed in the card category parameter setting option.

18. A non-transitory computer-readable storage medium storing instructions that, when executed by one or more processors of a terminal device, cause the terminal device to be configured to:

display a first user interface, wherein the first user interface is a desktop of the terminal device, the first user interface comprises a first application card at a first position and a second application card at a second position, the first application card is a card of an application of a first application category, and the second application card is a card of an application of a second application category;

display a third control on a side of the first application card in response to a first operation on the first application card, wherein the third control comprises a selectable option for replacing the first application card in the first user interface with another application card;

display a second user interface in response to a second operation on the third control, wherein the second user interface comprises a third application card and a fourth application card, and wherein the third application card and the fourth application card are cards of applications of the first application category;

after receiving a third operation associated with the third application card:

display the desktop;

stop displaying the first application card on the desktop; and display the third application card at the first position on the desktop;

display the third control on a side of the second application card in response to a fourth operation on the second application card;

display a third user interface in response to a fifth operation on the third control, wherein the third user interface comprises a fifth application card and a sixth application card, and wherein the fifth application card and the sixth application card are cards of applications of the second application category; and after receiving a sixth operation associated with the fifth application card:

display the desktop;

stop displaying the second application card on the desktop; and display the fifth application card at the second position on the desktop.

19. A method, comprising:

displaying a first user interface, wherein the first user interface is a desktop of a terminal device, the first user interface comprises a first application card at a first position and a second application card at a second position, the first application card is a card of an application of a first application category, and the second application card is a card of an application of a second application category;

displaying a third control on a side of the first application card in response to a first operation on the first application card, wherein the third control comprises a selectable option for replacing the first application card in the first user interface with another application card associated with an application other than that of the first application card;

displaying a second user interface in response to a second operation on the third control, wherein the second user interface comprises a third application card and a fourth application card, and wherein the third application card and the fourth application card are cards of applications of the first application category;

after receiving a third operation associated with the third application card:

displaying the desktop;

stopping displaying the first application card on the desktop; and displaying the third application card at the first position on the desktop;

displaying the third control on a side of the second application card in response to a fourth operation on the second application card;

displaying a third user interface in response to a fifth operation on the third control, wherein the third user interface comprises a fifth application card and a sixth application card, and wherein the fifth application card and the sixth application card are cards of applications of the second application category; and after receiving a sixth operation associated with the fifth application card:

displaying the desktop;

stopping displaying the second application card on the desktop; and displaying the fifth application card at the second position on the desktop.

20. The method of claim 19, wherein in response to receiving a seventh operation on the first application card, the method further comprises:

starting an application program corresponding to the first application card; and displaying an application interface of the application program.

* * * * *